United States Patent
Ramachandra et al.

(10) Patent No.: US 8,293,057 B2
(45) Date of Patent: Oct. 23, 2012

(54) DOUBLE LASER DRILLING OF A PRINTHEAD INTEGRATED CIRCUIT ATTACHMENT FILM

(75) Inventors: Nagesh Ramachandra, Balmain (AU); Jennifer Mia Fishburn, Balmain (AU); Paul Timothy Sharp, Balmain (AU); Susan Williams, Balmain (AU); Paul Andrew Papworth, Balmain (AU); Simon Fielder, Balmain (AU); Kia Silverbrook, Balmain (AU)

(73) Assignee: Zamtec Limited, Dublin (IE)

( * ) Notice: Subject to any disclaimer, the term of this patent is extended or adjusted under 35 U.S.C. 154(b) by 1255 days.

(21) Appl. No.: 12/049,371

(22) Filed: Mar. 17, 2008

(65) Prior Publication Data
US 2009/0231383 A1    Sep. 17, 2009

(51) Int. Cl.
*B32B 38/00* (2006.01)
*B32B 38/04* (2006.01)

(52) U.S. Cl. ........ 156/253; 156/250; 156/252; 156/256; 156/269; 156/272.2; 156/272.8

(58) Field of Classification Search .................. 156/250, 156/252, 253, 256, 269, 272.2, 272.8
See application file for complete search history.

(56) References Cited

U.S. PATENT DOCUMENTS

| | | | |
|---|---|---|---|
| 5,812,155 A * | 9/1998 | Seccombe | 347/6 |
| 6,229,114 B1 * | 5/2001 | Andrews et al. | 219/121.72 |
| 2007/0206059 A1 | 9/2007 | Ramachandra et al. | |
| 2007/0206079 A1 * | 9/2007 | Brown et al. | 347/94 |

FOREIGN PATENT DOCUMENTS

| | | |
|---|---|---|
| EP | 0309146 B1 | 1/1993 |
| EP | 0500110 B1 | 5/1996 |
| EP | 0564120 B1 | 5/1998 |

* cited by examiner

*Primary Examiner* — Mark A Osele
*Assistant Examiner* — Christopher C Caillouet

(57) ABSTRACT

A method of fabricating an apertured polymeric film. The method comprising the steps of: (a) masking a polymeric film with a first mask having first laser transmission zones defined therein; (b) laser-ablating first apertures through the polymeric film using the first mask; (c) masking the film with a second mask having second laser transmission zones defined therein, each second zone being aligned with a corresponding first aperture, and each second zone having greater perimeter dimensions than the corresponding first aperture; and (d) reaming the first apertures by laser-ablating the polymeric film using the second mask, the reamed first apertures defining second apertures in the film.

17 Claims, 35 Drawing Sheets

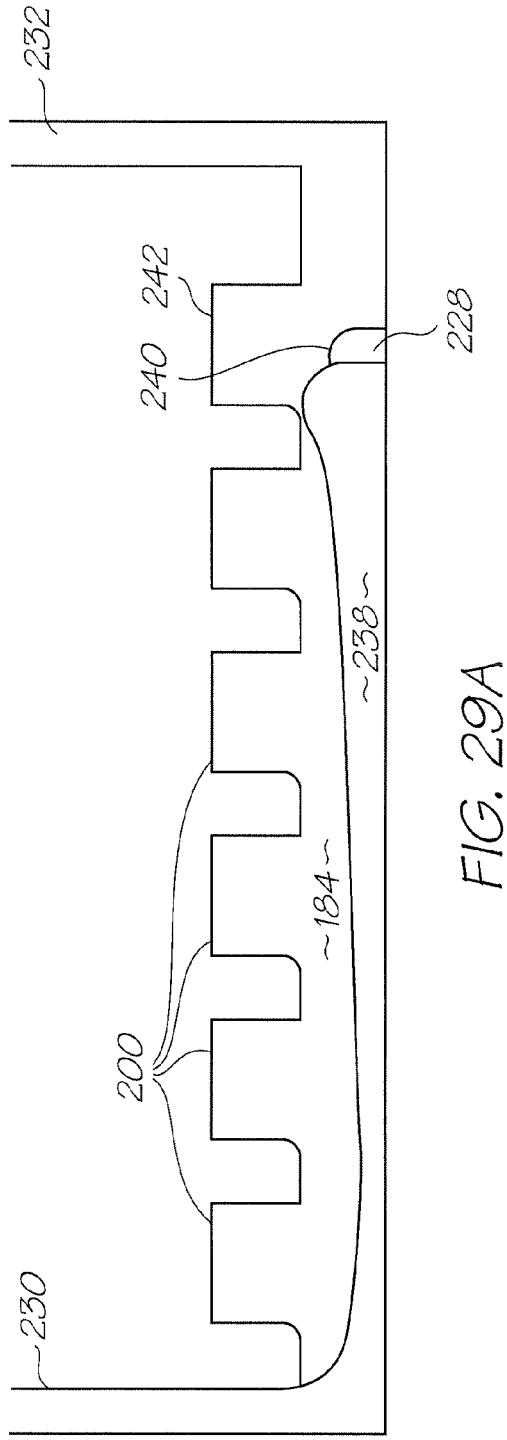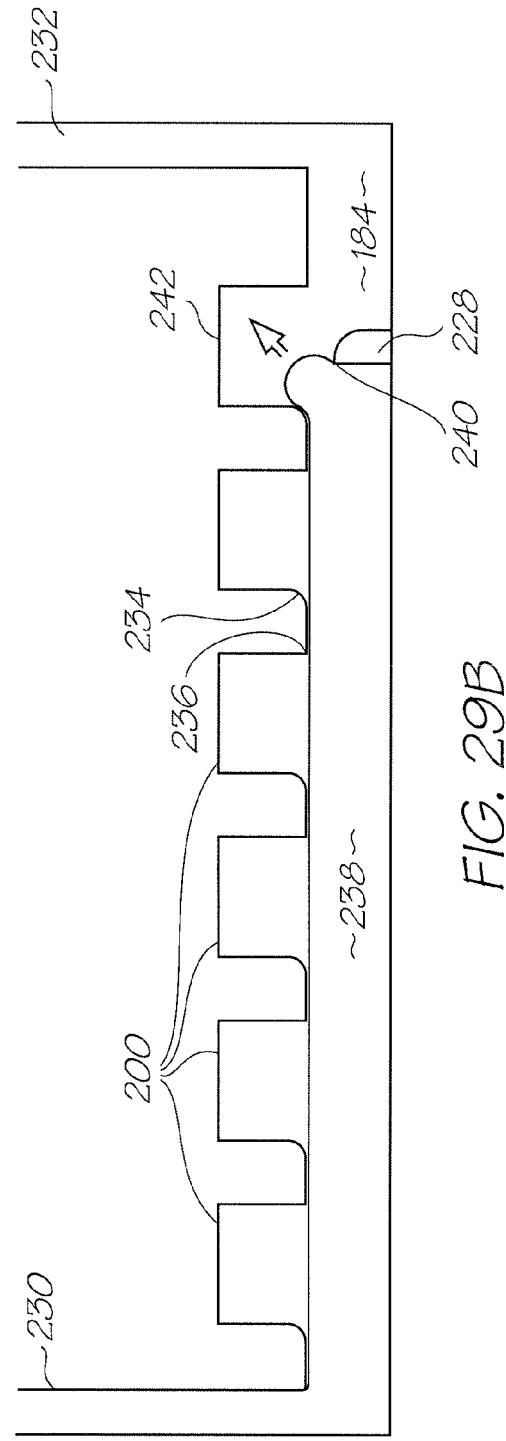

DOUBLE LASER DRILLING OF A PRINTHEAD INTEGRATED CIRCUIT ATTACHMENT FILM

FIELD OF THE INVENTION

The present invention relates to printers and in particular inkjet printers.

Co-Pending Applications The following application has been filed by the Applicant simultaneously with the present application:

| 12/049,372 | 7,845,755 | 7,727,348 | 7,845,763 |

The disclosure of this co-pending application is incorporated herein by reference.

CROSS REFERENCES

Various methods, systems and apparatus relating to the present invention are disclosed in the following US patents/patent applications filed by the applicant or assignee of the present invention:

| | | | | | | |
|---|---|---|---|---|---|---|
| 6,276,850 | 6520631 | 6158907 | 6539180 | 6270177 | 6405055 | 6628430 |
| 6,835,135 | 6,626,529 | 6,981,769 | 7,125,338 | 7,125,337 | 7,136,186 | 7,286,260 |
| 7,145,689 | 7,130,075 | 7,081,974 | 7,177,055 | 7,209,257 | 6,443,555 | 7,161,715 |
| 7,154,632 | 7,158,258 | 7,148,993 | 7,075,684 | 10/943,905 | 10/943,906 | 10/943,904 |
| 10/943,903 | 10/943,902 | 6,966,659 | 6,988,841 | 7,077,748 | 7,255,646 | 7,070,270 |
| 7,014,307 | 7,158,809 | 7,217,048 | 11/225,172 | 11/255,942 | 11/329,039 | 11/329,040 |
| 7,271,829 | 11/442,189 | 11/474,280 | 11/483,061 | 11/503,078 | 11/520,735 | 11/505,858 |
| 11/525,850 | 11/583,870 | 11/592,983 | 11/592,208 | 11/601,828 | 11/635,482 | 11/635,526 |
| 10/466,440 | 7,215,441 | 11/650,545 | 11/653,241 | 11/653,240 | 7,056,040 | 6,942,334 |
| 11/706,300 | 11/740,265 | 11/737,720 | 11/739,056 | 11/740,204 | 11/740,223 | 11/753,557 |
| 11/750,285 | 11/758,648 | 11/778,559 | 11,834,634 | 11/838,878 | 11,845,669 | 12,015,407 |
| 12/017,331 | 12,030,823 | 6,799,853 | 7,237,896 | 6,749,301 | 10/451,722 | 7,137,678 |
| 7,252,379 | 7,144,107 | 10/503,900 | 10/503,898 | 10/503,897 | 7,220,068 | 7,270,410 |
| 7,241,005 | 7,108,437 | 7,140,792 | 10/503,922 | 7,224,274 | 10/503,917 | 10/503,918 |
| 10/503,925 | 10/503,927 | 10/503,928 | 10/503,929 | 10/503,885 | 7,195,325 | 7,229,164 |
| 7,150,523 | 10/503,889 | 7,154,580 | 6,906,778 | 7,167,158 | 7,128,269 | 6,688,528 |
| 6,986,613 | 6,641,315 | 7,278,702 | 10/503,891 | 7,150,524 | 7,155,395 | 6,915,140 |
| 6,999,206 | 6,795,651 | 6,883,910 | 7,118,481 | 7,136,198 | 7,092,130 | 6,786,661 |
| 6,808,325 | 10/920,368 | 10/920,284 | 7,219,990 | 10/920,283 | 6,750,901 | 6,476,863 |
| 6,788,336 | 6,322,181 | 6,597,817 | 6,227,648 | 6,727,948 | 6,690,419 | 10/470,947 |
| 6,619,654 | 6,969,145 | 6,679,582 | 7,328,896 | 6,568,670 | 6,866,373 | 7,280,247 |
| 7,008,044 | 6,742,871 | 6,966,628 | 6,644,781 | 6,969,143 | 6,767,076 | 6,834,933 |
| 6,692,113 | 6,913,344 | 6,727,951 | 7,128,395 | 7,036,911 | 7,032,995 | 6,969,151 |
| 6,955,424 | 6,969,162 | 10/919,249 | 6,942,315 | 11/006,577 | 7,234,797 | 6,986,563 |
| 7,295,211 | 11/045,442 | 7,286,162 | 7,283,159 | 7,077,330 | 6,196,541 | 7,303,257 |
| 11/185,725 | 7,226,144 | 11/202,344 | 7,267,428 | 11/248,423 | 11/248,422 | 7,093,929 |
| 11/282,769 | 11/330,060 | 11/442,111 | 7,290,862 | 11/499,806 | 11/499,710 | 6,195,150 |
| 11/749,156 | 11/782,588 | 11/854,435 | 11/853,817 | 11/935,958 | 11,924,608 | 6,362,868 |
| 11/970,993 | 12,031,526 | 6,831,681 | 6,431,669 | 6,362,869 | 6,472,052 | 6,356,715 |
| 6,894,694 | 6,636,216 | 6,366,693 | 6,329,990 | 6,459,495 | 6,137,500 | 6,690,416 |
| 7,050,143 | 6,398,328 | 7,110,024 | 6,431,704 | 6,879,341 | 6,415,054 | 6,665,454 |
| 6,542,645 | 6,486,886 | 6,381,361 | 6,317,192 | 6,850,274 | 09/113,054 | 6,646,757 |
| 6,624,848 | 6,357,135 | 6,271,931 | 6,353,772 | 6,106,147 | 6,665,008 | 6,304,291 |
| 6,305,770 | 6,289,262 | 6,315,200 | 6,217,165 | 6,496,654 | 6,859,225 | 6,924,835 |
| 6,647,369 | 6,943,830 | 09/693,317 | 7,021,745 | 6,712,453 | 6,460,971 | 6,428,147 |
| 6,416,170 | 6,402,300 | 6,464,340 | 6,612,687 | 6,412,912 | 6,447,099 | 6,837,567 |
| 6,505,913 | 7,128,845 | 6,733,684 | 7,249,108 | 6,566,858 | 6,331,946 | 6,246,970 |
| 6,442,525 | 09/517,384 | 09/505,951 | 6,374,354 | 7,246,098 | 6,816,968 | 6,757,832 |
| 6,334,190 | 6,745,331 | 7,249,109 | 7,197,642 | 7,093,139 | 10/636,263 | 10/636,283 |
| 10/866,608 | 7,210,038 | 10/902,883 | 10/940,653 | 10/942,858 | 11/706,329 | 11/757,385 |
| 11/758,642 | 7,119,836 | 7,283,162 | 7,286,169 | 10/636,285 | 7,170,652 | 6,967,750 |
| 6,995,876 | 7,099,051 | 7,172,191 | 7,243,916 | 7,222,265 | 11/239,232 | 7,285,227 |
| 7,063,940 | 11/107,942 | 7,193,734 | 7,086,724 | 7,090,337 | 7,278,723 | 7,140,717 |
| 11/190,902 | 11/209,711 | 7,256,824 | 7,140,726 | 7,156,512 | 7,186,499 | 11/478,585 |
| 11/525,862 | 11/540,574 | 11/583,875 | 11/592,181 | 6,750,944 | 11/599,336 | 7,291,447 |
| 11,744,183 | 11/758,646 | 11/778,561 | 11/839,532 | 11/838,874 | 11/853,021 | 11/869,710 |
| 11/868,531 | 11,927,403 | 11,951,960 | 12,019,556 | 10/636,225 | 6,985,207 | 6,773,874 |
| 6,650,836 | 7,324,142 | 10/636,224 | 7,250,975 | 7,295,343 | 6,880,929 | 7,236,188 |
| 7,236,187 | 7,155,394 | 10/636,219 | 10/636,223 | 7,055,927 | 6,986,562 | 7,052,103 |
| 7,312,845 | 10/656,281 | 10/656,791 | 10/666,124 | 10/683,217 | 7,289,142 | 7,095,533 |
| 6,914,686 | 6,896,252 | 6,820,871 | 6,834,851 | 6,848,686 | 6,830,246 | 6,851,671 |
| 10/729,098 | 7,092,011 | 7,187,404 | 10/729,159 | 10/753,458 | 6,878,299 | 6,929,348 |
| 6,921,154 | 10/780,625 | 10/804,042 | 6,913,346 | 10/831,238 | 10/831,237 | 10/831,239 |
| 10/831,240 | 10/831,241 | 10/831,234 | 10/831,233 | 7,246,097 | 7,077,515 | 10/831,235 |
| 10/853,336 | 10/853,117 | 10/853,659 | 10/853,681 | 6,913,875 | 7,021,758 | 7,033,017 |
| 7,161,709 | 7,099,033 | 7,147,294 | 7,156,494 | 11/012,024 | 11/011,925 | 7,032,998 |
| 7,044,585 | 7,296,867 | 6,994,424 | 11/006,787 | 7,258,435 | 7,097,263 | 7,001,012 |
| 7,004,568 | 7,040,738 | 7,188,933 | 7,027,080 | 7,025,446 | 6,991,321 | 7,131,715 |
| 7,261,392 | 7,207,647 | 7,182,435 | 7,097,285 | 7,331,646 | 7,097,284 | 7,083,264 |
| 7,147,304 | 7,232,203 | 7,156,498 | 7,201,471 | 11/501,772 | 11/503,084 | 11/513,073 |

-continued

| | | | | | | |
|---|---|---|---|---|---|---|
| 7,210,764 | 11/635,524 | 11/706,379 | 11/730,386 | 11/730,784 | 11/753,568 | 11/782,591 |
| 11/859,783 | 12,015,243 | 12,037,069 | 6,710,457 | 6,775,906 | 6,507,099 | 7,221,043 |
| 7,107,674 | 7,154,172 | 11/442,400 | 7,247,941 | 11/736,540 | 7,307,354 | 11/940,304 |
| 6,530,339 | 6,631,897 | 6,851,667 | 6,830,243 | 6,860,479 | 6,997,452 | 7,000,913 |
| 7,204,482 | 11/212,759 | 11/281,679 | 11/730,409 | 6,238,044 | 6,425,661 | 11/003,786 |
| 7,258,417 | 7,293,853 | 7,328,968 | 7,270,395 | 11/003,404 | 11/003,419 | 7,334,864 |
| 7,255,419 | 7,284,819 | 7,229,148 | 7,258,416 | 7,273,263 | 7,270,393 | 6,984,017 |
| 11/003,699 | 11/071,473 | 7,156,497 | 11/601,670 | 11,748,482 | 11/778,563 | 11/779,851 |
| 11/778,574 | 11/853,816 | 11/853,814 | 11/853,786 | 11/872,037 | 11/856,694 | 11/965,703 |
| 11/971,170 | 12,023,011 | 12,036,896 | 11/003,463 | 11/003,701 | 11/003,683 | 11/003,614 |
| 7,284,820 | 7,341,328 | 7,246,875 | 7,322,669 | 11/764,760 | 11/853,777 | 11/955,354 |
| 12,022,994 | 11/293,800 | 11/293,802 | 11/293,801 | 11/293,808 | 11/293,809 | 11/482,975 |
| 11/482,970 | 11/482,968 | 11/482,972 | 11/482,971 | 11/482,969 | 6,431,777 | 6,334,664 |
| 6,447,113 | 7,239,407 | 6,398,359 | 6,652,089 | 6,652,090 | 7,057,759 | 6,631,986 |
| 7,187,470 | 7,280,235 | 11/501,775 | 11,744,210 | 11/859,784 | 6,471,331 | 6,676,250 |
| 6,347,864 | 6,439,704 | 6,425,700 | 6,588,952 | 6,626,515 | 6,722,758 | 6,871,937 |
| 11/060,803 | 11/097,266 | 7,328,976 | 11/685,084 | 11/685,086 | 11/685,090 | 11/740,925 |
| 11/763,444 | 11/763,443 | 11,946,840 | 11,961,712 | 12/017,771 | 7,249,942 | 7,206,654 |
| 7,162,324 | 7,162,325 | 7,231,275 | 7,146,236 | 7,278,847 | 10/753,499 | 6,997,698 |
| 7,220,112 | 7,231,276 | 10/753,440 | 7,220,115 | 7,195,475 | 7,144,242 | 7,306,323 |
| 7,306,319 | 11/525,858 | 7,322,674 | 11/599,335 | 11/706,380 | 11,736,545 | 11/736,554 |
| 11/739,047 | 11,749,159 | 11/739,073 | 11/775,160 | 11/853,755 | 11/940,291 | 11/934,071 |
| 11,951,913 | 6,786,420 | 6,827,282 | 6,948,661 | 7,073,713 | 10/983,060 | 7,093,762 |
| 7,083,108 | 7,222,799 | 7,201,319 | 11/442,103 | 11/739,071 | 11/518,238 | 11/518,280 |
| 11/518,244 | 11/518,243 | 11/518,242 | 7,032,899 | 6,854,724 | 7,331,651 | 7,334,870 |
| 7,334,875 | 11/357,296 | 11/357,298 | 11/357,297 | 12,015,479 | 12/017,270 | 12,015,218 |
| 6,350,023 | 6,318,849 | 6,592,207 | 6,439,699 | 6,312,114 | 11/246,676 | 11/246,677 |
| 11/246,678 | 11/246,679 | 11/246,680 | 11/246,681 | 11/246,714 | 11/246,713 | 11/246,689 |
| 11/246,671 | 11/246,670 | 11/246,669 | 11/246,704 | 11/246,710 | 11/246,688 | 11/246,716 |
| 11/246,715 | 11/246,707 | 11/246,706 | 11/246,705 | 11/246,708 | 11/246,693 | 11/246,692 |
| 11/246,696 | 11/246,695 | 11/246,694 | 11/482,958 | 11/482,955 | 11/482,962 | 11/482,963 |
| 11/482,956 | 11/482,954 | 11/482,974 | 11/482,957 | 11/482,987 | 11/482,959 | 11/482,960 |
| 11/482,961 | 11/482,964 | 11/482,965 | 11/482,976 | 11/482,973 | 11/495,815 | 11/495,816 |
| 11/495,817 | 60,992,635 | 60,992,637 | 60,992,641 | 10/803,074 | 10/803,073 | 7,040,823 |
| 10/803,076 | 10/803,077 | 10/803,078 | 10/803,079 | 10/922,971 | 10/922,970 | 10/922,836 |
| 10/922,842 | 10/922,848 | 10/922,843 | 7,125,185 | 7,229,226 | 11/513,386 | 11/753,559 |
| 10/815,621 | 7,243,835 | 10/815,630 | 10/815,637 | 10/815,638 | 7,251,050 | 10/815,642 |
| 7,097,094 | 7,137,549 | 10/815,618 | 7,156,292 | 11,738,974 | 10/815,635 | 10/815,647 |
| 10/815,634 | 7,137,566 | 7,131,596 | 7,128,265 | 7,207,485 | 7,197,374 | 7,175,089 |
| 10/815,617 | 10/815,620 | 7,178,719 | 10/815,613 | 7,207,483 | 7,296,737 | 7,270,266 |
| 10/815,614 | 7,314,181 | 11/488,162 | 11/488,163 | 11/488,164 | 11/488,167 | 11/488,168 |
| 11/488,165 | 11/488,166 | 7,267,273 | 11/834,628 | 11/839,497 | 11/944,449 | 10/815,636 |
| 7,128,270 | 11/041,650 | 11/041,651 | 11/041,652 | 11/041,649 | 11/041,610 | 11/863,253 |
| 11/863,255 | 11/863,257 | 11/863,258 | 11/863,262 | 11/041,609 | 11/041,626 | 11/041,627 |
| 11/041,624 | 11/041,625 | 11/863,268 | 11/863,269 | 11/863,270 | 11/863,271 | 11/863,273 |
| 76,584,733 | 11/041,556 | 11/041,580 | 11/041,723 | 11/041,699 | 11/041,648 | 11,863,263 |
| 11,863,264 | 11,863,265 | 11,863,266 | 11,863,267 | 10/815,609 | 7,150,398 | 7,159,777 |
| 10/815,610 | 7,188,769 | 7,097,106 | 7,070,110 | 7,243,849 | 7,314,177 | 11/480,957 |
| 11/764,694 | 11,957,470 | 6,227,652 | 6,213,588 | 6,213,589 | 6,231,163 | 6,247,795 |
| 6,394,581 | 6,244,691 | 6,257,704 | 6,416,168 | 6,220,694 | 6,257,705 | 6,247,794 |
| 6,234,610 | 6,247,793 | 6,264,306 | 6,241,342 | 6,247,792 | 6,264,307 | 6,254,220 |
| 6,234,611 | 6,302,528 | 6,283,582 | 6,239,821 | 6,338,547 | 6,247,796 | 6,557,977 |
| 6,390,603 | 6,362,843 | 6,293,653 | 6,312,107 | 6,227,653 | 6,234,609 | 6,238,040 |
| 6,188,415 | 6,227,654 | 6,209,989 | 6,247,791 | 6,336,710 | 6,217,153 | 6,416,167 |
| 6,243,113 | 6,283,581 | 6,247,790 | 6,260,953 | 6,267,469 | 6,588,882 | 6,742,873 |
| 6,918,655 | 6,547,371 | 6,938,989 | 6,598,964 | 6,923,526 | 6,273,544 | 6,309,048 |
| 6,420,196 | 6,443,558 | 6,439,689 | 6,378,989 | 6,848,181 | 6,634,735 | 6,299,289 |
| 6,299,290 | 6,425,654 | 6,902,255 | 6,623,101 | 6,406,129 | 6,505,916 | 6,457,809 |
| 6,550,895 | 6,457,812 | 7,152,962 | 6,428,133 | 7,216,956 | 7,080,895 | 11/144,844 |
| 7,182,437 | 11/599,341 | 11/635,533 | 11/607,976 | 11/607,975 | 11/607,999 | 11/607,980 |
| 11/607,979 | 11/607,978 | 11/735,961 | 11/685,074 | 11/696,126 | 11/696,144 | 11/696,650 |
| 11/763,446 | 6,224,780 | 6,235,212 | 6,280,643 | 6,284,147 | 6,214,244 | 6,071,750 |
| 6,267,905 | 6,251,298 | 6,258,285 | 6,225,138 | 6,241,904 | 6,299,786 | 6,866,789 |
| 6,231,773 | 6,190,931 | 6,248,249 | 6,290,862 | 6,241,906 | 6,565,762 | 6,241,905 |
| 6,451,216 | 6,231,772 | 6,274,056 | 6,290,861 | 6,248,248 | 6,306,671 | 6,331,258 |
| 6,110,754 | 6,294,101 | 6,416,679 | 6,264,849 | 6,254,793 | 6,245,246 | 6,855,264 |
| 6,235,211 | 6,491,833 | 6,264,850 | 6,258,284 | 6,312,615 | 6,228,668 | 6,180,427 |
| 6,171,875 | 6,267,904 | 6,245,247 | 6,315,914 | 7,169,316 | 6,526,658 | 7,210,767 |
| 11/056,146 | 11/635,523 | 6,665,094 | 6,450,605 | 6,512,596 | 6,654,144 | 7,125,090 |
| 6,687,022 | 7,072,076 | 7,092,125 | 7,215,443 | 7,136,195 | 7,077,494 | 6,877,834 |
| 6,969,139 | 10/636,227 | 7,283,280 | 6,912,067 | 7,277,205 | 7,154,637 | 10/636,230 |
| 7,070,251 | 6,851,782 | 10/636,211 | 10/636,247 | 6,843,545 | 7,079,286 | 7,064,867 |
| 7,065,247 | 7,027,177 | 7,218,415 | 7,064,873 | 6,954,276 | 7,061,644 | 7,092,127 |
| 7,059,695 | 10/990,382 | 7,177,052 | 7,270,394 | 11/124,231 | 7,188,921 | 7,187,469 |
| 7,196,820 | 11/281,445 | 7,283,281 | 7,251,051 | 7,245,399 | 11/524,911 | 10/640,267 |
| 11/706,297 | 11/730,387 | 11/737,142 | 7,336,397 | 11/834,637 | 11/853,019 | 11/863,239 |
| 12,015,485 | 12,030,797 | 11/305,274 | 11/305,273 | 11/305,275 | 11/305,152 | 11/305,158 |
| 11/305,008 | 6,231,148 | 6,293,658 | 6,614,560 | 6,238,033 | 6,312,070 | 6,238,111 |
| 6,378,970 | 6,196,739 | 6,270,182 | 6,152,619 | 7,006,143 | 6,876,394 | 6,738,096 |
| 6,970,186 | 6,287,028 | 6,412,993 | 11/033,145 | 11/102,845 | 11/102,861 | 11/248,421 |

| | | | | | | |
|---|---|---|---|---|---|---|
| 11/672,878 | 7,204,941 | 7,282,164 | 10/815,628 | 11/845,672 | 7,278,727 | 10/913,373 |
| 10/913,374 | 10/913,372 | 7,138,391 | 7,153,956 | 10/913,380 | 10/913,379 | 10/913,376 |
| 7,122,076 | 7,148,345 | 11/172,816 | 11/172,815 | 11/172,814 | 11/482,990 | 11/482,986 |
| 11/482,985 | 11/454,899 | 11/583,942 | 11/592,990 | 11/849,360 | 11/831,961 | 11/831,962 |
| 11/831,963 | 60,951,700 | 11/832,629 | 11/832,637 | 60,971,535 | 61,027,756 | 10/407,212 |
| 7,252,366 | 10/683,064 | 10/683,041 | 7,275,811 | 10/884,889 | 10/922,890 | 7,334,874 |
| 10/922,885 | 10/922,889 | 10/922,884 | 10/922,879 | 10/922,887 | 10/922,888 | 10/922,874 |
| 7,234,795 | 10/922,871 | 7,328,975 | 7,293,855 | 10/922,882 | 10/922,883 | 10/922,878 |
| 10/922,872 | 10/922,876 | 10/922,886 | 10/922,877 | 7,147,792 | 7,175,774 | 11/159,193 |
| 11/491,378 | 11/766,713 | 11/841,647 | 12/018,040 | 12,035,410 | 12,037,054 | 11/482,980 |
| 11/563,684 | 11/482,967 | 11/482,966 | 11/482,988 | 11/482,989 | 11/293,832 | 11/293,838 |
| 11/293,825 | 11/293,841 | 11/293,799 | 11/293,796 | 11/293,797 | 11/293,798 | 11/124,158 |
| 11/124,196 | 11/124,199 | 11/124,162 | 11/124,202 | 11/124,197 | 11/124,154 | 11/124,198 |
| 7,284,921 | 11/124,151 | 11/124,160 | 11/124,192 | 11/124,175 | 11/124,163 | 11/124,149 |
| 11/124,152 | 11/124,173 | 11/124,155 | 7,236,271 | 11/124,174 | 11/124,194 | 11/124,164 |
| 11/124,200 | 11/124,195 | 11/124,166 | 11/124,150 | 11/124,172 | 11/124,165 | 11/124,186 |
| 11/124,185 | 11/124,184 | 11/124,182 | 11/124,201 | 11/124,171 | 11/124,181 | 11/124,161 |
| 11/124,156 | 11/124,191 | 11/124,159 | 11/124,176 | 11/124,188 | 11/124,170 | 11/124,187 |
| 11/124,189 | 11/124,190 | 11/124,180 | 11/124,193 | 11/124,183 | 11/124,178 | 11/124,177 |
| 11/124,148 | 11/124,168 | 11/124,167 | 11/124,179 | 11/124,169 | 11/187,976 | 11/188,011 |
| 11/188,014 | 11/482,979 | 11/735,490 | 11/853,018 | 11/944,450 | 12,023,815 | 12,035,414 |
| 11/228,540 | 11/228,500 | 11/228,501 | 11/228,530 | 11/228,490 | 11/228,531 | 11/228,504 |
| 11/228,533 | 11/228,502 | 11/228,507 | 11/228,482 | 11/228,505 | 11/228,497 | 11/228,487 |
| 11/228,529 | 11/228,484 | 11/228,489 | 11/228,518 | 11/228,536 | 11/228,496 | 11/228,488 |
| 11/228,506 | 11/228,516 | 11/228,526 | 11/228,539 | 11/228,538 | 11/228,524 | 11/228,523 |
| 11/228,519 | 11/228,528 | 11/228,527 | 11/228,525 | 11/228,520 | 11/228,498 | 11/228,511 |
| 11/228,522 | 11/228,515 | 11/228,537 | 11/228,534 | 11/228,491 | 11/228,499 | 11/228,509 |
| 11/228,492 | 11/228,493 | 11/228,510 | 11/228,508 | 11/228,512 | 11/228,514 | 11/228,494 |
| 11/228,495 | 11/228,486 | 11/228,481 | 11/228,477 | 11/228,485 | 11/228,483 | 11/228,521 |
| 11/228,517 | 11/228,532 | 11/228,513 | 11/228,503 | 11/228,480 | 11/228,535 | 11/228,478 |
| 11/228,479 | 12,035,419 | 6,238,115 | 6,386,535 | 6,398,344 | 6,612,240 | 6,752,549 |
| 6,805,049 | 6,971,313 | 6,899,480 | 6,860,664 | 6,925,935 | 6,966,636 | 7,024,995 |
| 7,284,852 | 6,926,455 | 7,056,038 | 6,869,172 | 7,021,843 | 6,988,845 | 6,964,533 |
| 6,981,809 | 7,284,822 | 7,258,067 | 7,322,757 | 7,222,941 | 7,284,925 | 7,278,795 |
| 7,249,904 | 11/737,726 | 11/772,240 | 11/863,246 | 11/863,145 | 11/865,650 | 6,087,638 |
| 6,340,222 | 6,041,600 | 6,299,300 | 6,067,797 | 6,286,935 | 6,044,646 | 6,382,769 |
| 6,787,051 | 6,938,990 | 11/242,916 | 11/144,799 | 11/198,235 | 11,861,282 | 11,861,284 |
| 11/766,052 | 7,152,972 | 11/592,996 | D529952 | 6,390,605 | 6,322,195 | 6,612,110 |
| 6,480,089 | 6,460,778 | 6,305,788 | 6,426,014 | 6,364,453 | 6,457,795 | 6,315,399 |
| 6,338,548 | 7,040,736 | 6,938,992 | 6,994,425 | 6,863,379 | 6,540,319 | 6,994,421 |
| 6,984,019 | 7,008,043 | 6,997,544 | 6,328,431 | 6,991,310 | 10/965,772 | 7,140,723 |
| 6,328,425 | 6,982,184 | 7,267,423 | 7,134,741 | 7,066,577 | 7,152,945 | 7,303,689 |
| 7,021,744 | 6,991,320 | 7,155,911 | 11/107,799 | 6,595,624 | 7,152,943 | 7,125,103 |
| 7,328,971 | 7,290,857 | 7,285,437 | 7,229,151 | 11/330,058 | 7,237,873 | 11/329,163 |
| 11/442,180 | 11/450,431 | 7,213,907 | 6,417,757 | 11/482,951 | 11/545,566 | 11/583,826 |
| 11/604,315 | 11/604,323 | 11/643,845 | 11/706,950 | 11/730,399 | 11/749,121 | 11/753,549 |
| 11/834,630 | 11/935,389 | 11/869,670 | 7,095,309 | 11/945,157 | 11,957,473 | 11,967,235 |
| 12,017,896 | 6,854,825 | 6,623,106 | 6,672,707 | 6,575,561 | 6,817,700 | 6,588,885 |
| 7,075,677 | 6,428,139 | 6,575,549 | 6,846,692 | 6,425,971 | 7,063,993 | 6,383,833 |
| 6,955,414 | 6,412,908 | 6,746,105 | 6,953,236 | 6,412,904 | 7,128,388 | 6,398,343 |
| 6,652,071 | 6,793,323 | 6,659,590 | 6,676,245 | 7,201,460 | 6,464,332 | 6,659,593 |
| 6,478,406 | 6,978,613 | 6,439,693 | 6,502,306 | 6,966,111 | 6,863,369 | 6,428,142 |
| 6,874,868 | 6,390,591 | 6,799,828 | 6,896,358 | 7,018,016 | 10/296,534 | 6,328,417 |
| 6,322,194 | 6,382,779 | 6,629,745 | 6,565,193 | 6,609,786 | 6,609,787 | 6,439,908 |
| 6,684,503 | 6,843,551 | 6,764,166 | 6,561,617 | 10/510,092 | 6,557,970 | 6,546,628 |
| 10/510,098 | 6,652,074 | 6,820,968 | 7,175,260 | 6,682,174 | 7,303,262 | 6,648,453 |
| 6,834,932 | 6,682,176 | 6,998,062 | 6,767,077 | 7,278,717 | 6,755,509 | 10/534,813 |
| 6,692,108 | 10/534,811 | 6,672,709 | 7,303,263 | 7,086,716 | 10/534,881 | 6,672,710 |
| 10/534,812 | 6,669,334 | 7,322,686 | 7,152,958 | 7,281,782 | 6,824,246 | 7,264,336 |
| 6,669,333 | 10/534,815 | 6,820,967 | 7,306,326 | 6,736,489 | 7,264,335 | 6,719,406 |
| 7,222,943 | 7,188,419 | 7,168,166 | 6,974,209 | 7,086,719 | 6,974,210 | 7,195,338 |
| 7,252,775 | 7,101,025 | 11/474,281 | 11/485,258 | 11/706,304 | 11/706,324 | 11/706,326 |
| 11/706,321 | 11/772,239 | 11/782,598 | 11/829,941 | 11/852,991 | 11,852,986 | 11/936,062 |
| 11/934,027 | 11,955,028 | 12,034,578 | 12,036,908 | 11/763,440 | 11/763,442 | 11/246,687 |
| 11/246,718 | 7,322,681 | 11/246,686 | 11/246,703 | 11/246,691 | 11/246,711 | 11/246,690 |
| 11/246,712 | 11/246,717 | 11/246,709 | 11/246,700 | 11/246,701 | 11/246,702 | 11/246,668 |
| 11/246,697 | 11/246,698 | 11/246,699 | 11/246,675 | 11/246,674 | 11/246,667 | 11/829,957 |
| 11/829,960 | 11/829,961 | 11/829,962 | 11/829,963 | 11/829,966 | 11/829,967 | 11/829,968 |
| 11/829,969 | 11,946,839 | 11,946,838 | 11,946,837 | 11,951,230 | 7,156,508 | 7,159,972 |
| 7,083,271 | 7,165,834 | 7,080,894 | 7,201,469 | 7,090,336 | 7,156,489 | 10/760,233 |
| 10/760,246 | 7,083,257 | 7,258,422 | 7,255,423 | 7,219,980 | 10/760,253 | 10/760,255 |
| 10/760,209 | 7,118,192 | 10/760,194 | 7,322,672 | 7,077,505 | 7,198,354 | 7,077,504 |
| 10/760,189 | 7,198,355 | 10/760,232 | 7,322,676 | 7,152,959 | 7,213,906 | 7,178,901 |
| 7,222,938 | 7,108,353 | 7,104,629 | 11/446,227 | 11/454,904 | 11/472,345 | 11/474,273 |
| 7,261,401 | 11/474,279 | 11/482,939 | 7,328,972 | 7,322,677 | 7,306,324 | 7,306,325 |
| 11/603,824 | 11/601,756 | 11/601,672 | 7,303,261 | 11/653,253 | 11/706,328 | 11/706,299 |
| 11/706,965 | 11/737,080 | 11/737,041 | 11/778,062 | 11/778,566 | 11/782,593 | 11/934,018 |
| 11/945,157 | 11,951,095 | 11,951,828 | 11,954,906 | 11,954,949 | 11,967,226 | 7,303,930 |
| 11/246,672 | 11/246,673 | 11/246,683 | 11/246,682 | 60/939,086 | 11/860,538 | 11/860,539 |
| 11/860,540 | 11,860,541 | 11,860,542 | 11/936,060 | 11/877,667 | 11/877,668 | 7,246,886 |

-continued

| | | | | | | |
|---|---|---|---|---|---|---|
| 7,128,400 | 7,108,355 | 6,991,322 | 7,287,836 | 7,118,197 | 10/728,784 | 10/728,783 |
| 7,077,493 | 6,962,402 | 10/728,803 | 7,147,308 | 10/728,779 | 7,118,198 | 7,168,790 |
| 7,172,270 | 7,229,155 | 6,830,318 | 7,195,342 | 7,175,261 | 10/773,183 | 7,108,356 |
| 7,118,202 | 10/773,186 | 7,134,744 | 10/773,185 | 7,134,743 | 7,182,439 | 7,210,768 |
| 10/773,187 | 7,134,745 | 7,156,484 | 7,118,201 | 7,111,926 | 10/773,184 | 7,018,021 |
| 11/060,751 | 11/060,805 | 11/188,017 | 7,128,402 | 11/298,774 | 11/329,157 | 11/490,041 |
| 11/501,767 | 7,284,839 | 7,246,885 | 7,229,156 | 11/505,846 | 11/505,857 | 7,293,858 |
| 11/524,908 | 11/524,938 | 7,258,427 | 11/524,912 | 7,278,716 | 11/592,995 | 11/603,825 |
| 11/649,773 | 11/650,549 | 11/653,237 | 11/706,378 | 11/706,962 | 11/749,118 | 11/754,937 |
| 11/749,120 | 11/744,885 | 11/779,850 | 11/765,439 | 11/842,950 | 11/839,539 | 11/926,121 |
| 12,025,621 | 11/097,308 | 11/097,309 | 7,246,876 | 11/097,299 | 11/097,310 | 11/097,213 |
| 7,328,978 | 7,334,876 | 7,147,306 | 7,261,394 | 11/764,806 | 11/782,595 | 11/965,696 |
| 12/027,286 | 11/482,953 | 11/482,977 | 11/544,778 | 11/544,779 | 11/764,808 | 11/756,624 |
| 11/756,625 | 11/756,626 | 11/756,627 | 11/756,628 | 11/756,629 | 11/756,630 | 11/756,631 |
| 7,156,289 | 7,178,718 | 7,225,979 | 11/712,434 | 11/084,796 | 11/084,742 | 11/084,806 |
| 09/575,197 | 09/575,197 | 7,079,712 | 7,079,712 | 6,825,945 | 6,825,945 | 7,330,974 |
| 7,330,974 | 6,813,039 | 6,813,039 | 7,190,474 | 6,987,506 | 6,987,506 | 6,824,044 |
| 7,038,797 | 7,038,797 | 6,980,318 | 6,980,318 | 6,816,274 | 6,816,274 | 7,102,772 |
| 7,102,772 | 09/575,186 | 09/575,186 | 6,681,045 | 6,681,045 | 6,678,499 | 6,679,420 |
| 6,963,845 | 6,976,220 | 6,728,000 | 6,728,000 | 7,110,126 | 7,173,722 | 7,173,722 |
| 6,976,035 | 6,813,558 | 6,766,942 | 6,965,454 | 6,995,839 | 7,088,459 | 7,088,459 |
| 6,720,985 | 7,286,113 | 6,922,779 | 6,978,019 | 6,847,883 | 7,131,058 | 7,295,839 |
| 09/607,843 | 09/693,690 | 6,959,298 | 6,973,450 | 7,150,404 | 6,965,882 | 7,233,924 |
| 09/575,181 | 09/575,181 | 09/722,174 | 7,175,079 | 7,162,259 | 6,718,061 | 10/291,523 |
| 10/291,471 | 7,012,710 | 6,825,956 | 10/291,481 | 7,222,098 | 10/291,825 | 7,263,508 |
| 7,031,010 | 6,972,864 | 6,862,105 | 7,009,738 | 6,989,911 | 6,982,807 | 10/291,576 |
| 6,829,387 | 6,714,678 | 6,644,545 | 6,609,653 | 6,651,879 | 10/291,555 | 7,293,240 |
| 10/291,592 | 10/291,542 | 7,044,363 | 7,004,390 | 6,867,880 | 7,034,953 | 6,987,581 |
| 7,216,224 | 10/291,821 | 7,162,269 | 7,162,222 | 7,290,210 | 7,293,233 | 7,293,234 |
| 6,850,931 | 6,865,570 | 6,847,961 | 10/685,523 | 10/685,583 | 7,162,442 | 10/685,584 |
| 7,159,784 | 10/804,034 | 10/793,933 | 6,889,896 | 10/831,232 | 7,174,056 | 6,996,274 |
| 7,162,088 | 10/943,874 | 10/943,872 | 10/944,044 | 7,259,884 | 10/944,043 | 7,167,270 |
| 10/943,877 | 6,986,459 | 10/954,170 | 7,181,448 | 10/981,626 | 10/981,616 | 7,324,989 |
| 7,231,293 | 7,174,329 | 10/992,713 | 7,295,922 | 7,200,591 | 11/020,106 | 11/020,260 |
| 11/020,321 | 11/020,319 | 11/026,045 | 11/059,696 | 11/051,032 | 11/059,674 | 11/107,944 |
| 11/107,941 | 11/082,940 | 11/082,815 | 11/082,827 | 11/082,829 | 6,991,153 | 6,991,154 |
| 11/124,256 | 11/123,136 | 11/154,676 | 7,322,524 | 11/182,002 | 11/202,251 | 11/202,252 |
| 11/202,253 | 11/203,200 | 11/202,218 | 11/206,778 | 11/203,424 | 11/222,977 | 7,327,485 |
| 11/227,239 | 11/286,334 | 7,225,402 | 11/329,187 | 11/349,143 | 11/491,225 | 11/491,121 |
| 11/442,428 | 11/454,902 | 11/442,385 | 11/478,590 | 7,271,931 | 11/520,170 | 11/603,057 |
| 11/706,964 | 11/739,032 | 11/739,014 | 7,336,389 | 11/830,848 | 11/830,849 | 11/839,542 |
| 11/866,394 | 11/934,077 | 11/951,874 | 12/015,487 | 12/023,860 | 12/023,005 | 12/036,266 |
| 7,068,382 | 7,068,382 | 7,007,851 | 6,957,921 | 6,457,883 | 10/743,671 | 7,044,381 |
| 11/203,205 | 7,094,910 | 7,091,344 | 7,122,685 | 7,038,066 | 7,099,019 | 7,062,651 |
| 7,062,651 | 6,789,194 | 6,789,194 | 6,789,191 | 6,789,191 | 10/900,129 | 7,278,018 |
| 10/913,350 | 10/982,975 | 10/983,029 | 11/331,109 | 6,644,642 | 6,644,642 | 6,502,614 |
| 6,502,614 | 6,622,999 | 6,622,999 | 6,669,385 | 6,669,385 | 6,827,116 | 7,011,128 |
| 10/949,307 | 6,549,935 | 6,549,935 | 6,987,573 | 6,987,573 | 6,727,996 | 6,727,996 |
| 6,591,884 | 6,591,884 | 6,439,706 | 6,439,706 | 6,760,119 | 6,760,119 | 7,295,332 |
| 7,295,332 | 7,064,851 | 6,826,547 | 6,290,349 | 6,290,349 | 6,428,155 | 6,428,155 |
| 6,785,016 | 6,785,016 | 6,831,682 | 6,741,871 | 6,927,871 | 6,980,306 | 6,965,439 |
| 6,840,606 | 7,036,918 | 6,977,746 | 6,970,264 | 7,068,389 | 7,093,991 | 7,190,491 |
| 10/901,154 | 10/932,044 | 10/962,412 | 7,177,054 | 10/962,552 | 10/965,733 | 10/965,933 |
| 10/974,742 | 10/982,974 | 7,180,609 | 10/986,375 | 11/107,817 | 7,292,363 | 11/149,160 |
| 11/206,756 | 11/250,465 | 7,202,959 | 11/653,219 | 11/706,309 | 11/730,389 | 11/730,392 |
| 60/953,443 | 11/866,387 | 60/974,077 | 6,982,798 | 6,870,966 | 6,870,966 | 6,822,639 |
| 6,822,639 | 6,474,888 | 6,627,870 | 6,724,374 | 6,788,982 | 7,263,270 | 6,788,293 |
| 6,946,672 | 6,737,591 | 6,737,591 | 7,091,960 | 09/693,514 | 6,792,165 | 7,105,753 |
| 6,795,593 | 6,980,704 | 6,768,821 | 7,132,612 | 7,041,916 | 6,797,895 | 7,015,901 |
| 7,289,882 | 7,148,644 | 10/778,056 | 10/778,058 | 10/778,060 | 10/778,059 | 10/778,063 |
| 10/778,062 | 10/778,061 | 10/778,057 | 7,096,199 | 7,286,887 | 10/917,467 | 10/917,466 |
| 7,324,859 | 7,218,978 | 7,245,294 | 7,277,085 | 7,187,370 | 10/917,436 | 10/943,856 |
| 10/919,379 | 7,019,319 | 10/943,878 | 10/943,849 | 7,043,096 | 7,148,499 | 11/144,840 |
| 11/155,556 | 11/155,557 | 11/193,481 | 11/193,435 | 11/193,482 | 11/193,479 | 7,336,267 |
| 11/281,671 | 11/298,474 | 7,245,760 | 11/488,832 | 11/495,814 | 11/495,823 | 11/495,822 |
| 11/495,821 | 11/495,820 | 11/653,242 | 11/754,370 | 60/911,260 | 11/829,936 | 11/839,494 |
| 11/866,305 | 11/866,313 | 11/866,324 | 11/866,336 | 11/866,348 | 11/866,359 | 11/970,951 |
| 12/036,264 | 7,055,739 | 7,055,739 | 7,233,320 | 7,233,320 | 6,830,196 | 6,830,196 |
| 6,832,717 | 6,832,717 | 7,182,247 | 7,120,853 | 7,082,562 | 6,843,420 | 10/291,718 |
| 6,789,731 | 7,057,608 | 6,766,944 | 6,766,945 | 7,289,103 | 10/291,559 | 7,299,969 |
| 7,264,173 | 10/409,864 | 7,108,192 | 10/537,159 | 7,111,791 | 7,077,333 | 6,983,878 |
| 10/786,631 | 7,134,598 | 10/893,372 | 6,929,186 | 6,994,264 | 7,017,826 | 7,014,123 |
| 7,134,601 | 7,150,396 | 10/971,146 | 7,017,823 | 7,025,276 | 7,284,701 | 7,080,780 |
| 11/074,802 | 7,334,739 | 11/749,158 | 11/842,948 | 12/015,477 | 12/025,746 | 12/025,747 |
| 12/025,748 | 12/025,749 | 12/025,750 | 12/025,751 | 12/025,762 | 12/025,756 | 12/025,757 |
| 12/025,759 | 12/025,760 | 12/025,761 | 12/025,762 | 12/025,764 | 12/025,765 | 12/025,766 |
| 12/025,767 | 12/025,768 | 10/492,169 | 10/492,152 | 10/492,168 | 10/492,161 | 7,308,148 |
| 10/502,575 | 10/531,229 | 10/683,151 | 10/531,733 | 10/683,040 | 10/510,391 | 10/919,260 |
| 10/510,392 | 10/778,090 | 11/944,404 | 11/936,638 | 12/031,615 | 6,957,768 | 6,957,768 |
| 09/575,172 | 09/575,172 | 7,170,499 | 7,170,499 | 7,106,888 | 7,106,888 | 7,123,239 |

-continued

| | | | | | | |
|---|---|---|---|---|---|---|
| 7,123,239 | 6,982,701 | 6,982,703 | 7,227,527 | 6,786,397 | 6,947,027 | 6,975,299 |
| 7,139,431 | 7,048,178 | 7,118,025 | 6,839,053 | 7,015,900 | 7,010,147 | 7,133,557 |
| 6,914,593 | 10/291,546 | 6,938,826 | 7,278,566 | 7,123,245 | 6,992,662 | 7,190,346 |
| 11/074,800 | 11/074,782 | 11/074,777 | 11/075,917 | 7,221,781 | 11/102,843 | 7,213,756 |
| 11/188,016 | 7,180,507 | 7,263,225 | 7,287,688 | 11/737,094 | 11/753,570 | 11/782,596 |
| 11/865,711 | 12,036,904 | 11,856,061 | 11,856,062 | 11,856,064 | 11,856,066 | 11/672,522 |
| 11/672,950 | 11/672,947 | 11/672,891 | 11/672,954 | 11/672,533 | 11/754,310 | 11/754,321 |
| 11/754,320 | 11/754,319 | 11/754,318 | 11/754,317 | 11/754,316 | 11/754,315 | 11/754,314 |
| 11/754,313 | 11/754,312 | 11/754,311 | 12,015,507 | 12,015,508 | 12,015,509 | 12,015,510 |
| 12,015,511 | 12,015,512 | 12,015,513 | 6,593,166 | 7,132,679 | 6,940,088 | 7,119,357 |
| 7,307,272 | 6,755,513 | 6,974,204 | 6,409,323 | 7,055,930 | 6,281,912 | 6,893,109 |
| 6,604,810 | 6,824,242 | 6,318,920 | 7,210,867 | 6,488,422 | 6,655,786 | 6,457,810 |
| 6,485,135 | 6,796,731 | 6,904,678 | 6,641,253 | 7,125,106 | 6,786,658 | 7,097,273 |
| 6,824,245 | 7,222,947 | 6,918,649 | 6,860,581 | 6,929,351 | 7,063,404 | 6,969,150 |
| 7,004,652 | 6,871,938 | 6,905,194 | 6,846,059 | 6,997,626 | 7,303,256 | 7,029,098 |
| 6,966,625 | 7,114,794 | 7,207,646 | 7,077,496 | 7,284,831 | 11/072,529 | 7,152,938 |
| 7,182,434 | 7,182,430 | 7,306,317 | 7,032,993 | 7,325,905 | 11/155,545 | 11/144,813 |
| 7,172,266 | 7,258,430 | 7,128,392 | 7,210,866 | 7,306,322 | 11/505,933 | 11/540,727 |
| 11/635,480 | 11/707,946 | 11/706,303 | 11/709,084 | 11/730,776 | 11/744,143 | 11/779,845 |
| 11/782,589 | 11/863,256 | 11/940,302 | 11/940,235 | 11,955,359 | 12,019,583 | 12,019,566 |
| 12,036,910 | 11/066,161 | 11/066,160 | 11/066,159 | 11/066,158 | 7,287,831 | 11/875,936 |
| 12/017,818 | 6,804,030 | 6,807,315 | 6,771,811 | 6,683,996 | 7,271,936 | 7,304,771 |
| 6,965,691 | 7,058,219 | 7,289,681 | 7,187,807 | 7,181,063 | 11/338,783 | 11/603,823 |
| 11/650,536 | 12,025,633 | 10/727,181 | 10/727,162 | 10/727,163 | 10/727,245 | 7,121,639 |
| 7,165,824 | 7,152,942 | 10/727,157 | 7,181,572 | 7,096,137 | 7,302,592 | 7,278,034 |
| 7,188,282 | 10/727,159 | 10/727,180 | 10/727,179 | 10/727,192 | 10/727,274 | 10/727,164 |
| 10/727,161 | 10/727,198 | 10/727,158 | 10/754,536 | 10/754,938 | 10/727,227 | 10/727,160 |
| 10/934,720 | 7,171,323 | 7,278,697 | 11/442,131 | 11/474,278 | 11/488,853 | 7,328,115 |
| 11,749,750 | 11/749,749 | 11,955,127 | 11,951,213 | 10/296,522 | 6,795,215 | 7,070,098 |
| 7,154,638 | 6,805,419 | 6,859,289 | 6,977,751 | 6,398,332 | 6,394,573 | 6,622,923 |
| 6,747,760 | 6,921,144 | 10/884,881 | 7,092,112 | 7,192,106 | 11/039,866 | 7,173,739 |
| 6,986,560 | 7,008,033 | 11/148,237 | 7,222,780 | 7,270,391 | 7,150,510 | 11/478,599 |
| 11/499,749 | 11/521,388 | 11/738,518 | 11/482,981 | 11/743,662 | 11/743,661 | 11/743,659 |
| 11/743,655 | 11/743,657 | 11/752,900 | 11,926,109 | 11/927,163 | 11,929,567 | 7,195,328 |
| 7,182,422 | 11/650,537 | 11/712,540 | 10/854,521 | 10/854,522 | 10/854,488 | 7,281,330 |
| 10/854,503 | 10/854,504 | 10/854,509 | 7,188,928 | 7,093,989 | 10/854,497 | 10/854,495 |
| 10/854,498 | 10/854,511 | 10/854,512 | 10/854,525 | 10/854,526 | 10/854,516 | 7,252,353 |
| 10/854,515 | 7,267,417 | 10/854,505 | 10/854,493 | 7,275,805 | 7,314,261 | 10/854,490 |
| 7,281,777 | 7,290,852 | 10/854,528 | 10/854,523 | 10/854,527 | 10/854,524 | 10/854,520 |
| 10/854,514 | 10/854,519 | 10/854,513 | 10/854,499 | 10/854,501 | 7,266,661 | 7,243,193 |
| 10/854,518 | 10/854,517 | 10/934,628 | 7,163,345 | 7,322,666 | 11/601,757 | 11/706,295 |
| 11/735,881 | 11,748,483 | 11,749,123 | 11/766,061 | 11,775,135 | 11,772,235 | 11/778,569 |
| 11/829,942 | 11/870,342 | 11,935,274 | 11/937,239 | 11,961,907 | 11,961,940 | 11,961,961 |
| 11/014,731 | D529081 | D541848 | D528597 | 6,924,907 | 6,712,452 | 6,416,160 |
| 6,238,043 | 6,958,826 | 6,812,972 | 6,553,459 | 6,967,741 | 6,956,669 | 6,903,766 |
| 6,804,026 | 7,259,889 | 6,975,429 | 10/636,234 | 10/636,233 | 7,301,567 | 10/636,216 |
| 7,274,485 | 7,139,084 | 7,173,735 | 7,068,394 | 7,286,182 | 7,086,644 | 7,250,977 |
| 7,146,281 | 7,023,567 | 7,136,183 | 7,083,254 | 6,796,651 | 7,061,643 | 7,057,758 |
| 6,894,810 | 6,995,871 | 7,085,010 | 7,092,126 | 7,123,382 | 7,061,650 | 10/853,143 |
| 6,986,573 | 6,974,212 | 7,307,756 | 7,173,737 | 10/954,168 | 7,246,868 | 11/065,357 |
| 7,137,699 | 11/107,798 | 7,148,994 | 7,077,497 | 11/176,372 | 7,248,376 | 11/225,158 |
| 7,306,321 | 7,173,729 | 11/442,132 | 11/478,607 | 11/503,085 | 11/545,502 | 11/583,943 |
| 11/585,946 | 11/653,239 | 11/653,238 | 11/764,781 | 11/764,782 | 11/779,884 | 11,845,666 |
| 11/872,637 | 11/944,401 | 11/940,215 | 11/544,764 | 11/544,765 | 11/544,772 | 11/544,773 |
| 11/544,774 | 11/544,775 | 11/544,776 | 11/544,766 | 11/544,767 | 11/544,771 | 11/544,770 |
| 11/544,769 | 11/544,777 | 11/544,768 | 11/544,763 | 11/293,804 | 11/293,840 | 11/293,803 |
| 11/293,833 | 11/293,834 | 11/293,835 | 11/293,836 | 11/293,837 | 11/293,792 | 11/293,794 |
| 11/293,839 | 11/293,826 | 11/293,829 | 11/293,830 | 11/293,827 | 11/293,828 | 7,270,494 |
| 11/293,823 | 11/293,824 | 11/293,831 | 11/293,815 | 11/293,819 | 11/293,818 | 11/293,817 |
| 11/293,816 | 11/838,875 | 11/482,978 | 11/640,356 | 11/640,357 | 11/640,358 | 11/640,359 |
| 11/640,360 | 11/640,355 | 11/679,786 | 11/872,714 | 10/760,254 | 10/760,210 | 10/760,202 |
| 7,201,468 | 10/760,198 | 10/760,249 | 7,234,802 | 7,303,255 | 7,287,846 | 7,156,511 |
| 10/760,264 | 7,258,432 | 7,097,291 | 10/760,222 | 10/760,248 | 7,083,273 | 10/760,192 |
| 10/760,203 | 10/760,204 | 10/760,205 | 10/760,206 | 10/760,267 | 10/760,270 | 7,198,352 |
| 10/760,271 | 7,303,251 | 7,201,470 | 7,121,655 | 7,293,861 | 7,232,208 | 7,328,985 |
| 10/760,261 | 7,083,272 | 7,261,400 | 11/474,272 | 11/474,315 | 7,311,387 | 11/583,874 |
| 7,303,258 | 11/706,322 | 11/706,968 | 11/749,119 | 11,749,157 | 11/779,848 | 11/782,590 |
| 11/855,152 | 11,855,151 | 11/870,327 | 11/934,780 | 11/935,992 | 11,951,193 | 12/017,327 |
| 12,015,273 | 12,036,882 | 11/014,764 | 11/014,763 | 7,331,663 | 11/014,747 | 7,328,973 |
| 11/014,760 | 11/014,757 | 7,303,252 | 7,249,822 | 11/014,762 | 7,311,382 | 11/014,723 |
| 11/014,756 | 11/014,736 | 11/014,759 | 11/014,758 | 11/014,725 | 7,331,660 | 11/014,738 |
| 11/014,737 | 7,322,684 | 7,322,685 | 7,311,381 | 7,270,405 | 7,303,268 | 11/014,735 |
| 11/014,734 | 11/014,719 | 11/014,750 | 11/014,749 | 7,249,833 | 11/758,640 | 11/775,143 |
| 11/838,877 | 11,944,453 | 11/944,633 | 11,955,065 | 12/003,952 | 12,007,818 | 12,007,817 |
| 12,071,081 | 11/014,769 | 11/014,729 | 7,331,661 | 11/014,733 | 7,300,140 | 11/014,755 |
| 11/014,765 | 11/014,766 | 11/014,740 | 11/284,816 | 7,284,845 | 7,255,430 | 11/014,744 |
| 7,328,984 | 11/014,768 | 7,322,671 | 11/014,718 | 11/014,717 | 11/014,716 | 11/014,732 |
| 11/014,742 | 11/097,268 | 11/097,185 | 11/097,184 | 11/778,567 | 11,852,958 | 11,852,907 |
| 11/872,038 | 11,955,093 | 11,961,578 | 12,022,023 | 12,023,000 | 12,023,018 | 12,031,582 |
| 12,043,708 | 11/293,820 | 11/293,813 | 11/293,822 | 11/293,812 | 11/293,821 | 11/293,814 |

-continued

| | | | | | | |
|---|---|---|---|---|---|---|
| 11/293,793 | 11/293,842 | 11/293,811 | 11/293,807 | 11/293,806 | 11/293,805 | 11/293,810 |
| 11/688,863 | 11/688,864 | 11/688,865 | 11/688,866 | 11/688,867 | 11/688,868 | 11/688,869 |
| 11/688,871 | 11/688,872 | 11/688,873 | 11/741,766 | 12,014,767 | 12,014,768 | 12,014,769 |
| 12,014,770 | 12,014,771 | 12,014,772 | 12,014,773 | 12,014,774 | 12,014,775 | 12,014,776 |
| 12,014,777 | 12,014,778 | 12,014,779 | 12,014,780 | 12,014,781 | 12,014,782 | 12,014,783 |
| 12,014,784 | 12,014,785 | 12,014,787 | 12,014,788 | 12,014,789 | 12,014,790 | 12,014,791 |
| 12,014,792 | 12,014,793 | 12,014,794 | 12,014,796 | 12,014,798 | 12,014,801 | 12,014,803 |
| 12,014,804 | 12,014,805 | 12,014,806 | 12,014,807 | 61,034,147 | 11/482,982 | 11/482,983 |
| 11/482,984 | 11/495,818 | 11/495,819 | 11/677,049 | 11/677,050 | 11/677,051 | 11/872,719 |
| 11/872,718 | 61,033,357 | 7,306,320 | 11/934,781 | D528156 | 10/760,180 | 7,111,935 |
| 10/760,213 | 10/760,219 | 10/760,237 | 7,261,482 | 10/760,220 | 7,002,664 | 10/760,252 |
| 10/760,265 | 7,088,420 | 11/446,233 | 11/503,083 | 11/503,081 | 11/516,487 | 11/599,312 |
| 6,364,451 | 6,533,390 | 6,454,378 | 7,224,478 | 6,559,969 | 6,896,362 | 7,057,760 |
| 6,982,799 | 11/202,107 | 11/743,672 | 11/744,126 | 11/743,673 | 7,093,494 | 7,143,652 |
| 7,089,797 | 7,159,467 | 7,234,357 | 7,124,643 | 7,121,145 | 7,089,790 | 7,194,901 |
| 6,968,744 | 7,089,798 | 7,240,560 | 7,137,302 | 11/442,177 | 7,171,855 | 7,260,995 |
| 7,260,993 | 7,165,460 | 7,222,538 | 7,258,019 | 11/543,047 | 7,258,020 | 11/604,324 |
| 7,334,480 | 11/706,305 | 11/707,056 | 11/744,211 | 11/767,526 | 11/779,846 | 11/764,227 |
| 11/829,943 | 11/829,944 | 12,015,390 | 12,031,475 | 6,454,482 | 6,808,330 | 6,527,365 |
| 6,474,773 | 6,550,997 | 7,093,923 | 6,957,923 | 7,131,724 | 10/949,288 | 7,168,867 |
| 7,125,098 | 11/706,966 | 11/185,722 | 7,249,901 | 7,188,930 | 11/014,728 | 11/014,727 |
| D536031 | D531214 | 7,237,888 | 7,168,654 | 7,201,272 | 6,991,098 | 7,217,051 |
| 6,944,970 | 10/760,215 | 7,108,434 | 10/760,257 | 7,210,407 | 7,186,042 | 10/760,266 |
| 6,920,704 | 7,217,049 | 10/760,214 | 10/760,260 | 7,147,102 | 7,287,828 | 7,249,838 |
| 10/760,241 | 10/962,413 | 10/962,427 | 7,261,477 | 7,225,739 | 10/962,402 | 10/962,425 |
| 10/962,428 | 7,191,978 | 10/962,426 | 10/962,409 | 10/962,417 | 10/962,403 | 7,163,287 |
| 7,258,415 | 7,322,677 | 7,258,424 | 10/962,410 | 7,195,412 | 7,207,670 | 7,270,401 |
| 7,220,072 | 11/474,267 | 11/544,547 | 11/585,925 | 11/593,000 | 11/706,298 | 11/706,296 |
| 11/706,327 | 11/730,760 | 11/730,407 | 11/730,787 | 11/735,977 | 11/736,527 | 11/753,566 |
| 11/754,359 | 11/778,061 | 11/765,398 | 11/778,556 | 11/829,937 | 11/780,470 | 11/866,399 |
| 11/223,262 | 11/223,018 | 11/223,114 | 11/955,366 | 7,322,761 | 11/223,021 | 11/223,020 |
| 11/223,019 | 11/014,730 | D541849 | 29/279,123 | 6,716,666 | 6,949,217 | 6,750,083 |
| 7,014,451 | 6,777,259 | 6,923,524 | 6,557,978 | 6,991,207 | 6,766,998 | 6,967,354 |
| 6,759,723 | 6,870,259 | 10/853,270 | 6,925,875 | 10/898,214 | 7,095,109 | 7,145,696 |
| 10/976,081 | 7,193,482 | 7,134,739 | 7,222,939 | 7,164,501 | 7,118,186 | 7,201,523 |
| 7,226,159 | 7,249,839 | 7,108,343 | 7,154,626 | 7,079,292 | 10/980,184 | 7,233,421 |
| 7,063,408 | 10/983,082 | 10/982,804 | 7,032,996 | 10/982,834 | 10/982,833 | 10/982,817 |
| 7,217,046 | 6,948,870 | 7,195,336 | 7,070,257 | 10/986,813 | 10/986,785 | 7,093,922 |
| 6,988,789 | 10/986,788 | 7,246,871 | 10/992,748 | 10/992,747 | 7,187,468 | 10/992,828 |
| 7,196,814 | 10/992,754 | 7,268,911 | 7,265,869 | 7,128,384 | 7,164,505 | 7,284,805 |
| 7,025,434 | 7,298,519 | 7,280,244 | 7,206,098 | 7,265,877 | 7,193,743 | 7,168,777 |
| 11/006,734 | 7,195,329 | 7,198,346 | 7,281,786 | 11/013,363 | 11/013,881 | 6,959,983 |
| 7,128,386 | 7,097,104 | 11/013,636 | 7,083,261 | 7,070,258 | 7,083,275 | 7,110,139 |
| 6,994,419 | 6,935,725 | 11/026,046 | 7,178,892 | 7,219,429 | 6,988,784 | 11/026,135 |
| 7,289,156 | 11/064,005 | 7,284,976 | 7,178,903 | 7,273,274 | 7,083,256 | 7,325,986 |
| 7,278,707 | 7,325,918 | 6,974,206 | 11/064,004 | 7,066,588 | 7,222,940 | 11/075,918 |
| 7,018,025 | 7,221,867 | 7,290,863 | 7,188,938 | 7,021,742 | 7,083,262 | 7,192,119 |
| 11/083,021 | 7,036,912 | 7,175,256 | 7,182,441 | 7,083,258 | 7,114,796 | 7,147,302 |
| 11/084,757 | 7,219,982 | 7,118,195 | 7,229,153 | 6,991,318 | 7,108,346 | 11/248,429 |
| 11/239,031 | 7,178,899 | 7,066,579 | 11/281,419 | 20,060,087,544 | 11/329,188 | 11/329,140 |
| 7,270,397 | 7,258,425 | 7,237,874 | 7,152,961 | 7,333,235 | 7,207,658 | 11/484,744 |
| 7,311,257 | 7,207,659 | 11/525,857 | 11/540,569 | 11/583,869 | 11/592,985 | 11/585,947 |
| 7,306,307 | 11/604,316 | 11/604,309 | 11/604,303 | 11/643,844 | 7,329,061 | 11/655,940 |
| 11/653,320 | 7,278,713 | 11/706,381 | 11/706,323 | 11/706,963 | 11/713,660 | 7,290,853 |
| 11/696,186 | 11/730,390 | 11/737,139 | 11/737,749 | 11/740,273 | 11/749,122 | 11/754,361 |
| 11/766,043 | 11/764,775 | 11/768,872 | 11/775,156 | 11/779,271 | 11/779,272 | 11/829,938 |
| 11/839,502 | 11/858,852 | 11/862,188 | 11/859,790 | 11/872,618 | 11/923,651 | 11/950,255 |
| 11/930,001 | 11/955,362 | 12,015,368 | 11/965,718 | 6,485,123 | 6,425,657 | 6,488,358 |
| 7,021,746 | 6,712,986 | 6,981,757 | 6,505,912 | 6,439,694 | 6,364,461 | 6,378,990 |
| 6,425,658 | 6,488,361 | 6,814,429 | 6,471,336 | 6,457,813 | 6,540,331 | 6,454,396 |
| 6,464,325 | 6,443,559 | 6,435,664 | 6,412,914 | 6,488,360 | 6,550,896 | 6,439,695 |
| 6,447,100 | 09/900,160 | 6,488,359 | 6,637,873 | 10/485,738 | 6,618,117 | 10/485,737 |
| 6,803,989 | 7,234,801 | 7,044,589 | 7,163,273 | 6,416,154 | 6,547,364 | 10/485,744 |
| 6,644,771 | 7,152,939 | 6,565,181 | 7,325,897 | 6,857,719 | 7,255,414 | 6,702,417 |
| 7,284,843 | 6,918,654 | 7,070,265 | 6,616,271 | 6,652,078 | 6,503,408 | 6,607,263 |
| 7,111,924 | 6,623,108 | 6,698,867 | 6,488,362 | 6,625,874 | 6,921,153 | 7,198,356 |
| 6,536,874 | 6,425,651 | 6,435,667 | 10/509,997 | 6,527,374 | 7,334,873 | 6,582,059 |
| 10/510,152 | 6,513,908 | 7,246,883 | 6,540,332 | 6,547,368 | 7,070,256 | 6,508,546 |
| 10/510,151 | 6,679,584 | 7,303,254 | 6,857,724 | 10/509,998 | 6,652,052 | 10/509,999 |
| 6,672,706 | 10/510,096 | 6,688,719 | 6,712,924 | 6,588,886 | 7,077,508 | 7,207,654 |
| 6,935,724 | 6,927,786 | 6,988,787 | 6,899,415 | 6,672,708 | 6,644,767 | 6,874,866 |
| 6,830,316 | 6,994,420 | 6,954,254 | 7,086,720 | 7,240,992 | 7,267,424 | 7,128,397 |
| 7,084,951 | 7,156,496 | 7,066,578 | 7,101,023 | 11/165,027 | 11/202,235 | 11/225,157 |
| 7,159,965 | 7,255,424 | 11/349,519 | 7,137,686 | 7,201,472 | 7,287,829 | 11/504,602 |
| 7,216,957 | 11/520,572 | 11/583,858 | 11/583,895 | 11/585,976 | 11/635,488 | 7,278,712 |
| 11/706,952 | 11/706,307 | 7,287,827 | 11/944,451 | 11/740,287 | 11/754,367 | 11/758,643 |
| 11/778,572 | 11/859,791 | 11/863,260 | 11/874,178 | 11/936,064 | 11/951,983 | 12,015,483 |
| 6,916,082 | 6,786,570 | 10/753,478 | 6,848,780 | 6,966,633 | 7,179,395 | 6,969,153 |
| 6,979,075 | 7,132,056 | 6,832,828 | 6,860,590 | 6,905,620 | 6,786,574 | 6,824,252 |
| 7,097,282 | 6,997,545 | 6,971,734 | 6,918,652 | 6,978,990 | 6,863,105 | 10/780,624 |

-continued

| | | | | | | |
|---|---|---|---|---|---|---|
| 7,194,629 | 10/791,792 | 6,890,059 | 6,988,785 | 6,830,315 | 7,246,881 | 7,125,102 |
| 7,028,474 | 7,066,575 | 6,986,202 | 7,044,584 | 7,210,762 | 7,032,992 | 7,140,720 |
| 7,207,656 | 7,285,170 | 11/048,748 | 7,008,041 | 7,011,390 | 7,048,868 | 7,014,785 |
| 7,131,717 | 7,284,826 | 7,331,101 | 7,182,436 | 7,104,631 | 7,240,993 | 7,290,859 |
| 11/202,217 | 7,172,265 | 7,284,837 | 7,066,573 | 11/298,635 | 7,152,949 | 7,334,877 |
| 11/442,133 | 7,326,357 | 7,156,492 | 11/478,588 | 7,331,653 | 7,287,834 | 11/525,861 |
| 11/583,939 | 11/545,504 | 7,284,326 | 11/635,485 | 11/730,391 | 11/730,788 | 11/749,148 |
| 11/749,149 | 11/749,152 | 11/749,151 | 11/759,886 | 11/865,668 | 11/874,168 | 11/874,203 |
| 11,971,182 | 12,021,086 | 12,015,441 | 11,965,722 | 6,824,257 | 7,270,475 | 6,971,811 |
| 6,878,564 | 6,921,145 | 6,890,052 | 7,021,747 | 6,929,345 | 6,811,242 | 6,916,087 |
| 6,905,195 | 6,899,416 | 6,883,906 | 6,955,428 | 7,284,834 | 6,932,459 | 6,962,410 |
| 7,033,008 | 6,962,409 | 7,013,641 | 7,204,580 | 7,032,997 | 6,998,278 | 7,004,563 |
| 6,910,755 | 6,969,142 | 6,938,994 | 7,188,935 | 10/959,049 | 7,134,740 | 6,997,537 |
| 7,004,567 | 6,916,091 | 7,077,588 | 6,918,707 | 6,923,583 | 6,953,295 | 6,921,221 |
| 7,001,008 | 7,168,167 | 7,210,759 | 7,337,532 | 7,331,659 | 7,322,680 | 6,988,790 |
| 7,192,120 | 7,168,789 | 7,004,577 | 7,052,120 | 11/123,007 | 6,994,426 | 7,258,418 |
| 7,014,298 | 7,328,977 | 11/177,394 | 7,152,955 | 7,097,292 | 7,207,657 | 7,152,944 |
| 7,147,303 | 7,338,147 | 7,134,608 | 7,264,333 | 7,093,921 | 7,077,590 | 7,147,297 |
| 20,060,038,853 | 11/248,832 | 11/248,428 | 11/248,434 | 7,077,507 | 7,172,672 | 7,175,776 |
| 7,086,717 | 7,101,020 | 11/329,155 | 7,201,466 | 11/330,057 | 7,152,967 | 7,182,431 |
| 7,210,666 | 7,252,367 | 7,287,837 | 11/485,255 | 11/525,860 | 6,945,630 | 7,018,294 |
| 6,910,014 | 6,659,447 | 6,648,321 | 7,082,980 | 6,672,584 | 7,073,551 | 6,830,395 |
| 7,289,727 | 7,001,011 | 6,880,922 | 6,886,915 | 6,644,787 | 6,641,255 | 7,066,580 |
| 6,652,082 | 7,284,833 | 6,666,544 | 6,666,543 | 6,669,332 | 6,984,023 | 6,733,104 |
| 6,644,793 | 6,723,575 | 6,953,235 | 6,663,225 | 7,076,872 | 7,059,706 | 7,185,971 |
| 7,090,335 | 6,854,827 | 6,793,974 | 10/636,258 | 7,222,929 | 6,739,701 | 7,073,881 |
| 7,155,823 | 7,219,427 | 7,008,503 | 6,783,216 | 6,883,890 | 6,857,726 | 10/636,274 |
| 6,641,256 | 6,808,253 | 6,827,428 | 6,802,587 | 6,997,534 | 6,959,982 | 6,959,981 |
| 6,886,917 | 6,969,473 | 6,827,425 | 7,007,859 | 6,802,594 | 6,792,754 | 6,860,107 |
| 6,786,043 | 6,863,378 | 7,052,114 | 7,001,007 | 10/729,151 | 10/729,157 | 6,948,794 |
| 6,805,435 | 6,733,116 | 10/683,006 | 7,008,046 | 6,880,918 | 7,066,574 | 6,983,595 |
| 6,923,527 | 7,275,800 | 7,163,276 | 7,156,495 | 6,976,751 | 6,994,430 | 7,014,296 |
| 7,059,704 | 7,160,743 | 7,175,775 | 7,287,839 | 7,097,283 | 7,140,722 | 11/123,009 |
| 11/123,008 | 7,080,893 | 7,093,920 | 7,270,492 | 7,128,093 | 7,052,113 | 7,055,934 |
| 11/155,627 | 7,278,796 | 11/159,197 | 7,083,263 | 7,145,592 | 7,025,436 | 11/281,444 |
| 7,258,421 | 11/478,591 | 7,332,051 | 7,226,147 | 11/482,940 | 7,195,339 | 11/503,061 |
| 11/505,938 | 7,284,838 | 7,293,856 | 11/544,577 | 11/540,576 | 7,325,901 | 11/592,991 |
| 11/599,342 | 11/600,803 | 11/604,321 | 11/604,302 | 11/635,535 | 11/635,486 | 11/643,842 |
| 11/655,987 | 11/650,541 | 11/706,301 | 11/707,039 | 11/730,388 | 11/730,786 | 11/730,785 |
| 11/739,080 | 7,322,679 | 11/768,875 | 11/779,847 | 11/829,940 | 11/847,240 | 11/834,625 |
| 11/863,210 | 11/865,680 | 11/874,156 | 11/923,602 | 11,951,940 | 11,954,988 | 11,961,662 |
| 12,015,178 | 12,015,157 | 12/017,305 | 12,017,926 | 12,015,261 | 12,025,605 | 12,031,646 |
| 7,067,067 | 6,776,476 | 6,880,914 | 7,086,709 | 6,783,217 | 7,147,791 | 6,929,352 |
| 7,144,095 | 6,820,974 | 6,918,647 | 6,984,016 | 7,192,125 | 6,824,251 | 6,834,939 |
| 6,840,600 | 6,786,573 | 7,144,519 | 6,799,835 | 6,959,975 | 6,959,974 | 7,021,740 |
| 6,935,718 | 6,938,983 | 6,938,991 | 7,226,145 | 7,140,719 | 6,988,788 | 7,022,250 |
| 6,929,350 | 7,011,393 | 7,004,566 | 7,175,097 | 6,948,799 | 7,143,944 | 7,310,157 |
| 7,029,100 | 6,957,811 | 7,073,724 | 7,055,933 | 7,077,490 | 7,055,940 | 10/991,402 |
| 7,234,645 | 7,032,999 | 7,066,576 | 7,229,150 | 7,086,728 | 7,246,879 | 7,284,825 |
| 7,140,718 | 7,284,817 | 7,144,098 | 7,044,577 | 7,284,824 | 7,284,827 | 7,189,334 |
| 7,055,935 | 7,152,860 | 11/203,188 | 11/203,173 | 7,334,868 | 7,213,989 | 11/225,156 |
| 11/225,173 | 7,300,141 | 7,114,868 | 7,168,796 | 7,159,967 | 7,328,966 | 7,152,805 |
| 11/298,530 | 11/330,061 | 7,133,799 | 11/330,054 | 11/329,284 | 7,152,956 | 7,128,399 |
| 7,147,305 | 7,287,702 | 7,325,904 | 7,246,884 | 7,152,960 | 11/442,125 | 11/454,901 |
| 11/442,134 | 11/450,441 | 11/474,274 | 11/499,741 | 7,270,399 | 6,857,728 | 6,857,729 |
| 6,857,730 | 6,989,292 | 7,126,216 | 6,977,189 | 6,982,189 | 7,173,332 | 7,026,176 |
| 6,979,599 | 6,812,062 | 6,886,751 | 10/804,057 | 10/804,036 | 7,001,793 | 6,866,369 |
| 6,946,743 | 7,322,675 | 6,886,918 | 7,059,720 | 7,306,305 | 10/846,562 | 7,334,855 |
| 10/846,649 | 10/846,627 | 6,951,390 | 6,981,765 | 6,789,881 | 6,802,592 | 7,029,097 |
| 6,799,836 | 7,048,352 | 7,182,267 | 7,025,279 | 6,857,571 | 6,817,539 | 6,830,198 |
| 6,992,791 | 7,038,809 | 6,980,323 | 7,148,992 | 7,139,091 | 6,947,173 | 7,101,034 |
| 6,969,144 | 6,942,319 | 6,827,427 | 6,984,021 | 6,984,022 | 6,869,167 | 6,918,542 |
| 7,007,852 | 6,899,420 | 6,918,665 | 6,997,625 | 6,988,840 | 6,984,080 | 6,845,978 |
| 6,848,687 | 6,840,512 | 6,863,365 | 7,204,582 | 6,921,150 | 7,128,396 | 6,913,347 |
| 7,008,819 | 6,935,736 | 6,991,317 | 7,284,836 | 7,055,947 | 7,093,928 | 7,100,834 |
| 7,270,396 | 7,187,086 | 7,290,856 | 7,032,825 | 7,086,721 | 7,159,968 | 7,010,456 |
| 7,147,307 | 7,111,925 | 11/144,812 | 7,229,154 | 11/505,849 | 11/520,570 | 7,328,994 |
| 7,341,672 | 11/540,575 | 11/583,937 | 7,278,711 | 7,290,720 | 7,314,266 | 11/635,489 |
| 11/604,319 | 11/635,490 | 11/635,525 | 7,287,706 | 11/706,366 | 11/706,310 | 11/706,308 |
| 11/785,108 | 11/744,214 | 11/744,218 | 11/748,485 | 11/748,490 | 11/764,778 | 11/766,025 |
| 11/834,635 | 11,839,541 | 11,860,420 | 11/865,693 | 11/863,118 | 11/866,307 | 11/866,340 |
| 11/869,684 | 11/869,722 | 11/869,694 | 11/876,592 | 11/945,244 | 11,951,121 | 11/945,238 |
| 11,955,358 | 11/965,710 | 11,962,050 | 11,945,478 | 12,015,423 | 12,015,434 | 12,023,015 |
| 12,030,755 | 12,025,641 | 12,036,279 | 12,031,598 | | | |

BACKGROUND OF THE INVENTION

The Applicant has developed a wide range of printers that employ pagewidth printheads instead of traditional reciprocating printhead designs. Pagewidth designs increase print speeds as the printhead does not traverse back and forth across the page to deposit a line of an image. The pagewidth printhead simply deposits the ink on the media as it moves past at high speeds. Such printheads have made it possible to perform full colour 1600 dpi printing at speeds in the vicinity of 60 pages per minute, speeds previously unattainable with conventional inkjet printers.

Printing at these speeds consumes ink quickly and this gives rise to problems with supplying the printhead with enough ink. Not only are the flow rates higher but distributing the ink along the entire length of a pagewidth printhead is more complex than feeding ink to a relatively small reciprocating printhead.

A further problem in the ink supply system is avoiding any particulates reaching nozzles, where they may potentially block or obscure the nozzles and affect print quality. It is therefore desirable that manufacturing processes for each component of the ink supply system eliminates as far as possible any particulate deposits, which may become entrained in ink flowing through the ink supply system.

SUMMARY OF THE INVENTION

In a first aspect the present invention provides a method of fabricating an apertured polymeric film, said method comprising the steps of:
  (a) masking a polymeric film with a first mask having one or more first laser transmission zones defined therein;
  (b) laser-ablating one or more first apertures through said polymeric film using said first mask;
  (c) masking said film with a second mask having one or more second laser transmission zones defined therein, each second zone being aligned with a corresponding first aperture, and each second zone having greater perimeter dimensions than said corresponding first aperture; and
  (d) reaming said one or more first apertures by laser-ablating said polymeric film using said second mask, said reamed first apertures defining one or more second apertures in said film.

Optionally said apertured polymeric film is an adhesive polymeric film for attachment of one or more printhead integrated circuits to an ink manifold, said one or more second apertures defining one or more ink supply holes.

Optionally, said adhesive polymeric film comprises a central polymeric film sandwiched between adhesive layers.

Optionally, said central polymeric film is a polyimide film and said adhesive layers are epoxy layers.

Optionally, said film is provided in a film package, said film package comprising said adhesive polymeric film and a pair of removeable protective liners, each liner protecting a respective adhesive layer.

Optionally, said laser-ablating steps terminate in one of said protective liners.

Optionally, said laser-ablating steps drill through one of said protective liners, said adhesive layers and said central polymeric film.

Optionally, the method further comprising the step of:
  (d) replacing at least one of said protective liners with a replacement liner.

Optionally, each first aperture has perimeter dimensions about 5 to 30 microns less than predetermined perimeter dimensions of a corresponding second aperture.

Optionally, each first aperture has perimeter dimensions about 10 microns less than predetermined perimeter dimensions of a corresponding second aperture.

Optionally, each second aperture has a predetermined length dimension of up to about 500 microns and a predetermined width dimension of up to about 500 microns.

Optionally, said first apertures are lined with carbonaceous deposits and said second apertures are substantially free of said carbonaceous soot deposits.

In another aspect there is provided a film for attachment of one or more printhead integrated circuits to an ink supply manifold, said film being obtained or obtainable by the method above.

In second aspect the present invention provides a method of attaching one or more printhead integrated circuits onto an ink supply manifold, said method comprising the steps of:
  (i) providing an adhesive film having a plurality of ink supply holes defined therein;
  (ii) bonding said film to said ink supply manifold; and
  (iii) bonding said one or more printhead integrated circuits to said film;
wherein said film in step (i) is fabricated by the steps of:
  (a) providing an adhesive polymeric film;
  (b) masking said film with a first mask having a plurality of first laser transmission zones defined therein;
  (c) laser-ablating a plurality of first holes through said polymeric film using said first mask;
  (d) masking said film with a second mask having a plurality of second laser transmission zones defined therein, each second zone being aligned with a corresponding first hole, and each second zone having greater perimeter dimensions than said corresponding first hole; and
  (e) reaming said first holes by laser-ablating said polymeric film using said second mask, each reamed first hole defining an ink supply hole through said film.

Optionally, said ink supply manifold is an LCP molding.

Optionally, a plurality of said printhead integrated circuits are attached to said ink supply manifold such that they are butted end on end to provide a pagewidth printhead.

Optionally, said ink supply holes are positioned to supply ink to ink supply channels defined in a backside of said one or more printhead integrated circuits.

Optionally, said bonding steps are performed by thermal curing and/or compression.

Optionally, said ink supply holes are substantially free of carbonaceous soot deposits.

In a further aspect there is provided a printhead assembly comprising at least one printhead integrated circuit attached to an ink supply manifold, said printhead integrated circuit being attached with an adhesive film having a plurality of ink supply holes defined therein, wherein said printhead assembly is obtained or obtainable by the method above.

BRIEF DESCRIPTION OF THE DRAWINGS

Embodiments of the invention will now be described by way of example only with reference to the accompanying drawings, in which:

FIGS. 29A, 29B and 29C are schematic section views of the LCP channel molding priming with a weir;

DETAILED DESCRIPTION OF THE PREFERRED EMBODIMENTS

Overview

Figure 1:
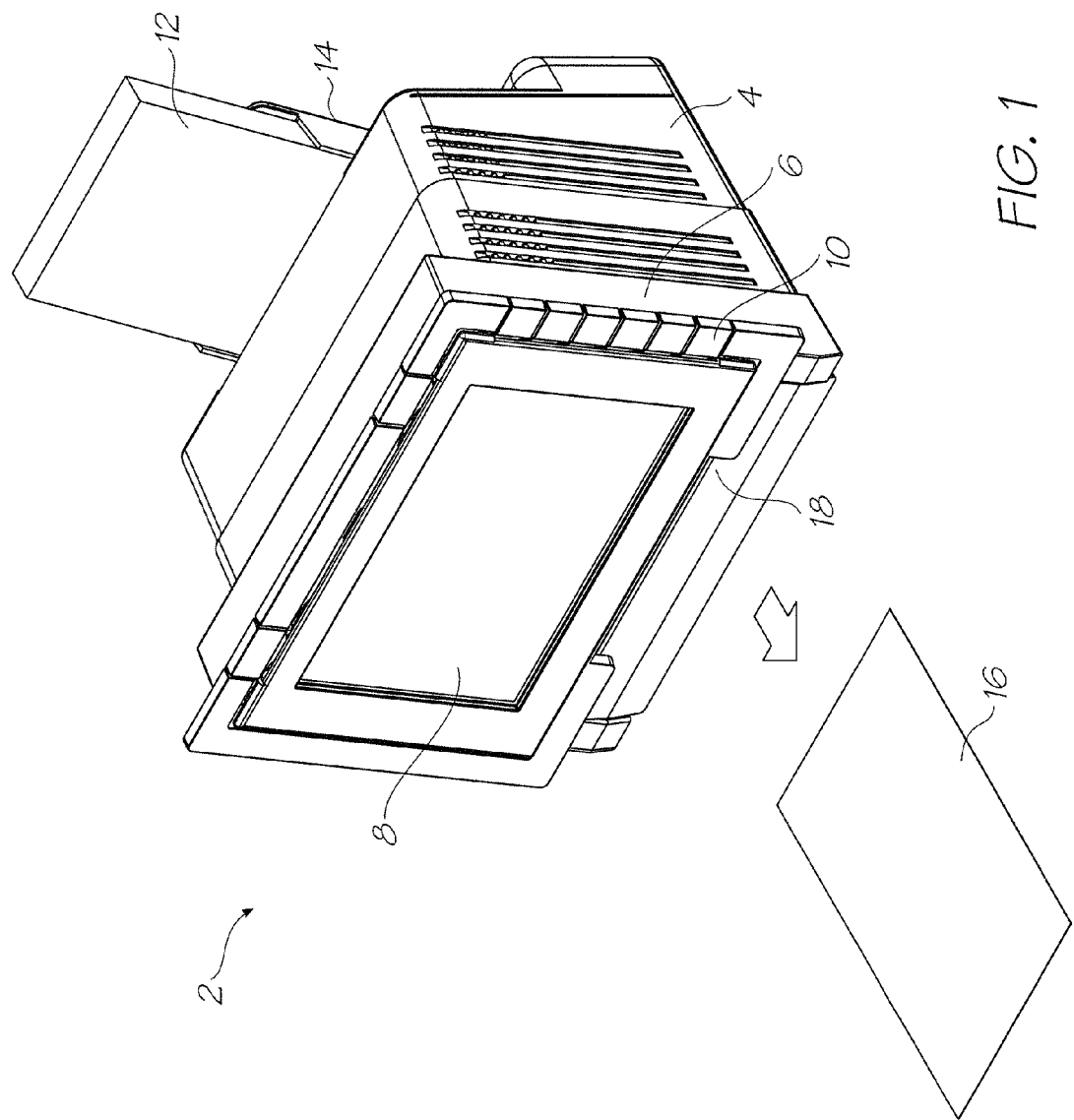
FIG. 1 is a front and side perspective of a printer embodying the present invention.

FIG. 1 shows a printer 2 embodying the present invention. The main body 4 of the printer supports a media feed tray 14 at the back and a pivoting face 6 at the front. FIG. 1 shows the pivoting face 6 closed such that the display screen 8 is its upright viewing position. Control buttons 10 extend from the sides of the screen 8 for convenient operator input while viewing the screen. To print, a single sheet is drawn from the media stack 12 in the feed tray 14 and fed past the printhead (concealed within the printer). The printed sheet 16 is delivered through the printed media outlet slot 18.

Figure 2:
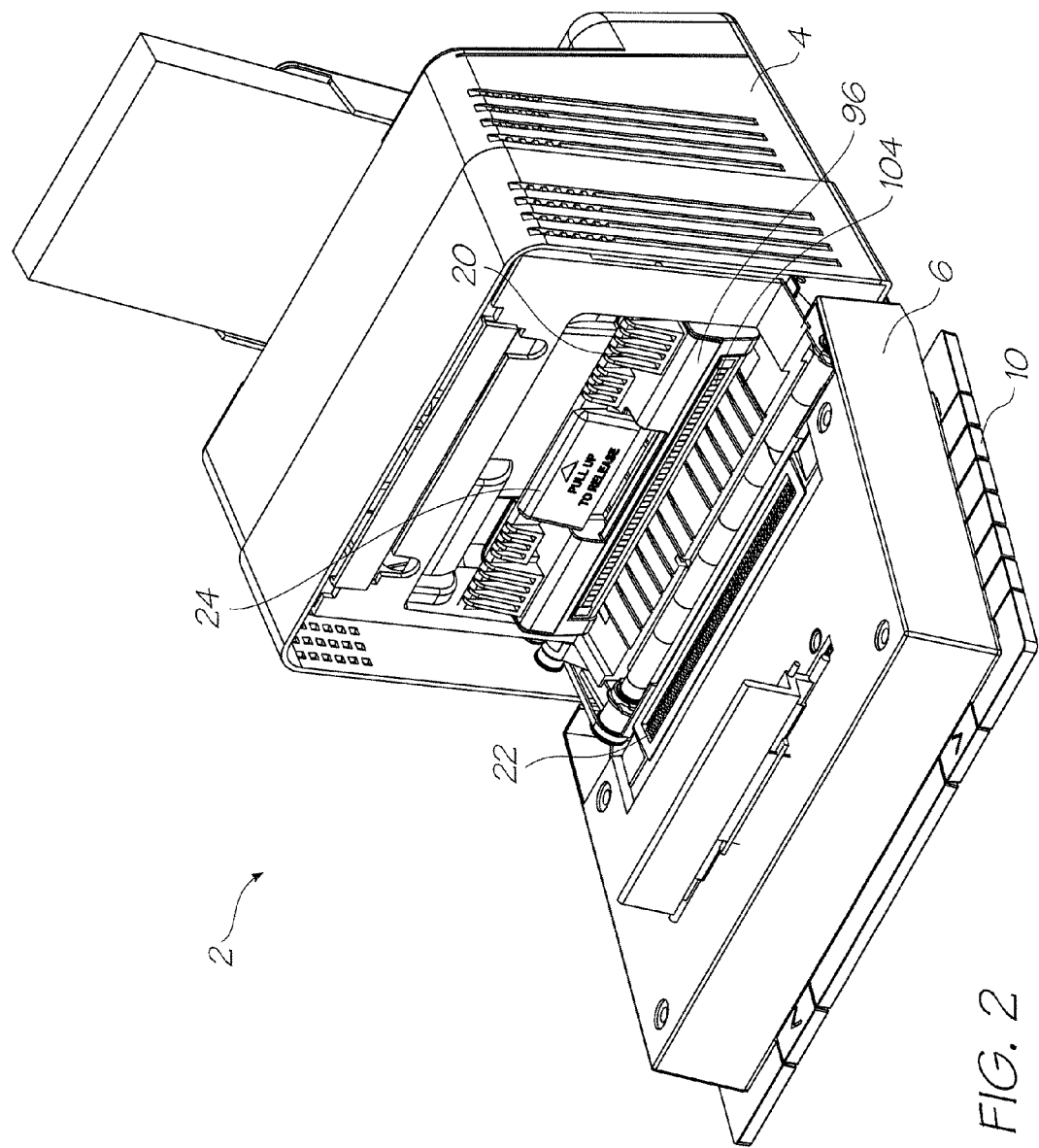
FIG. 2 shows the printer of FIG. 1 with the front face in the open position.

FIG. 2 shows the pivoting front face 6 open to reveal the interior of the printer 2. Opening the front face of the printer exposes the printhead cartridge 96 installed within. The printhead cartridge 96 is secured in position by the cartridge engagement cams 20 that push it down to ensure that the ink coupling (described later) is fully engaged and the printhead ICs (described later) are correctly positioned adjacent the paper feed path. The cams 20 are manually actuated by the release lever 24. The front face 6 will not close, and hence the printer will not operate, until the release lever 24 is pushed down to fully engage the cams. Closing the pivoting face 6 engages the printer contacts 22 with the cartridge contacts 104.

Figure 3:
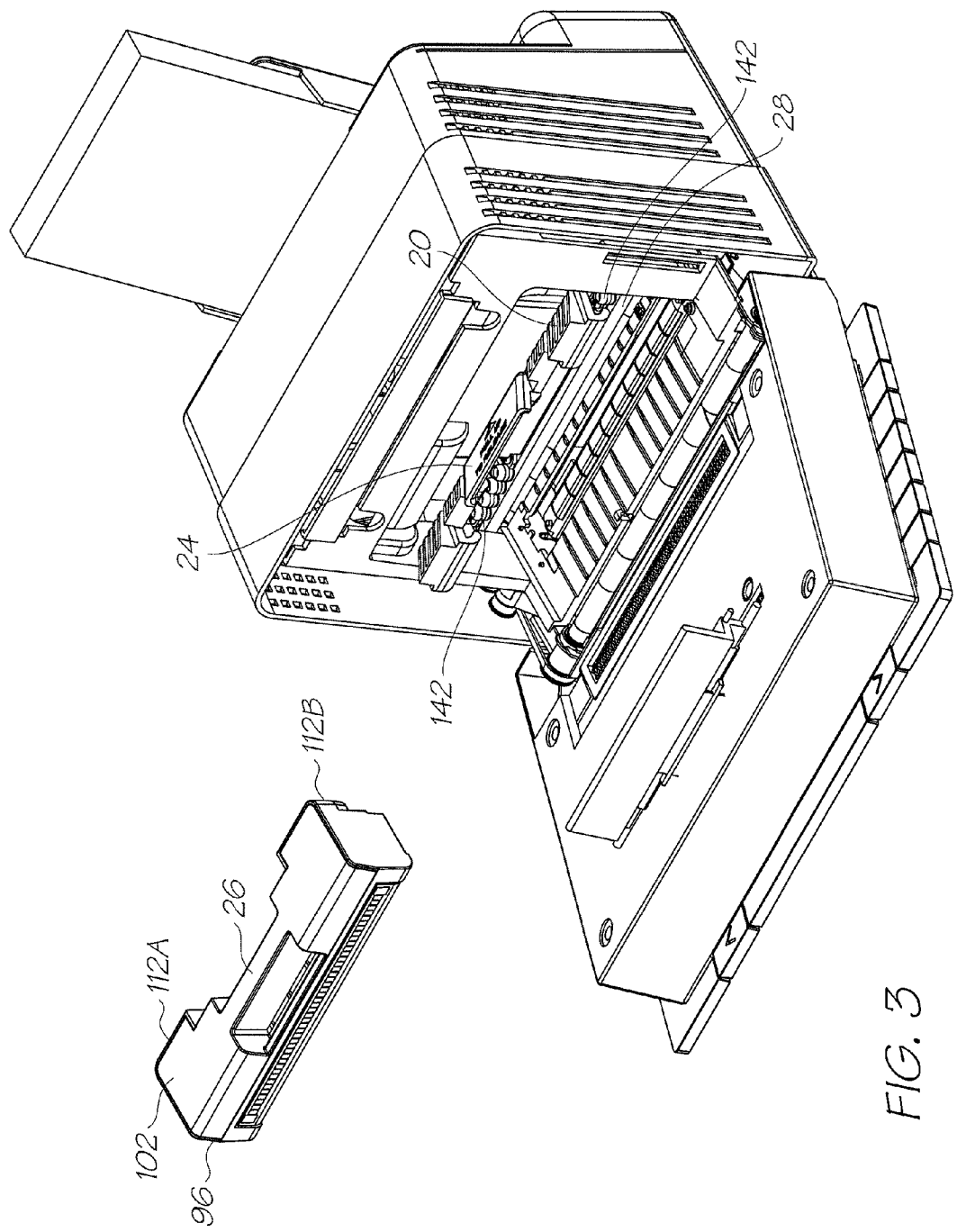
FIG. 3 shows the printer of FIG. 2 with the printhead cartridge removed.

FIG. 3 shows the printer 2 with the pivoting face 6 open and the printhead cartridge 96 removed. With the pivoting face 6 tilted forward, the user pulls the cartridge release lever 24 up to disengage the cams 20. This allows the handle 26 on the cartridge 96 to be gripped and pulled upwards. The upstream and downstream ink couplings 112A and 112B disengage from the printer conduits 142. This is described in greater detail below. To install a fresh cartridge, the process is reversed. New cartridges are shipped and sold in an unprimed condition. So to ready the printer for printing, the active fluidics system (described below) uses a downstream pump to prime the cartridge and printhead with ink.

Figure 4:
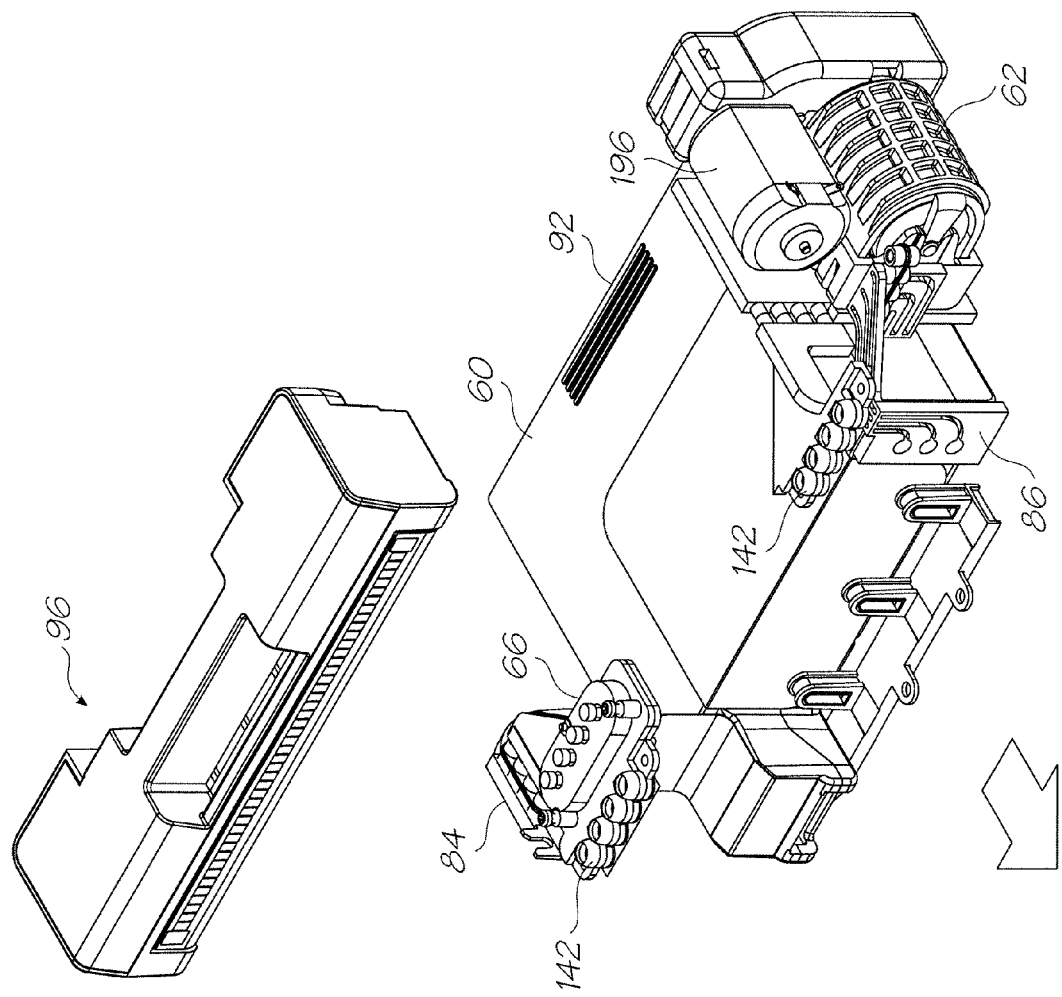
FIG. 4 shows the printer of FIG. 3 with the outer housing removed.
Figure 5:
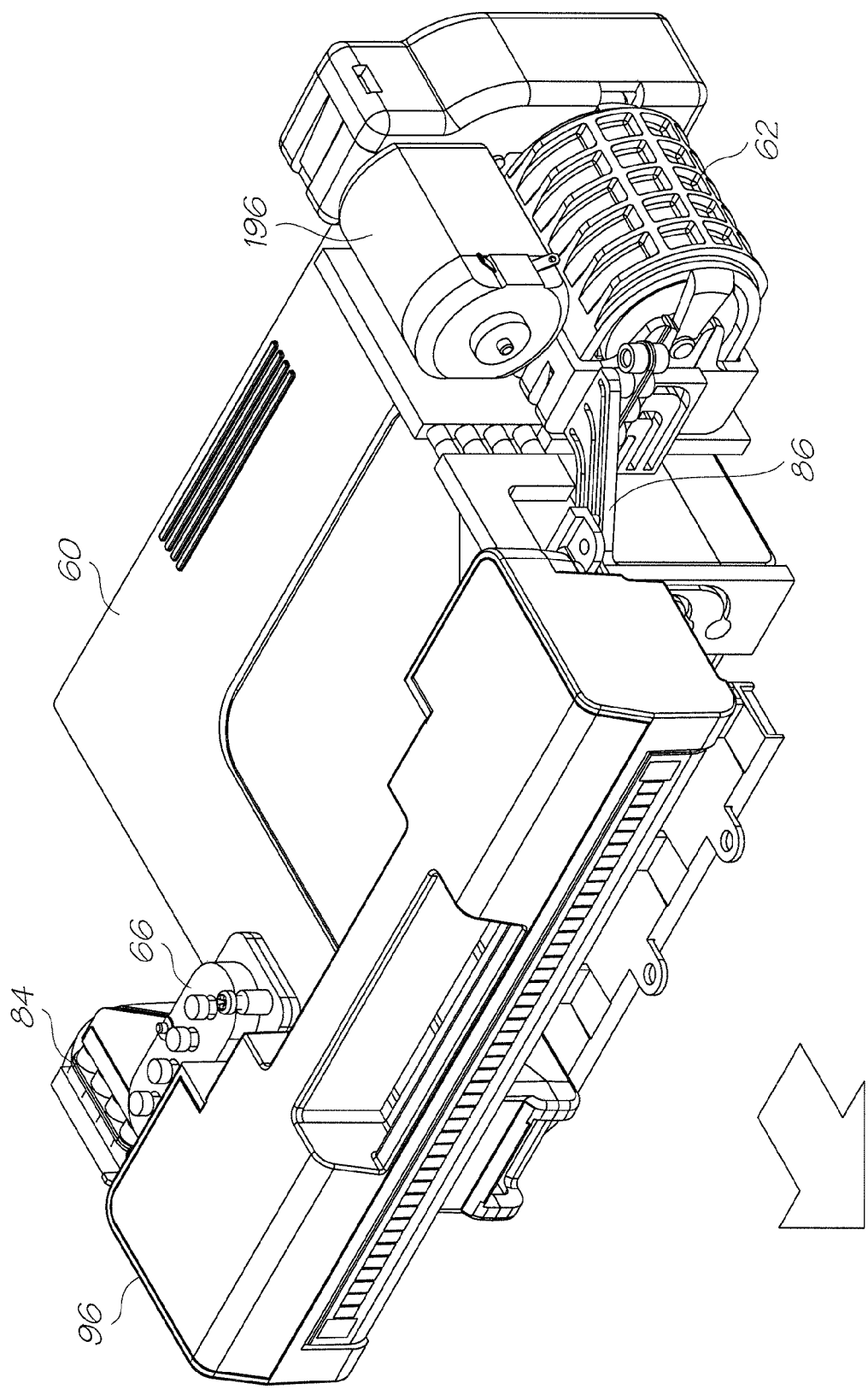
FIG. 5 shows the printer of FIG. 3 with the outer housing removed and printhead cartridge installed.

In FIG. 4, the outer casing of the printer 2 has been removed to reveal the internals. A large ink tank 60 has separate reservoirs for all four different inks. The ink tank 60 is itself a replaceable cartridge that couples to the printer upstream of the shut off valve 66 (see FIG. 6). There is also a sump 92 for ink drawn out of the cartridge 96 by the pump 62. The printer fluidics system is described in detail with reference to FIG. 6. Briefly, ink from the tank 60 flows through the upstream ink lines 84 to the shut off valves 66 and on to the printer conduits 142. As shown in FIG. 5, when the cartridge 96 is installed, the pump 62 (driven by motor 196) can draw ink into the LCP molding 64 (see FIGS. 6 and 17 to 20) so that the printhead ICs 68 (again, see FIGS. 6 and 17 to 20) prime by capillary action. Excess ink drawn by the pump 62 is fed to a sump 92 housed with the ink tanks 60.

Figure 30:
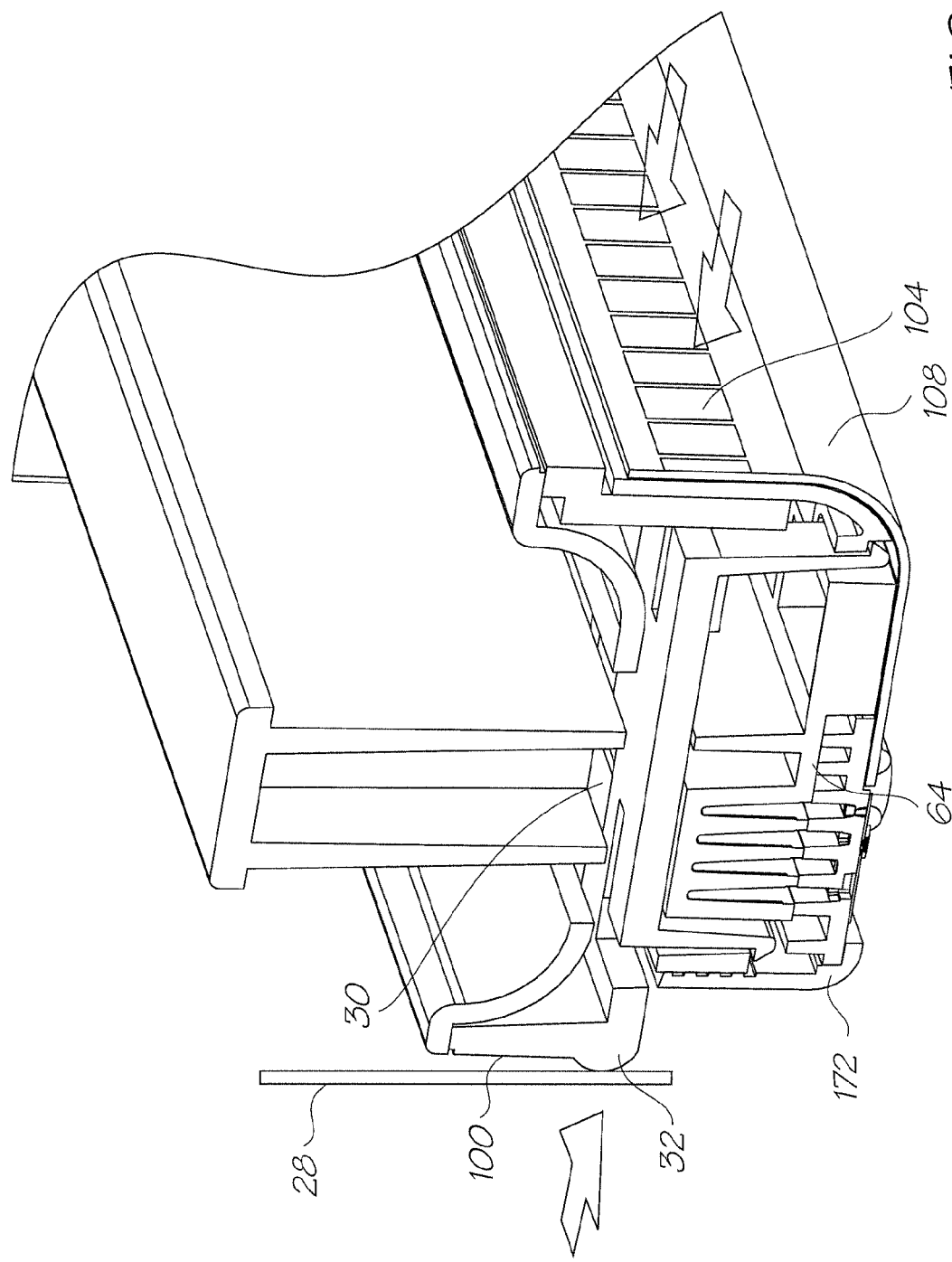
FIG. 30 in an enlarged transverse perspective of the LCP molding with the position of the contact force and the reaction force.

The total connector force between the cartridge contacts 104 and the printer contacts 22 is relatively high because of the number of contacts used. In the embodiment shown, the total contact force is 45 Newtons. This load is enough to flex and deform the cartridge. Turning briefly to FIG. 30, the internal structure of the chassis molding 100 is shown. The bearing surface 28 shown in FIG. 3 is schematically shown in FIG. 30. The compressive load of the printer contacts on the cartridge contacts 104 is represented with arrows. The reaction force at the bearing surface 28 is likewise represented with arrows. To maintain the structural integrity of the cartridge 96, the chassis molding 100 has a structural member 30 that extends in the plane of the connector force. To keep the reaction force acting in the plane of the connector force, the chassis also has a contact rib 32 that bears against the bearing surface 28. This keeps the load on the structural member 30 completely compressive to maximize the stiffness of the cartridge and minimize any flex.

Print Engine Pipeline

The print engine pipeline is a reference to the printer's processing of print data received from an external source and outputted to the printhead for printing. The print engine pipeline is described in detail in U.S. Ser. No. 11/014,769 (RRC001US) filed Dec. 20, 2004, the disclosure of which is incorporated herein by reference.

Fluidic System

Traditionally printers have relied on the structure and components within the printhead, cartridge and ink lines to avoid fluidic problems. Some common fluidic problems are deprimed or dried nozzles, outgassing bubble artifacts and color mixing from cross contamination. Optimizing the design of the printer components to avoid these problems is a passive approach to fluidic control. Typically, the only active component used to correct these were the nozzle actuators themselves. However, this is often insufficient and or wastes a lot of ink in the attempt to correct the problem. The problem is exacerbated in pagewidth printheads because of the length and complexity of the ink conduits supplying the printhead ICs.

Figure 6:
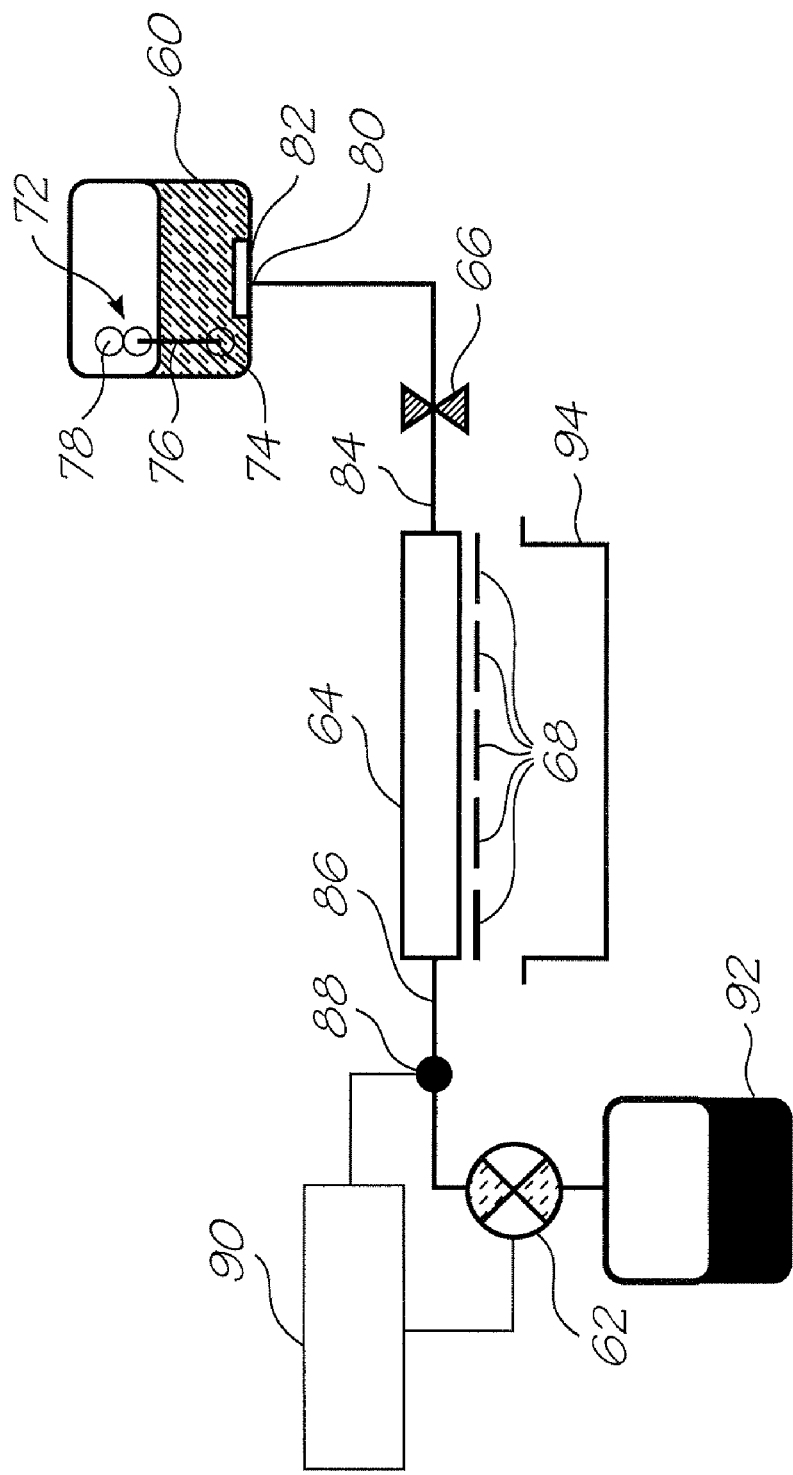
FIG. 6 is a schematic representation of the printer's fluidic system.

The Applicant has addressed this by developing an active fluidic system for the printer. Several such systems are described in detail in U.S. Ser. No. 11/677,049 the contents of which are incorporated herein by reference. FIG. 6 shows one of the single pump implementations of the active fluidic system which would be suitable for use with the printhead described in the present specification.

The fluidic architecture shown in FIG. 6 is a single ink line for one color only. A color printer would have separate lines (and of course separate ink tanks 60) for each ink color. As shown in FIG. 6, this architecture has a single pump 62 downstream of the LCP molding 64, and a shut off valve 66 upstream of the LCP molding. The LCP molding supports the printhead IC's 68 via the adhesive IC attach film 174 (see FIG. 25). The shut off valve 66 isolates the ink in the ink tank 60 from the printhead IC's 66 whenever the printer is powered down. This prevents any color mixing at the printhead IC's 68 from reaching the ink tank 60 during periods of inactivity. These issues are discussed in more detail in the cross referenced specification U.S. Ser. No. 11/677,049.

The ink tank 60 has a venting bubble point pressure regulator 72 for maintaining a relatively constant negative hydrostatic pressure in the ink at the nozzles. Bubble point pressure regulators within ink reservoirs are comprehensively described in co-pending U.S. Ser. No. 11/640,355 incorporated herein by reference. However, for the purposes of this description the regulator 72 is shown as a bubble outlet 74 submerged in the ink of the tank 60 and vented to atmosphere via sealed conduit 76 extending to an air inlet 78. As the printhead IC's 68 consume ink, the pressure in the tank 60 drops until the pressure difference at the bubble outlet 74 sucks air into the tank. This air forms a forms a bubble in the ink which rises to the tank's headspace. This pressure difference is the bubble point pressure and will depend on the diameter (or smallest dimension) of the bubble outlet 74 and the Laplace pressure of the ink meniscus at the outlet which is resisting the ingress of the air.

The bubble point regulator uses the bubble point pressure needed to generate a bubble at the submerged bubble outlet 74 to keep the hydrostatic pressure at the outlet substantially constant (there are slight fluctuations when the bulging meniscus of air forms a bubble and rises to the headspace in the ink tank). If the hydrostatic pressure at the outlet is at the bubble point, then the hydrostatic pressure profile in the ink tank is also known regardless of how much ink has been consumed from the tank. The pressure at the surface of the ink in the tank will decrease towards the bubble point pressure as the ink level drops to the outlet. Of course, once the outlet 74 is exposed, the head space vents to atmosphere and negative pressure is lost. The ink tank should be refilled, or replaced (if it is a cartridge) before the ink level reaches the bubble outlet 74.

The ink tank 60 can be a fixed reservoir that can be refilled, a replaceable cartridge or (as disclosed in RRC001US incorporated by reference) a refillable cartridge. To guard against particulate fouling, the outlet 80 of the ink tank 60 has a coarse filter 82. The system also uses a fine filter at the coupling to the printhead cartridge. As filters have a finite life, replacing old filters by simply replacing the ink cartridge or the printhead cartridge is particularly convenient for the user. If the filters are separate consumable items, regular replacement relies on the user's diligence.

When the bubble outlet 74 is at the bubble point pressure, and the shut off valve 66 is open, the hydrostatic pressure at the nozzles is also constant and less than atmospheric. However, if the shut off valve 66 has been closed for a period of time, outgassing bubbles may form in the LCP molding 64 or the printhead IC's 68 that change the pressure at the nozzles. Likewise, expansion and contraction of the bubbles from diurnal temperature variations can change the pressure in the ink line 84 downstream of the shut off valve 66. Similarly, the pressure in the ink tank can vary during periods of inactivity because of dissolved gases coming out of solution.

The downstream ink line 86 leading from the LCP 64 to the pump 62 can include an ink sensor 88 linked to an electronic controller 90 for the pump. The sensor 88 senses the presence or absence of ink in the downstream ink line 86. Alternatively, the system can dispense with the sensor 88, and the pump 62 can be configured so that it runs for an appropriate period of time for each of the various operations. This may adversely affect the operating costs because of increased ink wastage.

The pump 62 feeds into a sump 92 (when pumping in the forward direction). The sump 92 is physically positioned in the printer so that it is less elevated than the printhead ICs 68. This allows the column of ink in the downstream ink line 86 to 'hang' from the LCP 64 during standby periods, thereby creating a negative hydrostatic pressure at the printhead ICs 68. A negative pressure at the nozzles draws the ink meniscus inwards and inhibits color mixing. Of course, the peristaltic pump 62 needs to be stopped in an open condition so that there is fluid communication between the LCP 64 and the ink outlet in the sump 92.

Pressure differences between the ink lines of different colors can occur during periods of inactivity. Furthermore, paper dust or other particulates on the nozzle plate can wick ink from one nozzle to another. Driven by the slight pressure differences between each ink line, color mixing can occur while the printer is inactive. The shut off valve 66 isolates the ink tank 60 from the nozzle of the printhead IC's 68 to prevent color mixing extending up to the ink tank 60. Once the ink in the tank has been contaminated with a different color, it is irretrievable and has to be replaced.

The capper 94 is a printhead maintenance station that seals the nozzles during standby periods to avoid dehydration of the printhead ICs 68 as well as shield the nozzle plate from paper dust and other particulates. The capper 94 is also configured to wipe the nozzle plate to remove dried ink and other contaminants. Dehydration of the printhead ICs 68 occurs when the ink solvent, typically water, evaporates and increases the viscosity of the ink. If the ink viscosity is too high, the ink ejection actuators fail to eject ink drops. Should the capper seal be compromised, dehydrated nozzles can be a problem when reactivating the printer after a power down or standby period.

The problems outlined above are not uncommon during the operative life of a printer and can be effectively corrected with the relatively simple fluidic architecture shown in FIG. 6. It also allows the user to initially prime the printer, deprime the printer prior to moving it, or restore the printer to a known print ready state using simple trouble-shooting protocols. Several examples of these situations are described in detail in the above referenced U.S. Ser. No. 11/677,049.

Printhead Cartridge

Figure 7:
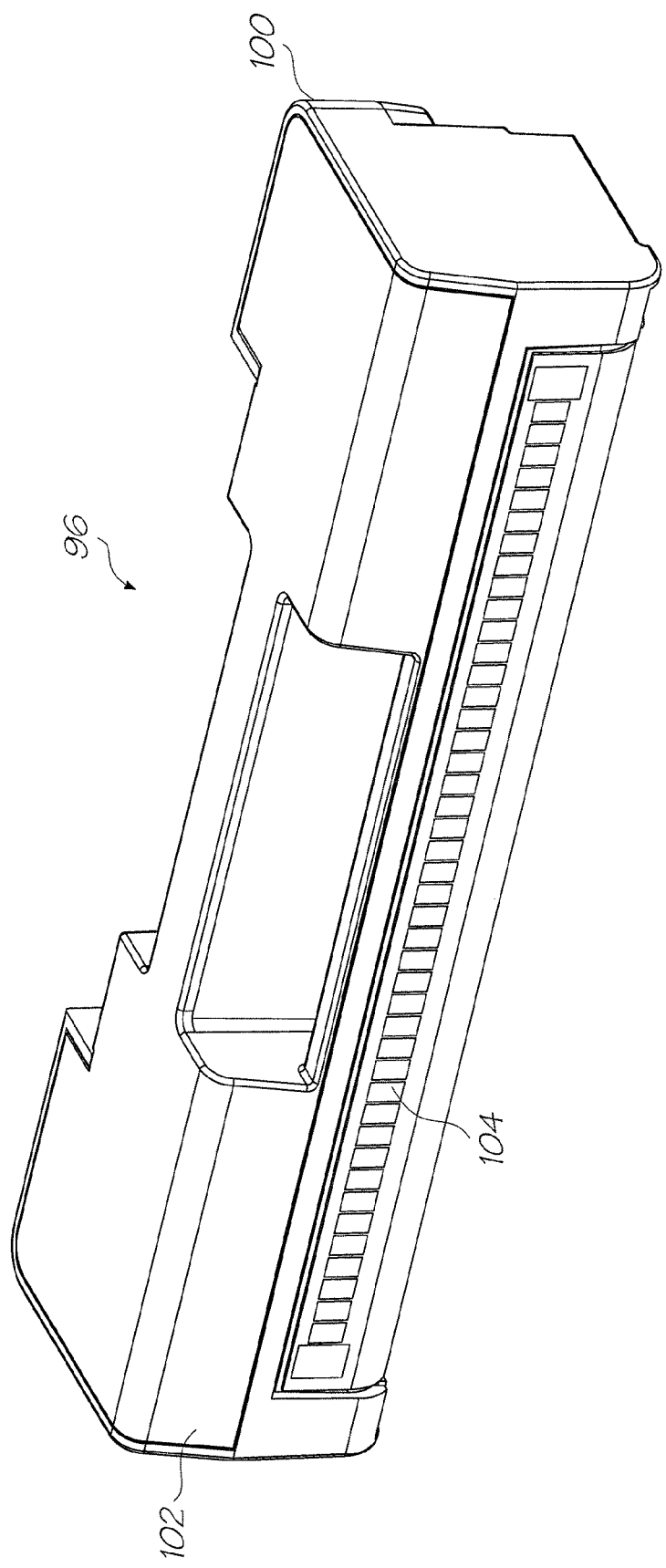
FIG. 7 is a top and front perspective of the printhead cartridge.

The printhead cartridge 96 is shown in FIGS. 7 to 16A. FIG. 7 shows the cartridge 96 in its assembled and complete form. The bulk of the cartridge is encased in the cartridge chassis 100 and the chassis lid 102. A window in the chassis 100 exposes the cartridge contacts 104 that receive data from the print engine controller in the printer.

Figure 8:
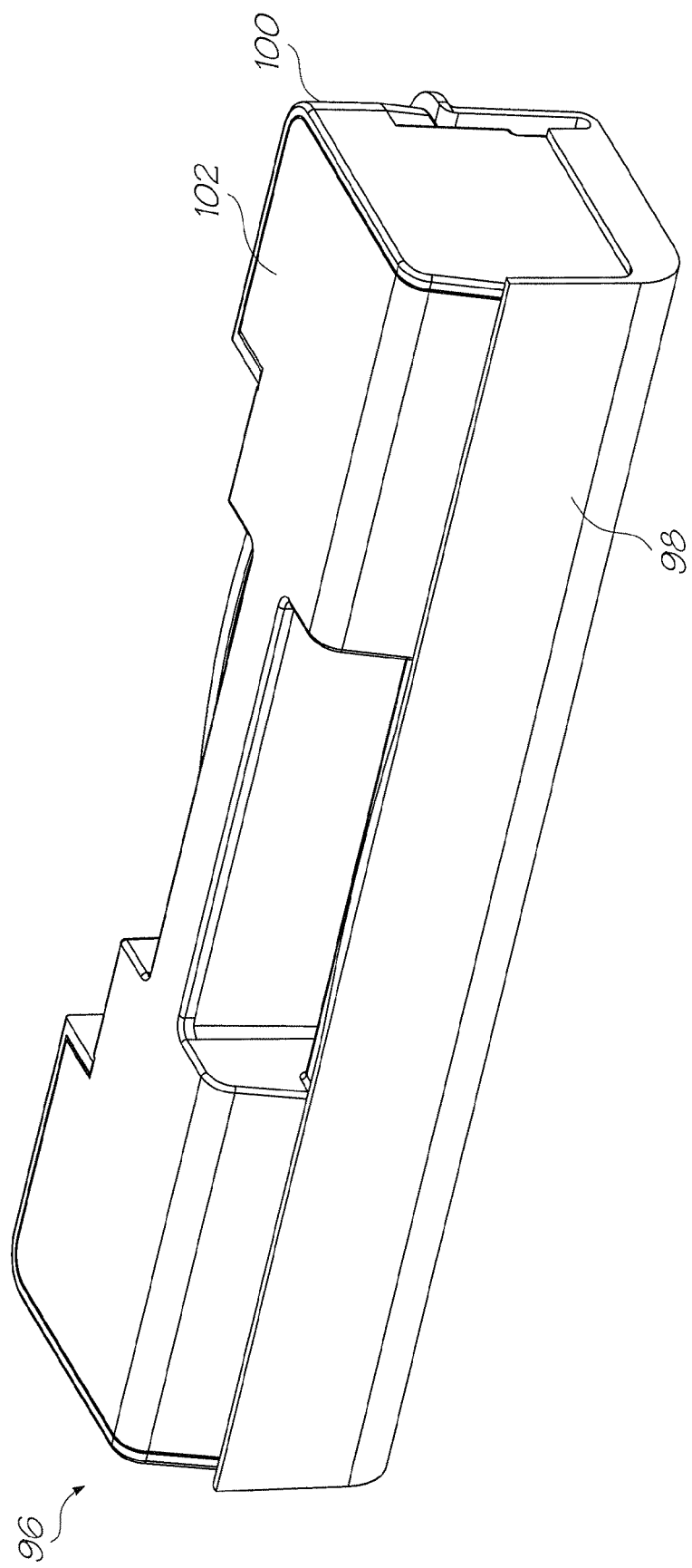
FIG. 8 is a top and front perspective of the printhead cartridge in its protective cover.
Figure 9:
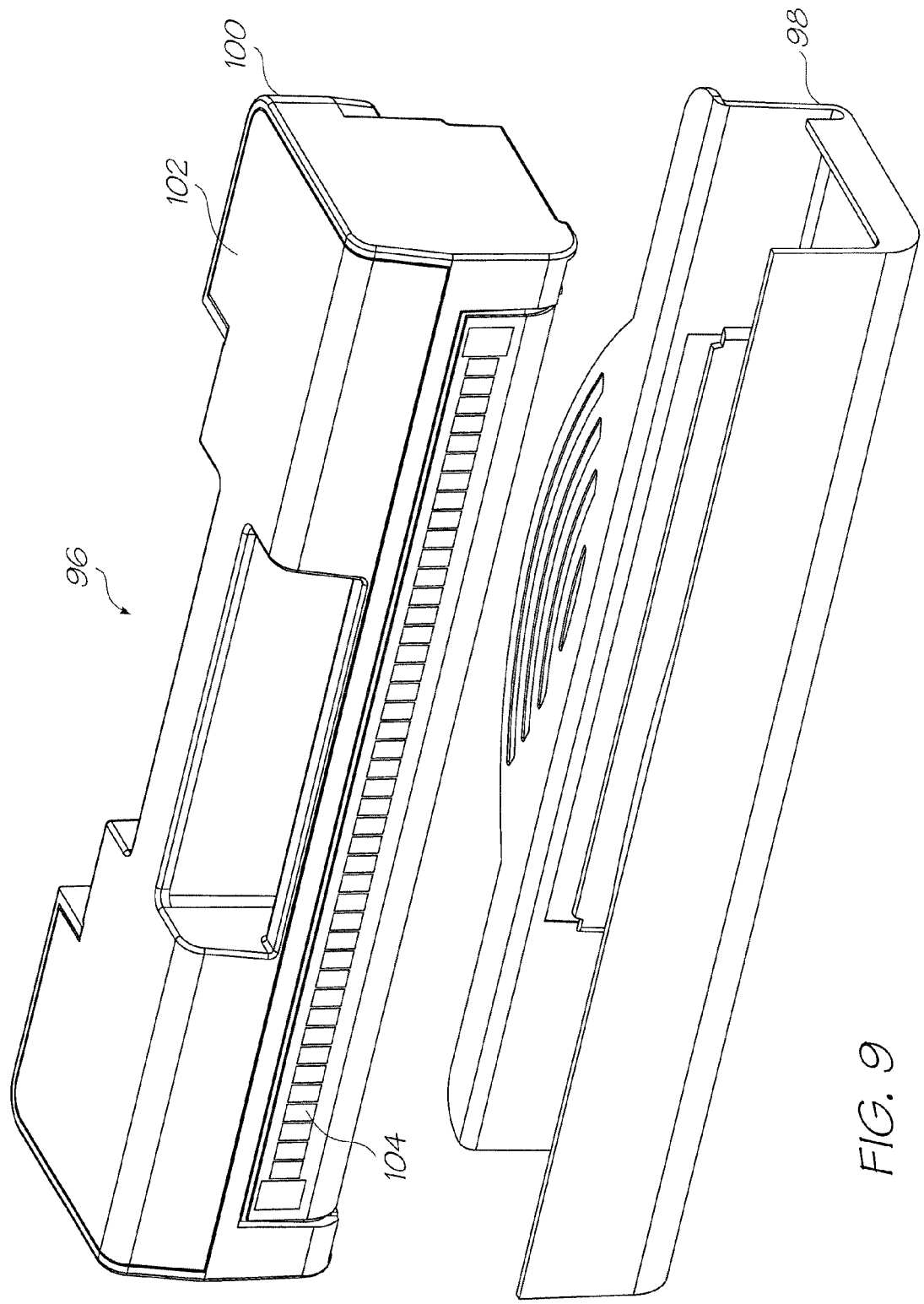
FIG. 9 is a top and front perspective of the printhead cartridge removed from its protective cover.

FIGS. 8 and 9 show the cartridge 96 with its snap on protective cover 98. The protective cover 98 prevents damaging contact with the electrical contacts 104 and the printhead IC's 68 (see FIG. 10). The user can hold the top of the cartridge 96 and remove the protective cover 98 immediately prior to installation in the printer.

Figure 10:
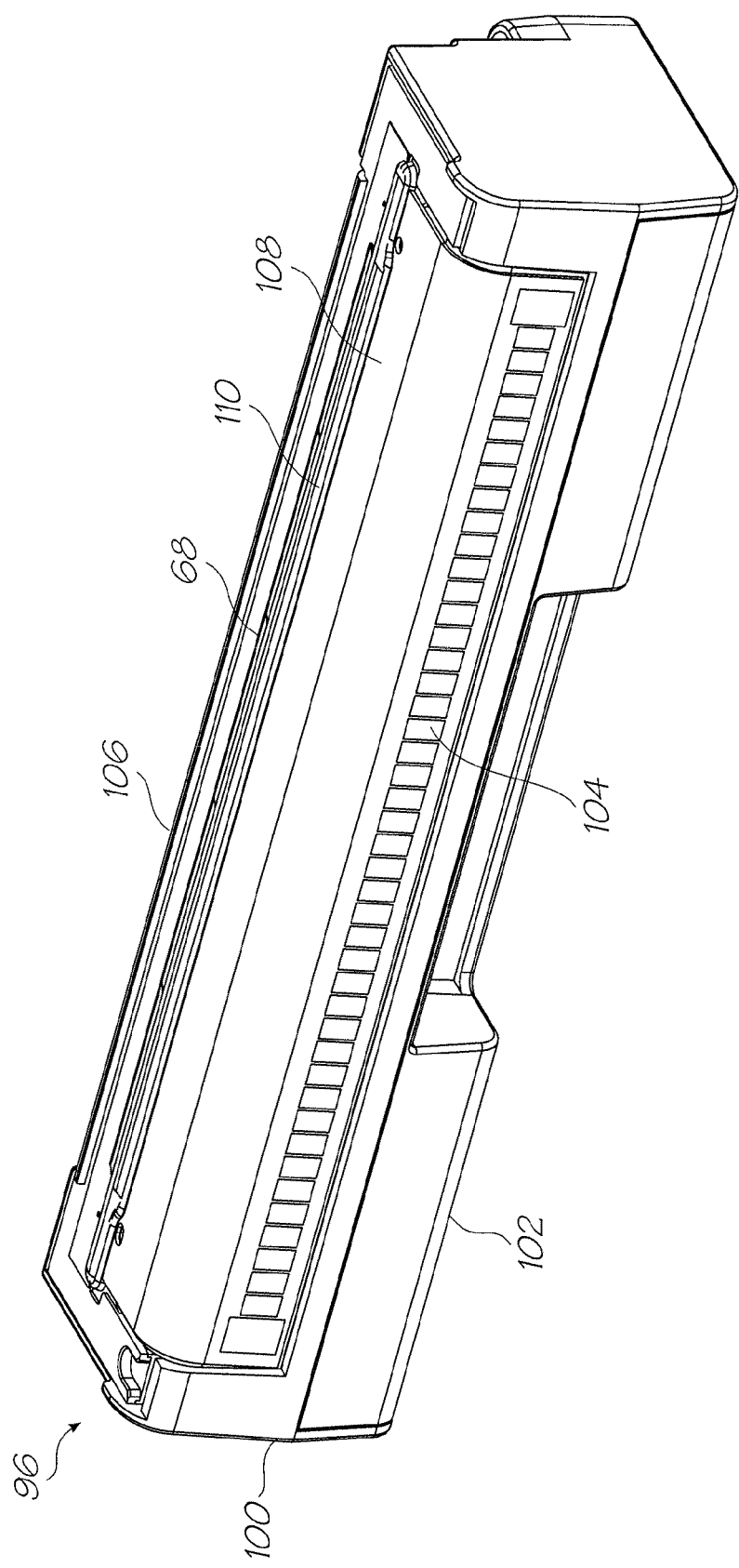
FIG. 10 is a bottom and front perspective of the printhead cartridge.

FIG. 10 shows the underside and 'back' (with respect to the paper feed direction) of the printhead cartridge 96. The printhead contacts 104 are conductive pads on a flexible printed circuit board 108 that wraps around a curved support surface (discussed below in the description relating to the LCP moulding) to a line of wire bonds 110 at one side if the printhead IC's 68. On the other side of the printhead IC's 68 is a paper shield 106 to prevent direct contact with the media substrate.

Figure 11:
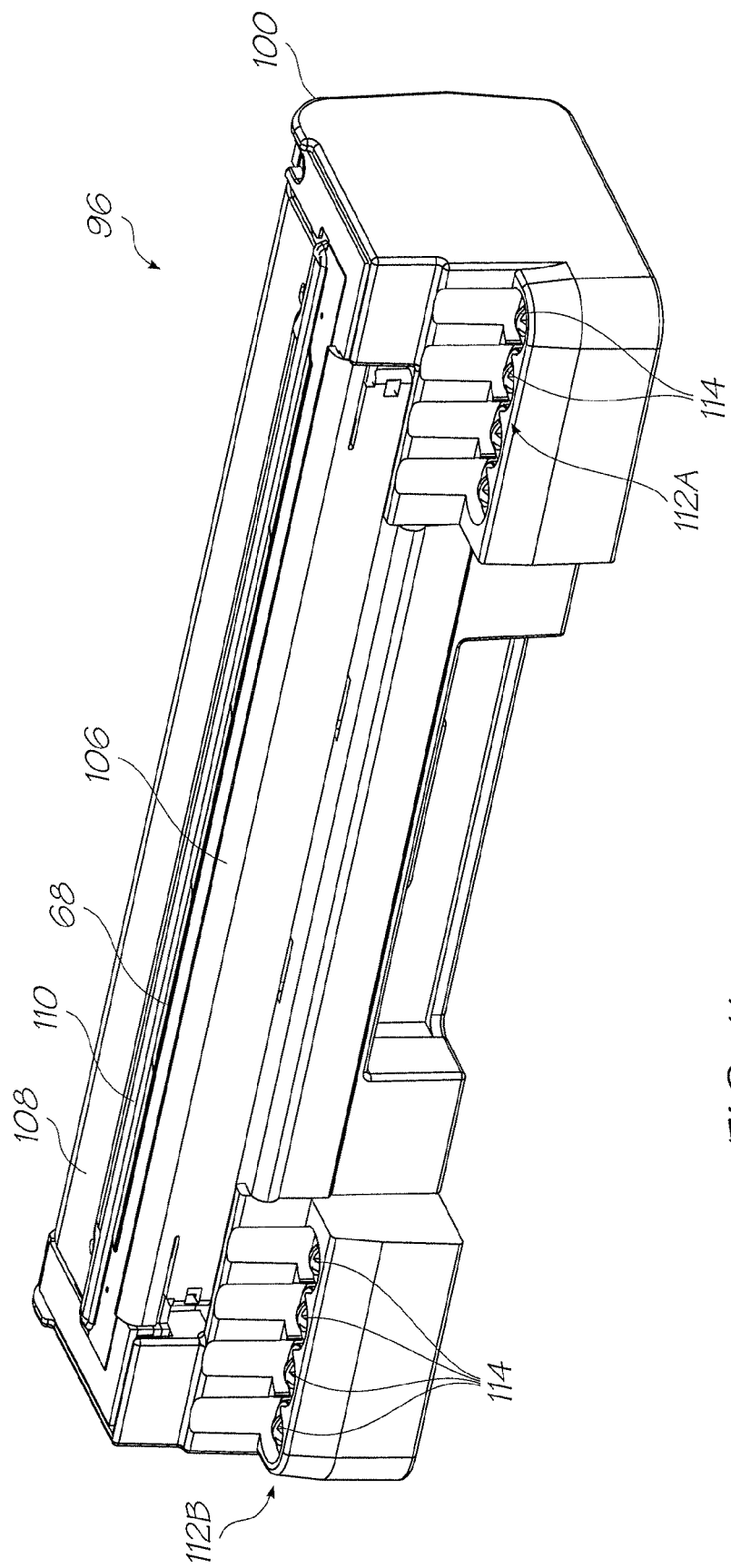
FIG. 11 is a bottom and rear perspective of the printhead cartridge.

FIG. 11 shows the underside and the 'front' of the printhead cartridge 96. The front of the cartridge has two ink couplings 112A and 112B at either end. Each ink coupling has four cartridge valves 114. When the cartridge is installed in the printer, the ink couplings 112A and 112B engage complementary ink supply interfaces (described in more detail below). The ink supply interfaces have printer conduits 142 which engage and open the cartridge valves 114. One of the ink couplings 112A is the upstream ink coupling and the other is the downstream coupling 112B. The upstream coupling 112A establishes fluid communication between the printhead IC's 68 and the ink supply 60 (see FIG. 6) and the downstream coupling 112B connects to the sump 92 (refer FIG. 6 again).

Figure 12:
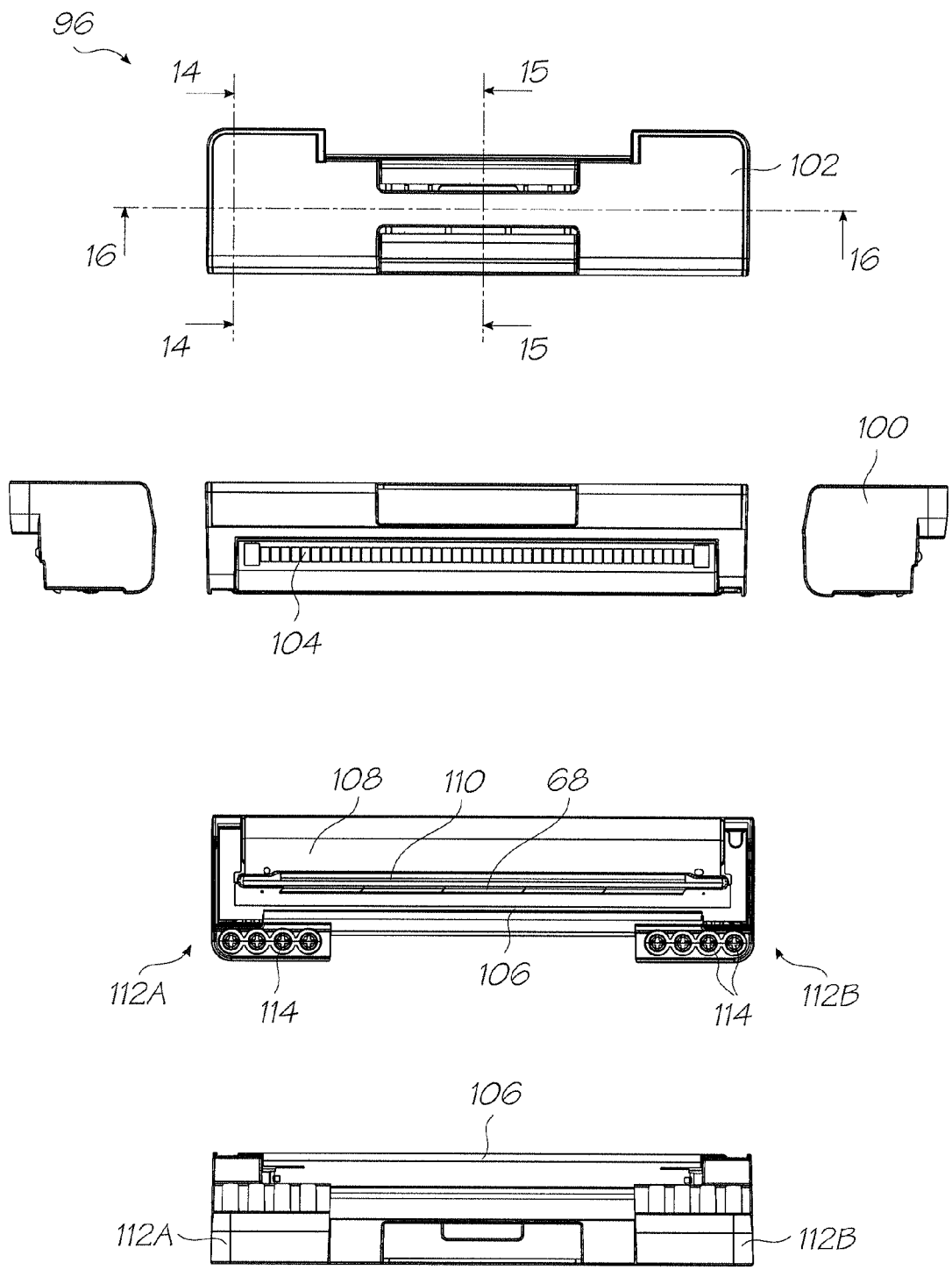
FIG. 12 shows the elevations of all sides of the printhead cartridge.

The various elevations of the printhead cartridge 96 are shown in FIG. 12. The plan view of the cartridge 96 also shows the location of the section views shown in FIGS. 14, 15 and 16.

Figure 13:
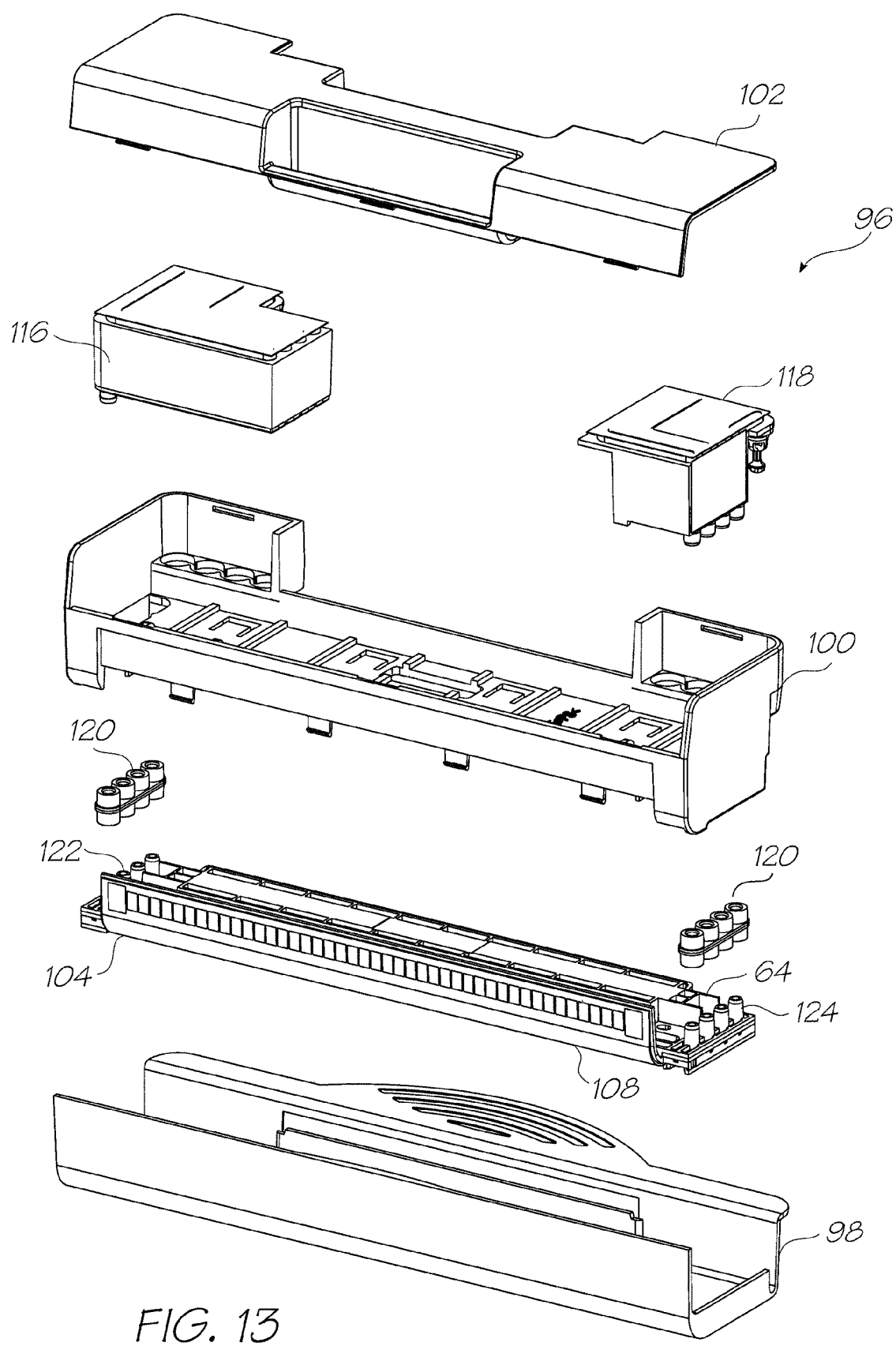
FIG. 13 is an exploded perspective of the printhead cartridge.

FIG. 13 is an exploded perspective of the cartridge 96. The LCP molding 64 attaches to the underside of the cartridge chassis 100. In turn the flex PCB 108 attaches to the underside of the LCP molding 64 and wraps around one side to expose the printhead contacts 104. An inlet manifold and filter 116 and outlet manifold 118 attach to the top of the chassis 100. The inlet manifold and filter 116 connects to the LCP inlets 122 via elastomeric connectors 120. Likewise the LCP outlets 124 connect to the outlet manifold 118 via another set of elastomeric connectors 120. The chassis lid 102 encases the inlet and outlet manifolds in the chassis 100 from the top and the removable protective cover 98 snaps over the bottom to protect the contacts 104 and the printhead IC's (see FIG. 11).

Inlet and Filter Manifold

Figure 14:
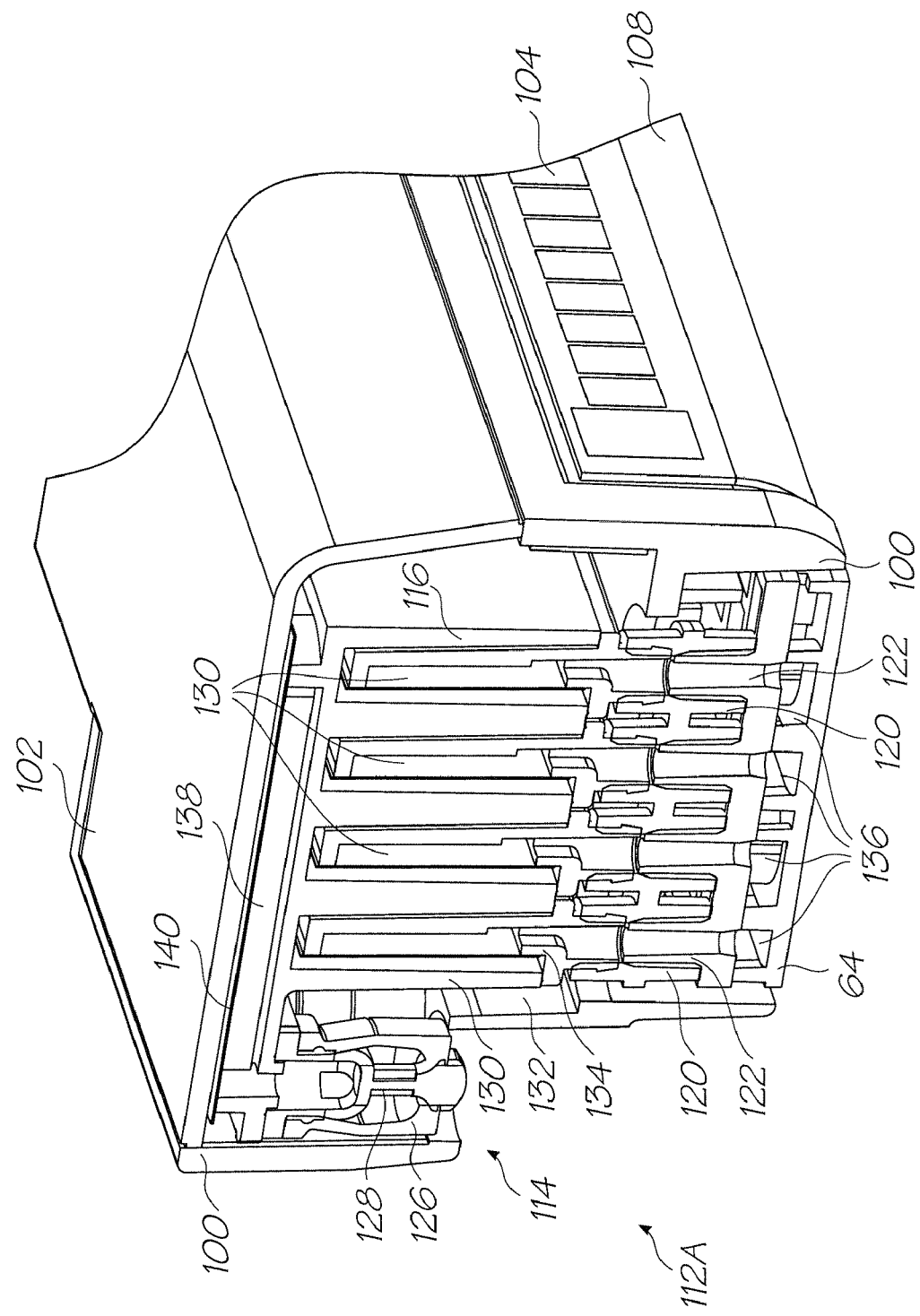
FIG. 14 is a transverse section through the ink inlet coupling of the printhead cartridge.

FIG. 14 is an enlarged section view taken along line 14-14 of FIG. 12. It shows the fluid path through one of the cartridge valves 114 of the upstream coupling 112A to the LCP molding 64. The cartridge valve 114 has an elastomeric sleeve 126 that is biased into sealing engagement with a fixed valve member 128. The cartridge valve 114 is opened by the printer conduit 142 (see FIG. 16) by compressing the elastomeric sleeve 126 such that it unseats from the fixed valve member 128 and allows ink to flow up to a roof channel 138 along the top of the inlet and filter manifold 116. The roof channel 138 leads to an upstream filter chamber 132 that has one wall defined by a filter membrane 130. Ink passes through the filter membrane 130 into the downstream filter chamber 134 and out to the LCP inlet 122. From there filtered ink flows along the LCP main channels 136 to feed into the printhead IC's (not shown).

Figure 15:
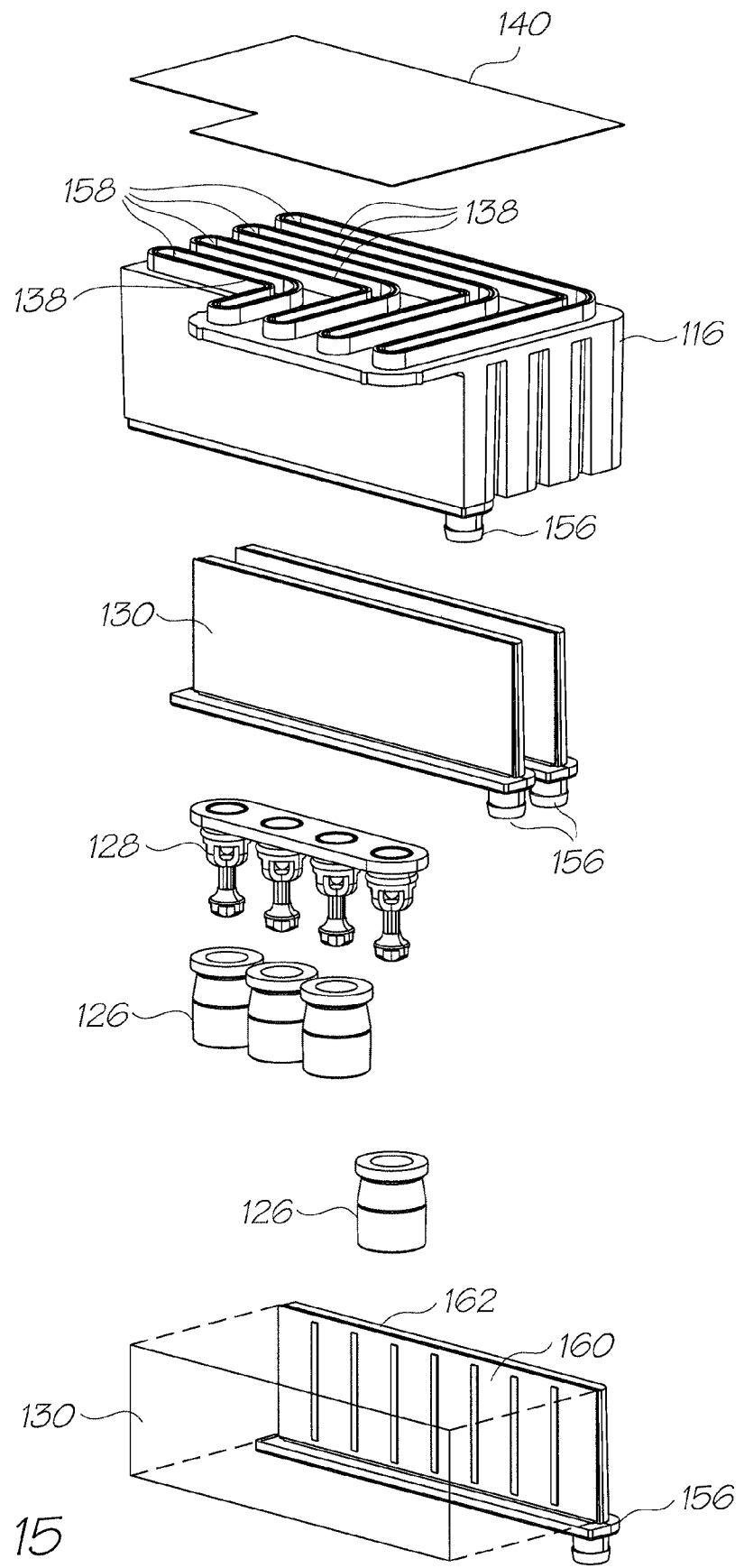
FIG. 15 is an exploded perspective of the ink inlet and filter assembly.

Particular features and advantages of the inlet and filter manifold 116 will now be described with reference to FIG. 15. The exploded perspective of FIG. 15 best illustrates the compact design of the inlet and filter manifold 116. There are several aspects of the design that contribute to its compact form. Firstly, the cartridge valves are spaced close together. This is achieved by departing from the traditional configuration of self-sealing ink valves. Previous designs also used an elastomeric member biased into sealing engagement with a fixed member. However, the elastomeric member was either a solid shape that the ink would flow around, or in the form of a diaphragm if the ink flowed through it.

In a cartridge coupling, it is highly convenient for the cartridge valves to automatically open upon installation. This is most easily and cheaply provided by a coupling in which one valve has an elastomeric member which is engaged by a rigid member on the other valve. If the elastomeric member is in a diaphragm form, it usually holds itself against the central rigid member under tension. This provides an effective seal and requires relatively low tolerances. However, it also requires the elastomer element to have a wide peripheral mounting. The width of the elastomer will be a trade-off between the desired coupling force, the integrity of the seal and the material properties of the elastomer used.

Figure 16:
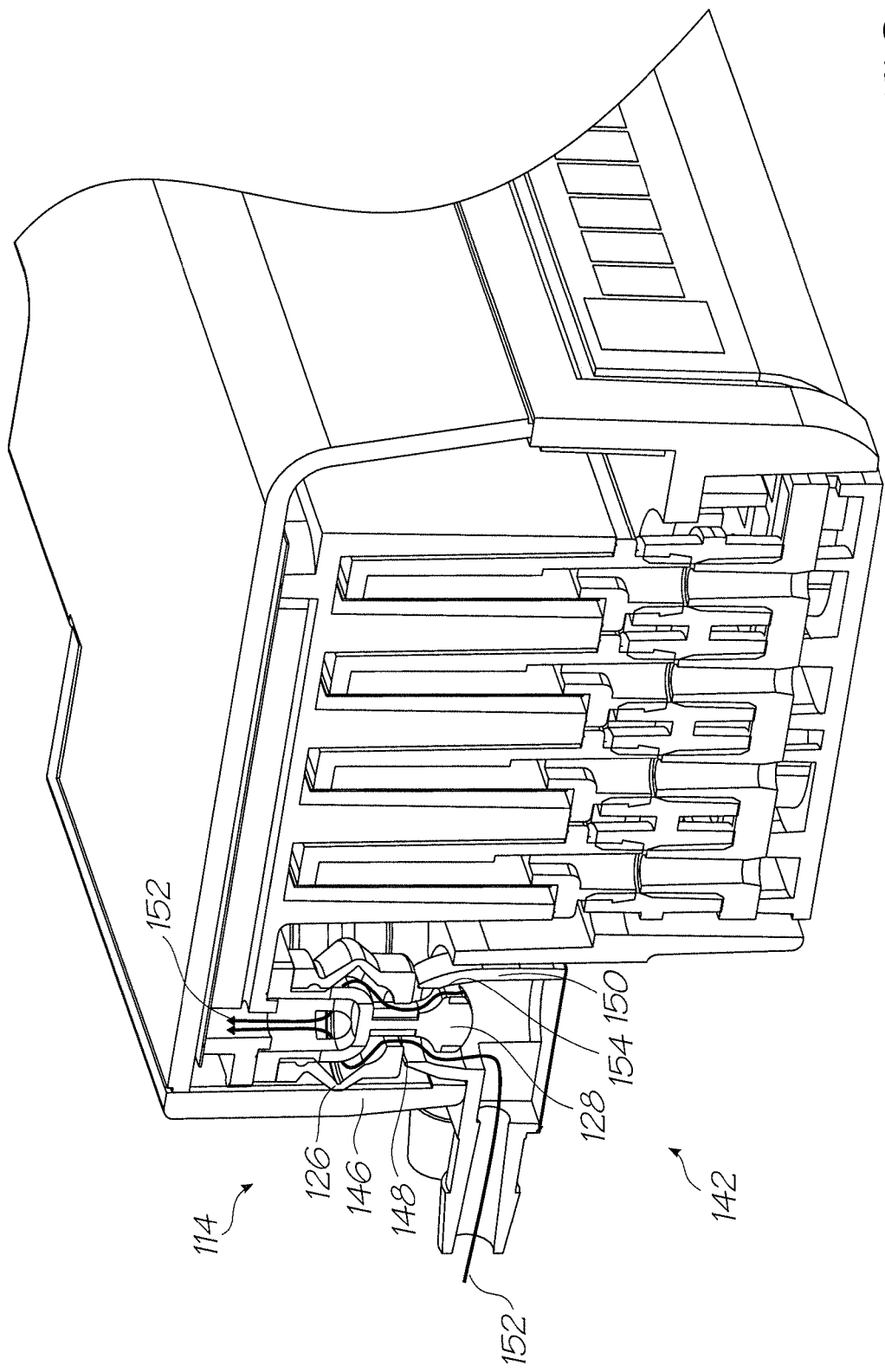
FIG. 16 is a section view of the cartridge valve engaged with the printer valve.

As best shown in FIG. 16, the cartridge valves 114 of the present invention use elastomeric sleeves 126 that seal against the fixed valve member 128 under residual compression. The valve 114 opens when the cartridge is installed in the printer and the conduit end 148 of the printer valve 142 further compresses the sleeve 126. The collar 146 unseals from the fixed valve member 128 to connect the LCP 64 into the printer fluidic system (see FIG. 6) via the upstream and downstream ink coupling 112A and 112B. The sidewall of the sleeve is configured to bulge outwardly as collapsing inwardly can create a flow obstruction. As shown in FIG. 16, the sleeve 126 has a line of relative weakness around its mid-section that promotes and directs the buckling process. This reduces the force necessary to engage the cartridge with the printer, and ensures that the sleeve buckles outwardly.

The coupling is configured for 'no-drip' disengagement of the cartridge from the printer. As the cartridge is pulled upwards from the printer the elastomeric sleeve 126 pushes the collar 146 to seal against the fixed valve member 128. Once the sleeve 126 has sealed against the valve member 128 (thereby sealing the cartridge side of the coupling), the sealing collar 146 lifts together with the cartridge. This unseals the collar 146 from the end of the conduit 148. As the seal breaks an ink meniscus forms across the gap between the collar and the end of the conduit 148. The shape of the end of the fixed valve member 128 directs the meniscus to travel towards the middles of its bottom surface instead of pinning to a point. At the middle of the rounded bottom of the fixed valve member 128, the meniscus is driven to detach itself from the now almost horizontal bottom surface. To achieve the lowest possible energy state, the surface tension drives the detachment of the meniscus from the fixed valve member 128. The bias to minimize meniscus surface area is strong and so the detachment is complete with very little, if any, ink remaining on the cartridge valve 114. Any remaining ink is not enough a drop that can drip and stain prior to disposal of the cartridge.

When a fresh cartridge is installed in the printer, the air in conduit 150 will be entrained into the ink flow 152 and ingested by the cartridge. In light of this, the inlet manifold and filter assembly have a high bubble tolerance. Referring back to FIG. 15, the ink flows through the top of the fixed valve member 128 and into the roof channel 138. Being the most elevated point of the inlet manifold 116, the roof channels can trap the bubbles. However, bubbles may still flow into the filter inlets 158. In this case, the filter assembly itself is bubble tolerant.

Bubbles on the upstream side of the filter member 130 can affect the flow rate—they effectively reduce the wetted surface area on the dirty side of the filter membrane 130. The filter membranes have a long rectangular shape so even if an appreciable number of bubbles are drawn into the dirty side of the filter, the wetted surface area remains large enough to filter ink at the required flow rate. This is crucial for the high speed operation offered by the present invention.

While the bubbles in the upstream filter chamber 132 can not cross the filter membrane 130, bubbles from outgassing may generate bubbles in the downstream filter chamber 134. The filter outlet 156 is positioned at the bottom of the downstream filter chamber 134 and diagonally opposite the inlet 158 in the upstream chamber 132 to minimize the effects of bubbles in either chamber on the flow rate.

The filters 130 for each color are vertically stacked closely side-by-side. The partition wall 162 partially defines the upstream filter chamber 132 on one side, and partially defines the downstream chamber 134 of the adjacent color on the other side. As the filter chambers are so thin (for compact design), the filter membrane 130 can be pushed against the opposing wall of the downstream filter chamber 134. This effectively reduces the surface are of the filter membrane 130. Hence it is detrimental to maximum flowrate. To prevent this, the opposing wall of the downstream chamber 134 has a series of spacer ribs 160 to keep the membrane 130 separated from the wall.

Positioning the filter inlet and outlet at diagonally opposed corners also helps to purge the system of air during the initial prime of the system.

To reduce the risk of particulate contamination of the printhead, the filter membrane 130 is welded to the downstream side of a first partition wall before the next partition wall 162 is welded to the first partition wall. In this way, any small pieces of filter membrane 130 that break off during the welding process, will be on the 'dirty' side of the filter 130.

LCP Molding/Flex PCB/Printhead ICS

Figure 17:
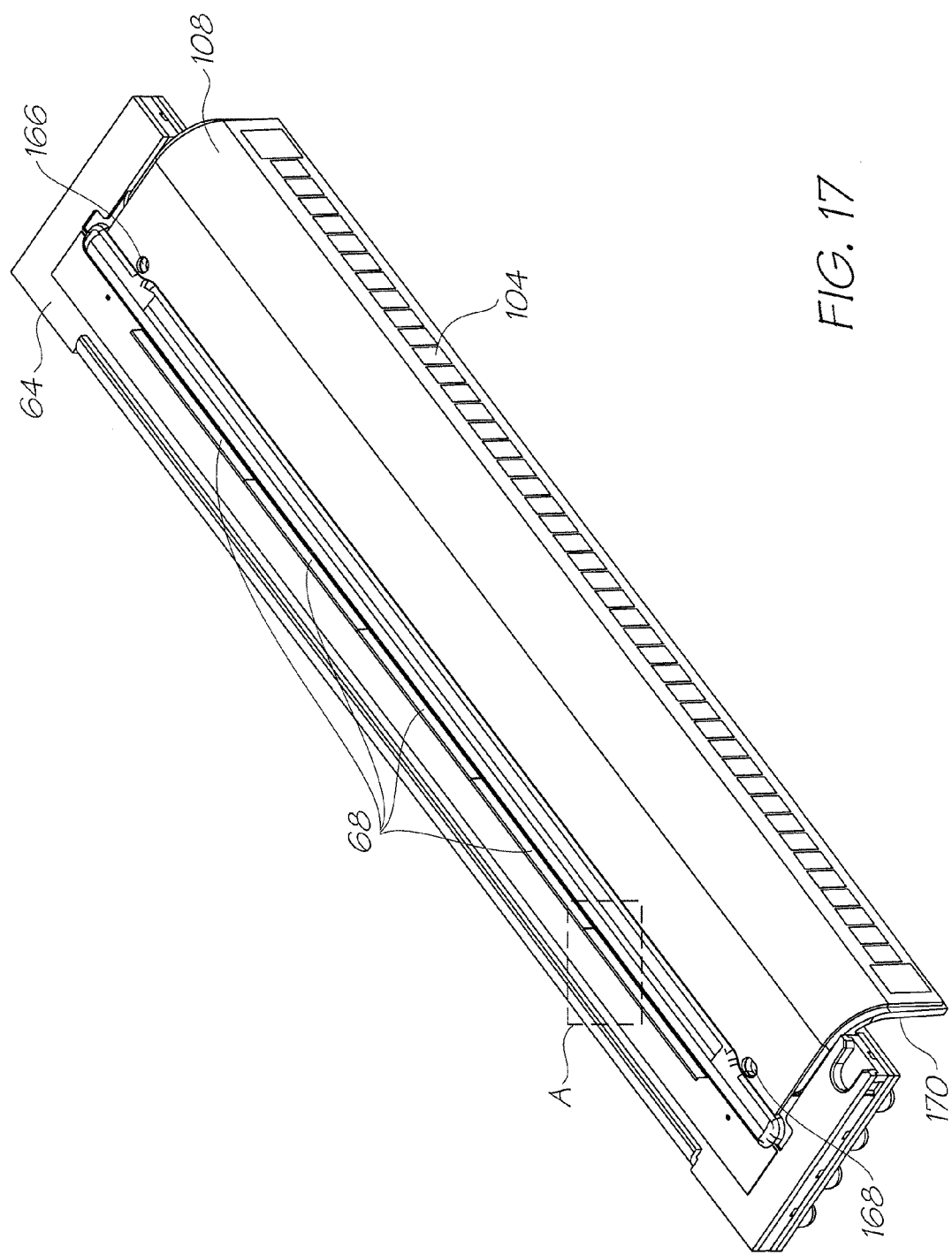
FIG. 17 is a perspective of the LCP molding and flex PCB.

The LCP molding 64, flex PCB 108 and printhead ICs 68 assembly are shown in FIGS. 17 to 33. FIG. 17 is a perspective of the underside of the LCP molding 64 with the flex PCB and printhead ICs 68 attached. The LCP molding 64 is secured to the cartridge chassis 100 through coutersunk holes 166 and 168. Hole 168 is an obround hole to accommodate any miss match in coefficients of thermal expansion (CTE) without bending the LCP. The printhead ICs 68 are arranged end to end in a line down the longitudinal extent of the LCP molding 64. The flex PCB 108 is wire bonded at one edge to the printhead ICs 68. The flex PCB 108 also secures to the LCP molding at the printhead IC edge as well as at the cartridge contacts 104 edge. Securing the flex PCB at both edges keeps it tightly held to the curved support surface 170 (see FIG. 19). This ensures that the flex PCB does not bend to a radius that is tighter than specified minimum, thereby reducing the risk that the conductive tracks through the flex PCB will fracture.

Figure 18:
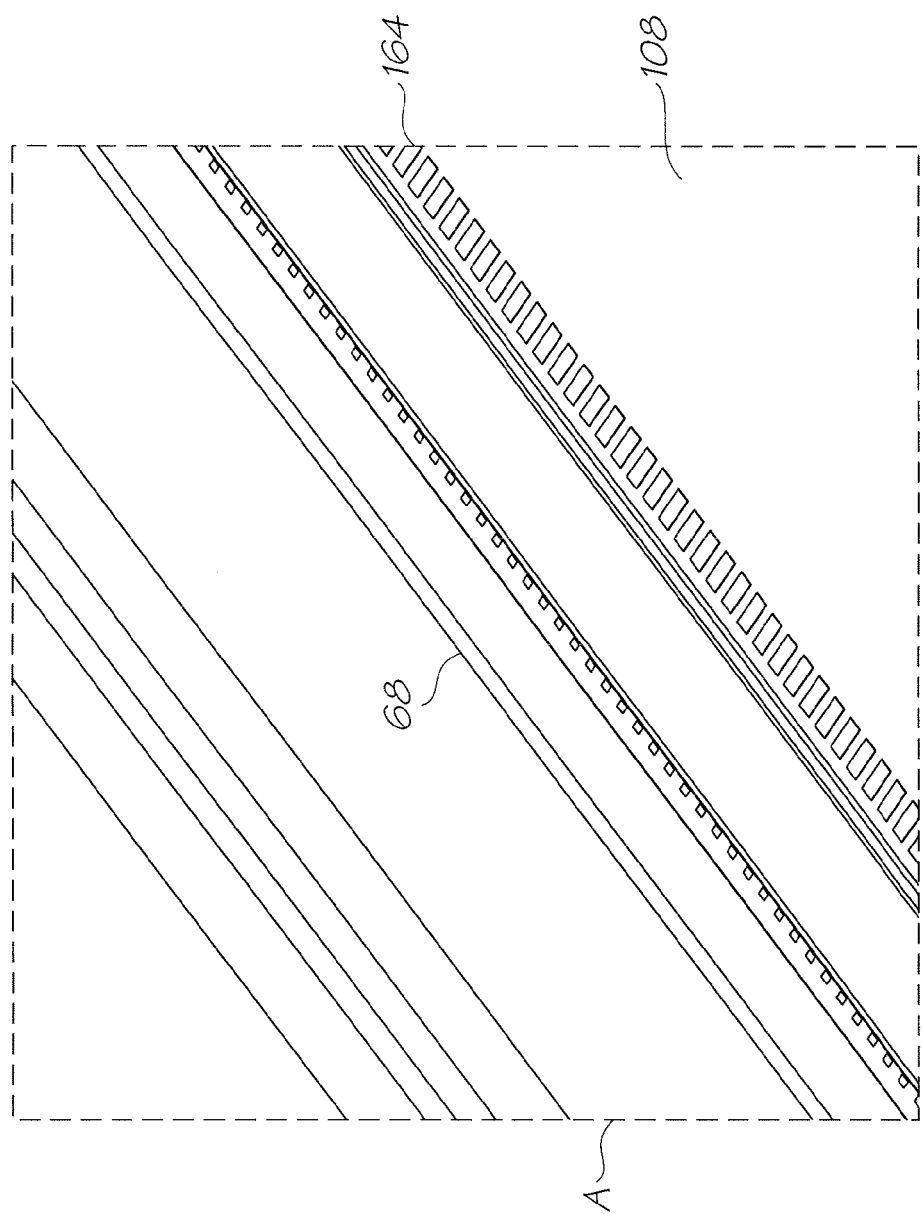
FIG. 18 is an enlargement of inset A shown in FIG. 17.

FIG. 18 is an enlarged view of Inset A shown in FIG. 17. It shows the line of wire bonding contacts 164 along the side if the flex PCB 108 and the line of printhead ICs 68.

Figure 19:
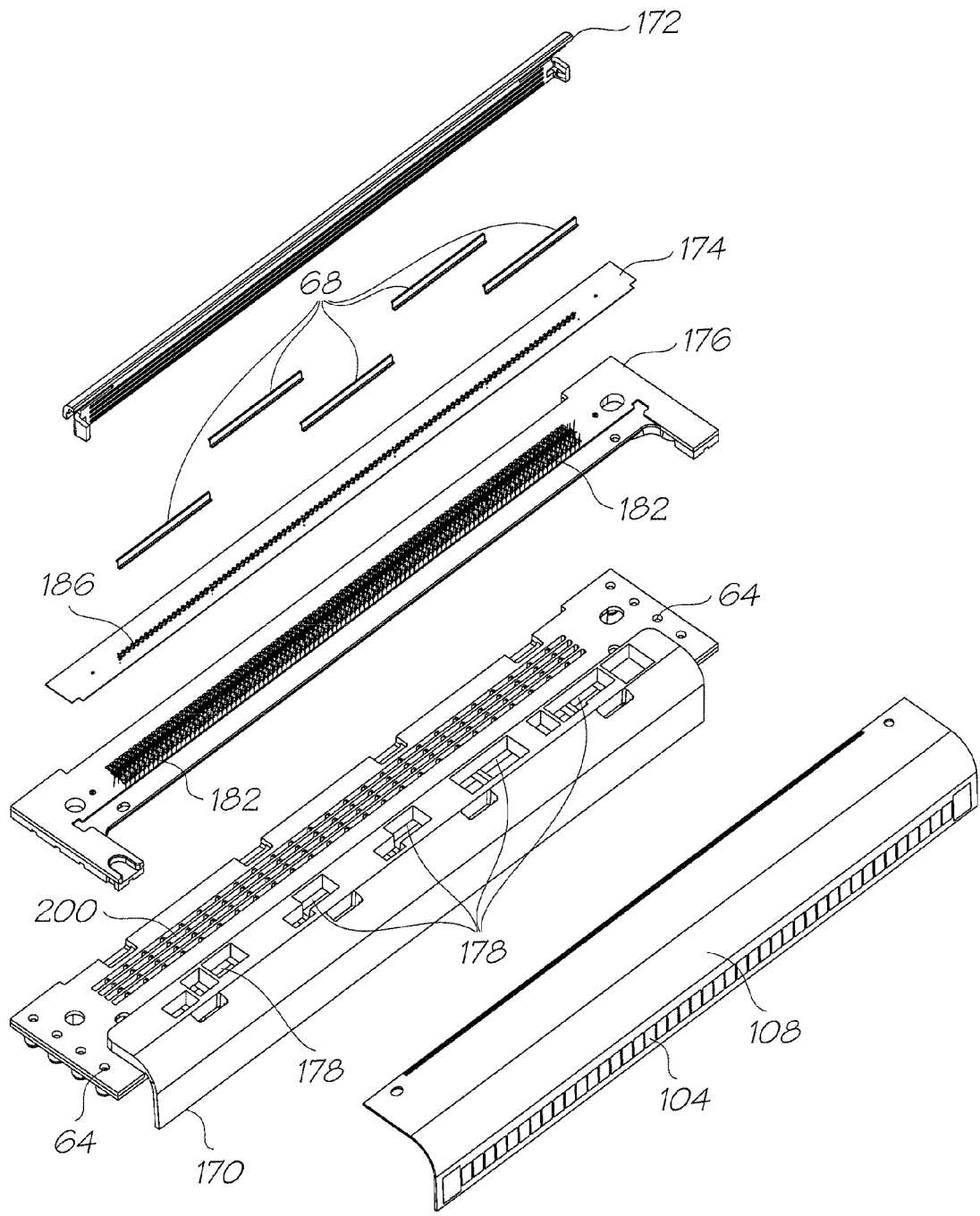
FIG. 19 is an exploded bottom perspective of the LCP/flex PCB/printhead IC assembly.
Figure 20:
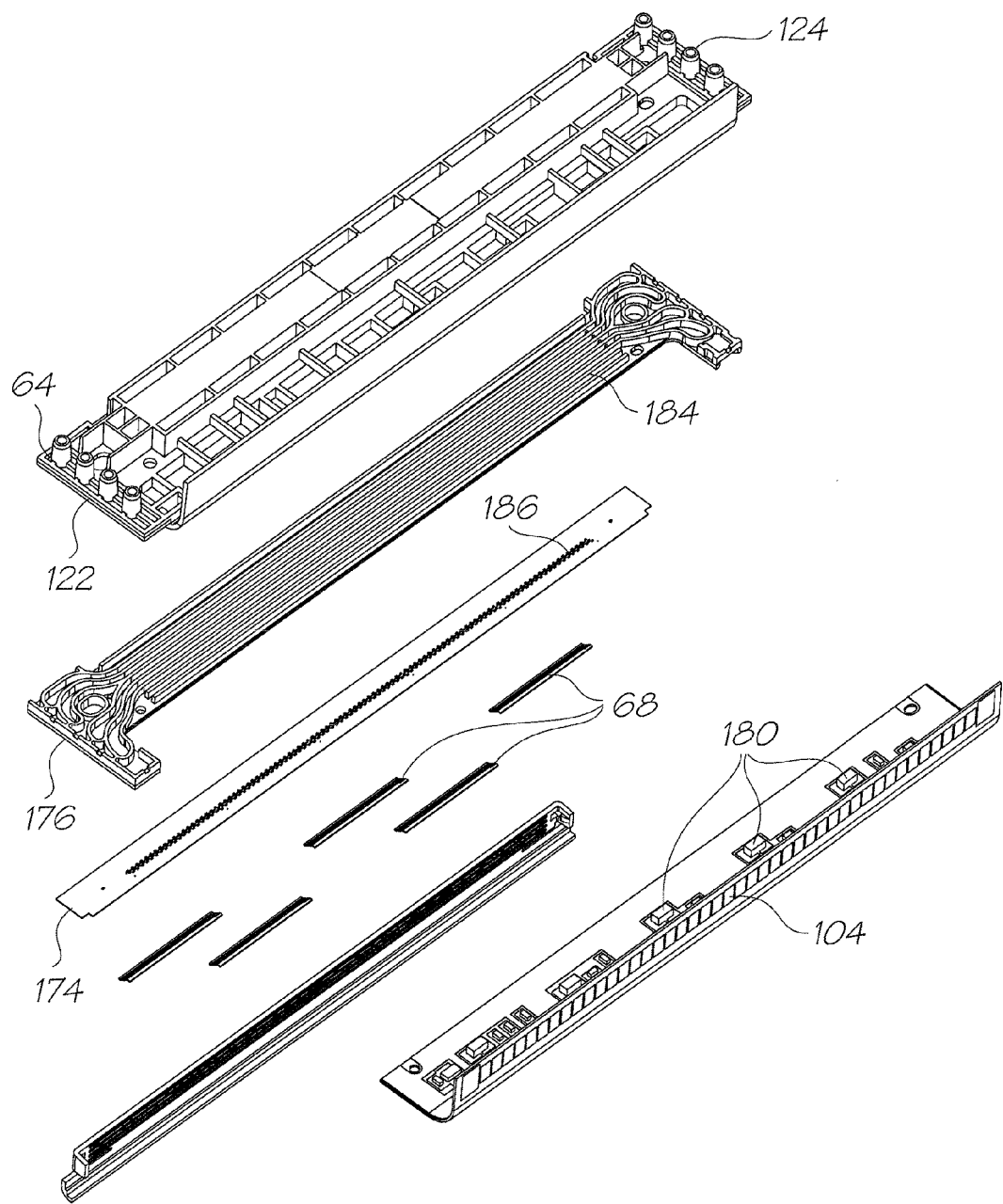
FIG. 20 is an exploded top perspective of the LCP/flex PCB/printhead IC assembly.

FIG. 19 is an exploded perspective of the LCP/flex/printhead IC assembly showing the underside of each component. FIG. 20 is another exploded perspective, this time showing the topside of the components. The LCP molding 64 has an LCP channel molding 176 sealed to its underside. The printhead ICs 68 are attached to the underside of the channel molding 176 by adhesive IC attach film 174. On the topside of the LCP channel molding 176 are the LCP main channels 184. These are open to the ink inlet 122 and ink outlet 124 in the LCP molding 64. At the bottom of the LCP main channels 184 are a series of ink supply passages 182 leading to the printhead ICs 68. The adhesive IC attach film 174 has a series of laser drilled supply holes 186 so that the attachment side of each printhead IC 68 is in fluid communication with the ink supply passages 182. The features of the adhesive IC attach film are described in detail below with reference to FIG. 31 to 33.

The LCP molding 64 has recesses 178 to accommodate electronic components 180 in the drive circuitry on the flex PCB 108. For optimal electrical efficiency and operation, the cartridge contacts 104 on the PCB 108 should be close to the printhead ICs 68. However, to keep the paper path adjacent the printhead straight instead of curved or angled, the cartridge contacts 104 need to be on the side of the cartridge 96. The conductive paths in the flex PCB are known as traces. As the flex PCB must bend around a corner, the traces can crack and break the connection. To combat this, the trace can be bifurcated prior to the bend and then reunited after the bend. If one branch of the bifurcated section cracks, the other branch maintains the connection. Unfortunately, splitting the trace into two and then joining it together again can give rise to electro-magnetic interference problems that create noise in the circuitry.

Making the traces wider is not an effective solution as wider traces are not significantly more crack resistant. Once the crack has initiated in the trace, it will propagate across the entire width relatively quickly and easily. Careful control of the bend radius is more effective at minimizing trace cracking, as is minimizing the number of traces that cross the bend in the flex PCB.

Pagewidth printheads present additional complications because of the large array of nozzles that must fire in a relatively short time. Firing many nozzles at once places a large current load on the system. This can generate high levels of inductance through the circuits which can cause voltage dips that are detrimental to operation. To avoid this, the flex PCB has a series of capacitors that discharge during a nozzle firing sequence to relieve the current load on the rest of the circuitry. Because of the need to keep a straight paper path past the printhead ICs, the capacitors are traditionally attached to the flex PCB near the contacts on the side of the cartridge. Unfortunately, they create additional traces that risk cracking in the bent section of the flex PCB.

This is addressed by mounting the capacitors 180 (see FIG. 20) closely adjacent the printhead ICs 68 to reduce the chance of trace fracture. The paper path remains linear by recessing the capacitors and other components into the LCP molding 64. The relatively flat surface of the flex PCB 108 downstream of the printhead ICs 68 and the paper shield 172 mounted to the 'front' (with respect to the feed direction) of the cartridge 96 minimize the risk of paper jams.

Isolating the contacts from the rest of the components of the flex PCB minimizes the number of traces that extend through the bent section. This affords greater reliability as the chances of cracking reduce. Placing the circuit components next to the printhead IC means that the cartridge needs to be marginally wider and this is detrimental to compact design. However, the advantages provided by this configuration outweigh any drawbacks of a slightly wider cartridge. Firstly, the contacts can be larger as there are no traces from the components running in between and around the contacts. With larger contacts, the connection is more reliable and better able to cope with fabrication inaccuracies between the cartridge contacts and the printer-side contacts. This is particularly important in this case, as the mating contacts rely on users to accurately insert the cartridge.

Secondly, the edge of the flex PCB that wire bonds to the side of the printhead IC is not under residual stress and trying to peel away from the bend radius. The flex can be fixed to the support structure at the capacitors and other components so that the wire bonding to the printhead IC is easier to form during fabrication and less prone to cracking as it is not also being used to anchor the flex.

Thirdly, the capacitors are much closer to the nozzles of the printhead IC and so the electro-magnetic interference generated by the discharging capacitors is minimized.

Figure 21:
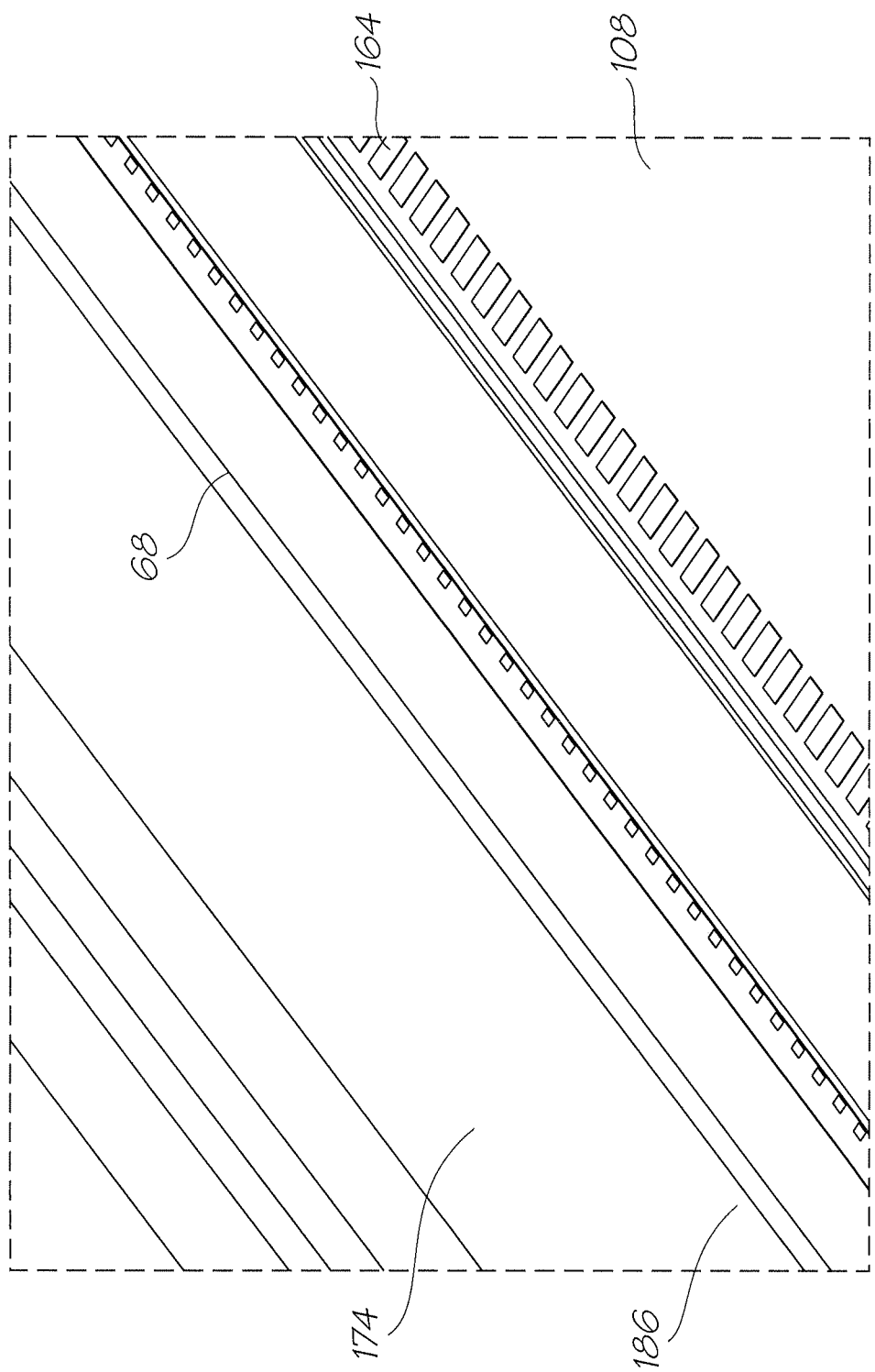
FIG. 21 is an enlarged view of the underside of the LCP/flex PCB/printhead IC assembly.
Figure 22:
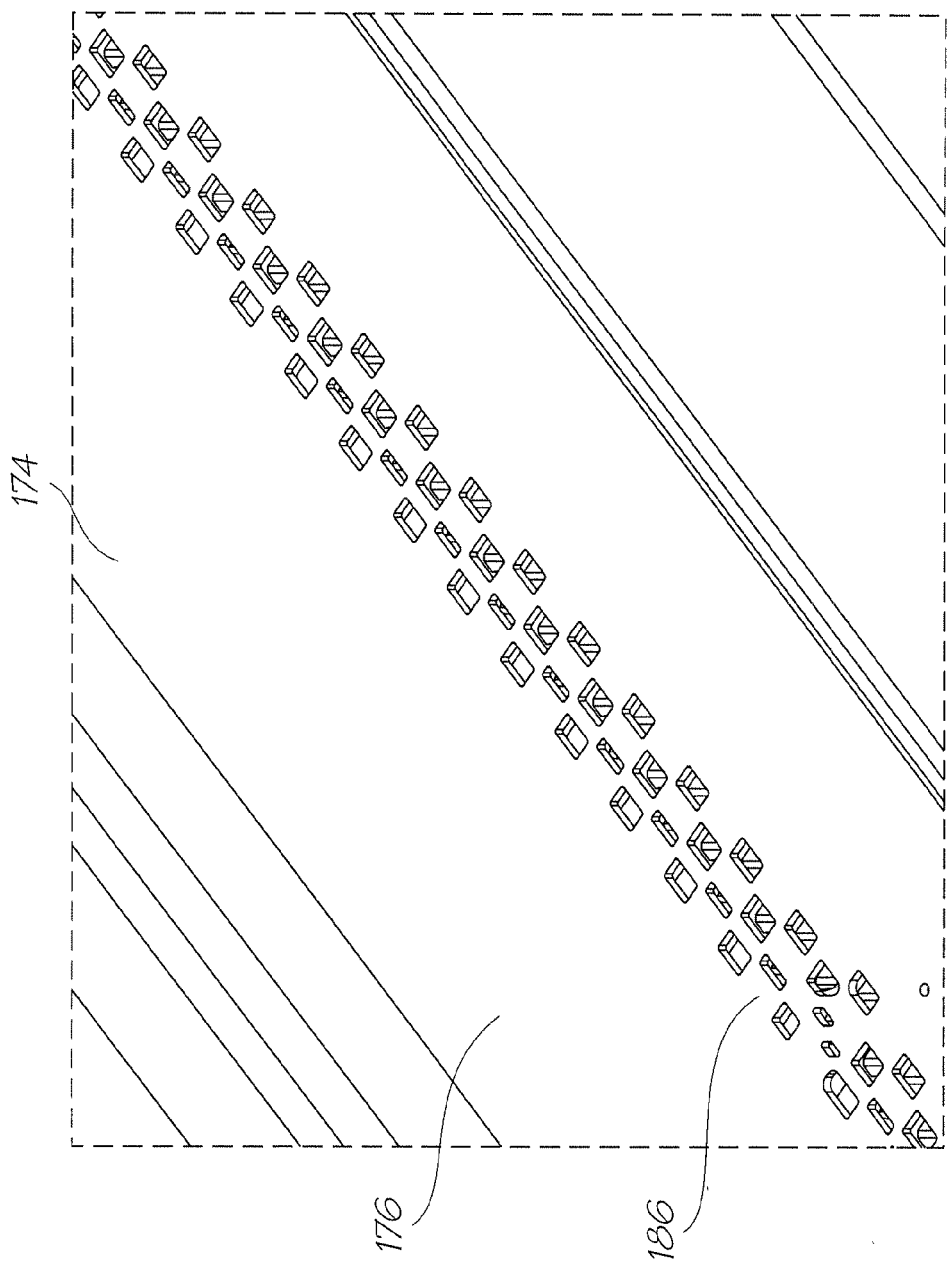
FIG. 22 shows the enlargement of FIG. 21 with the printhead ICs and the flex PCB removed.

FIG. 21 is an enlargement of the underside of the printhead cartridge 96 showing the flex PCB 108 and the printhead ICs 68. The wire bonding contacts 164 of the flex PCB 108 run parallel to the contact pads of the printhead ICs 68 on the underside of the adhesive IC attach film 174. FIG. 22 shows FIG. 21 with the printhead ICs 68 and the flex PCB removed to reveal the supply holes 186. The holes are arranged in four longitudinal rows. Each row delivers ink of one particular color and each row aligns with a single channel in the back of each printhead IC.

Figure 23:
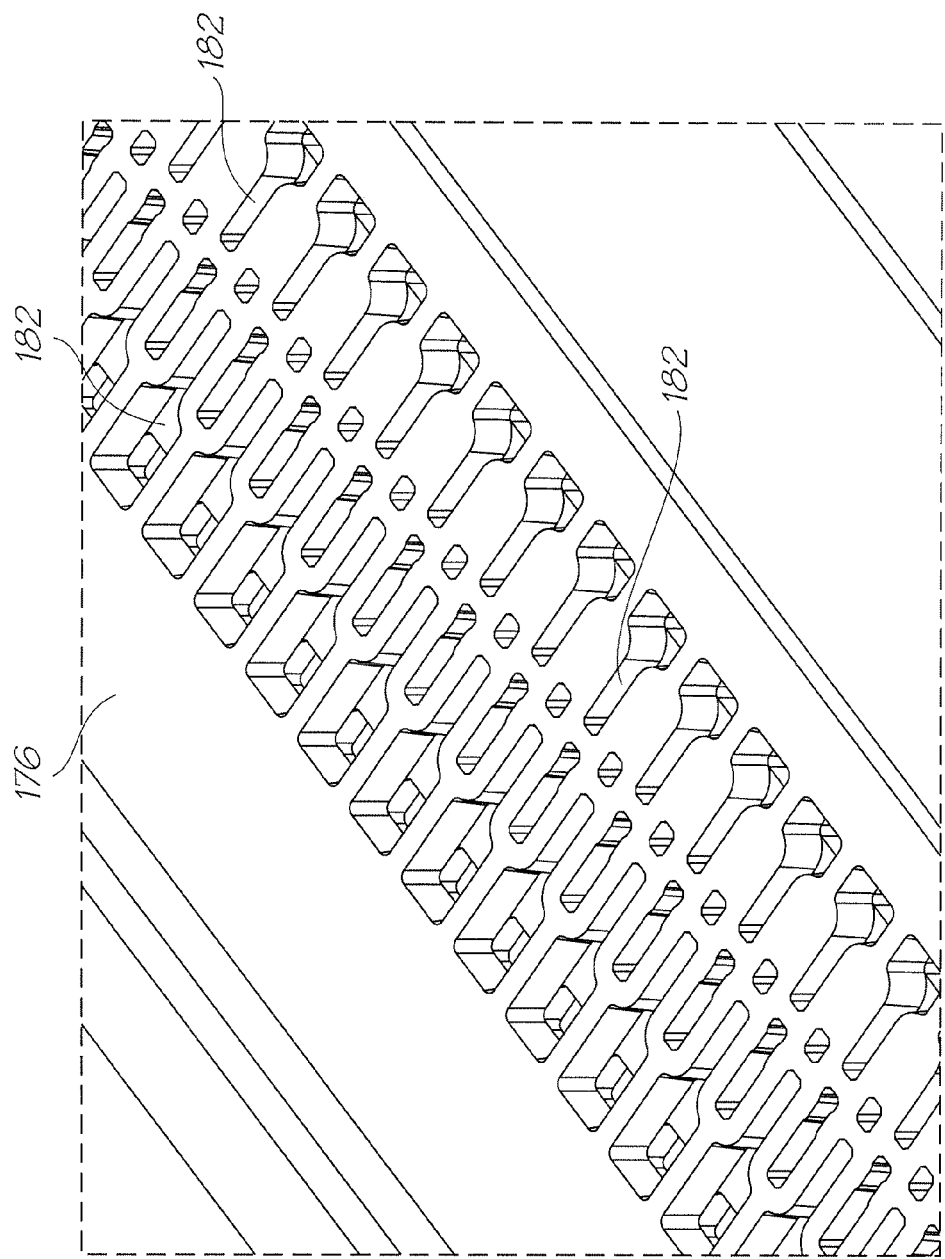
FIG. 23 shows the enlargement of FIG. 22 with the printhead IC attach film removed.

FIG. 23 shows the underside of the LCP channel molding 176 with the adhesive IC attach film 174 removed. This exposes the ink supply passages 182 that connect to the LCP main channels 184 (see FIG. 20) formed in the other side of the channel molding 176. It will be appreciated that the adhesive IC attach film 174 partly defines the supply passages 182 when it is stuck in place. It will also be appreciated that the attach film must be accurately positioned, as the individual supply passages 182 must align with the supply holes 186 laser drilled through the film 174.

Figure 24:
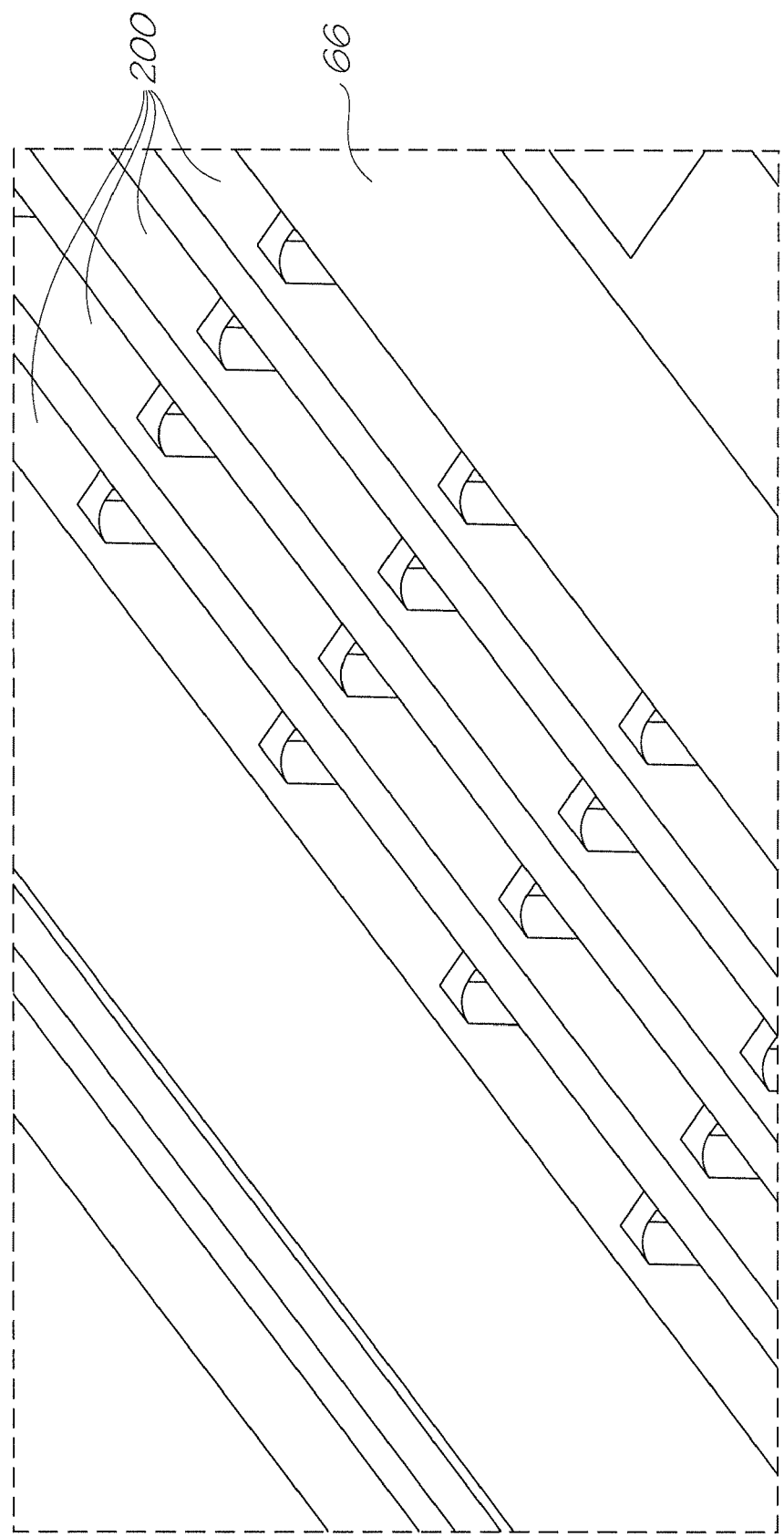
FIG. 24 shows the enlargement of FIG. 23 with the LCP channel molding removed.

FIG. 24 shows the underside of the LCP molding with the LCP channel molding removed. This exposes the array of blind cavities 200 that contain air when the cartridge is primed with ink in order to damp any pressure pulses. This is discussed in greater detail below.

Printhead IC Attach Film
Laser Ablated Film

Figure 31:
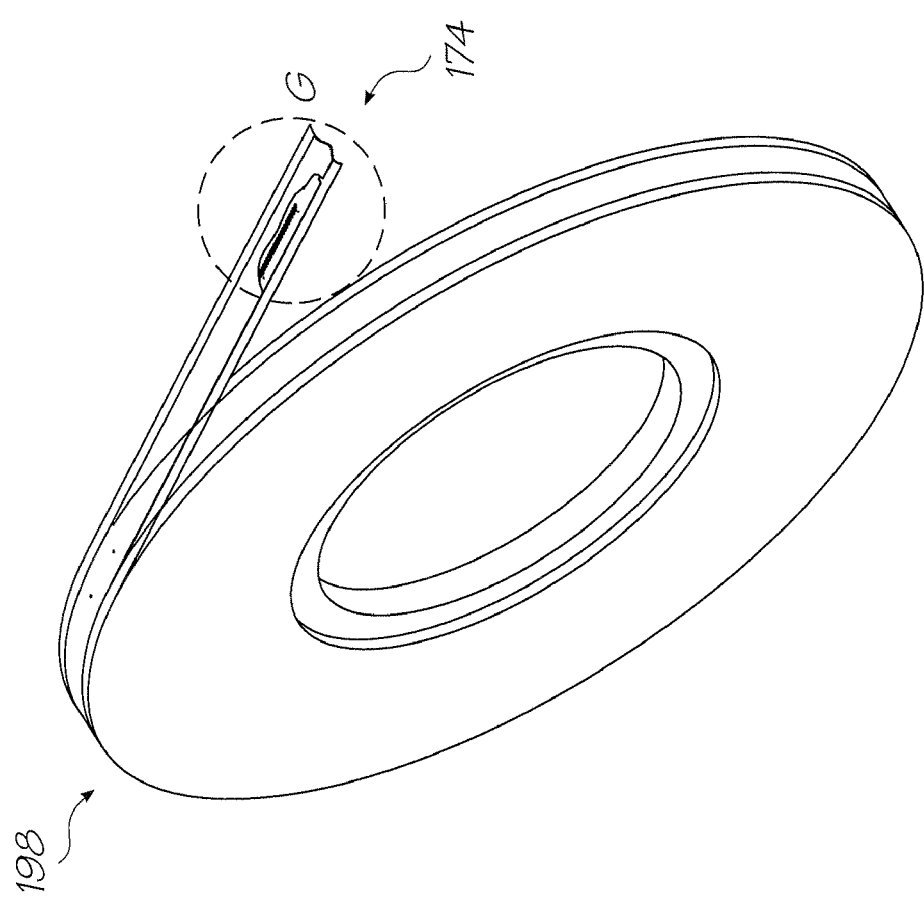
FIG. 31 shows a reel of the IC attachment film.
Figure 32:
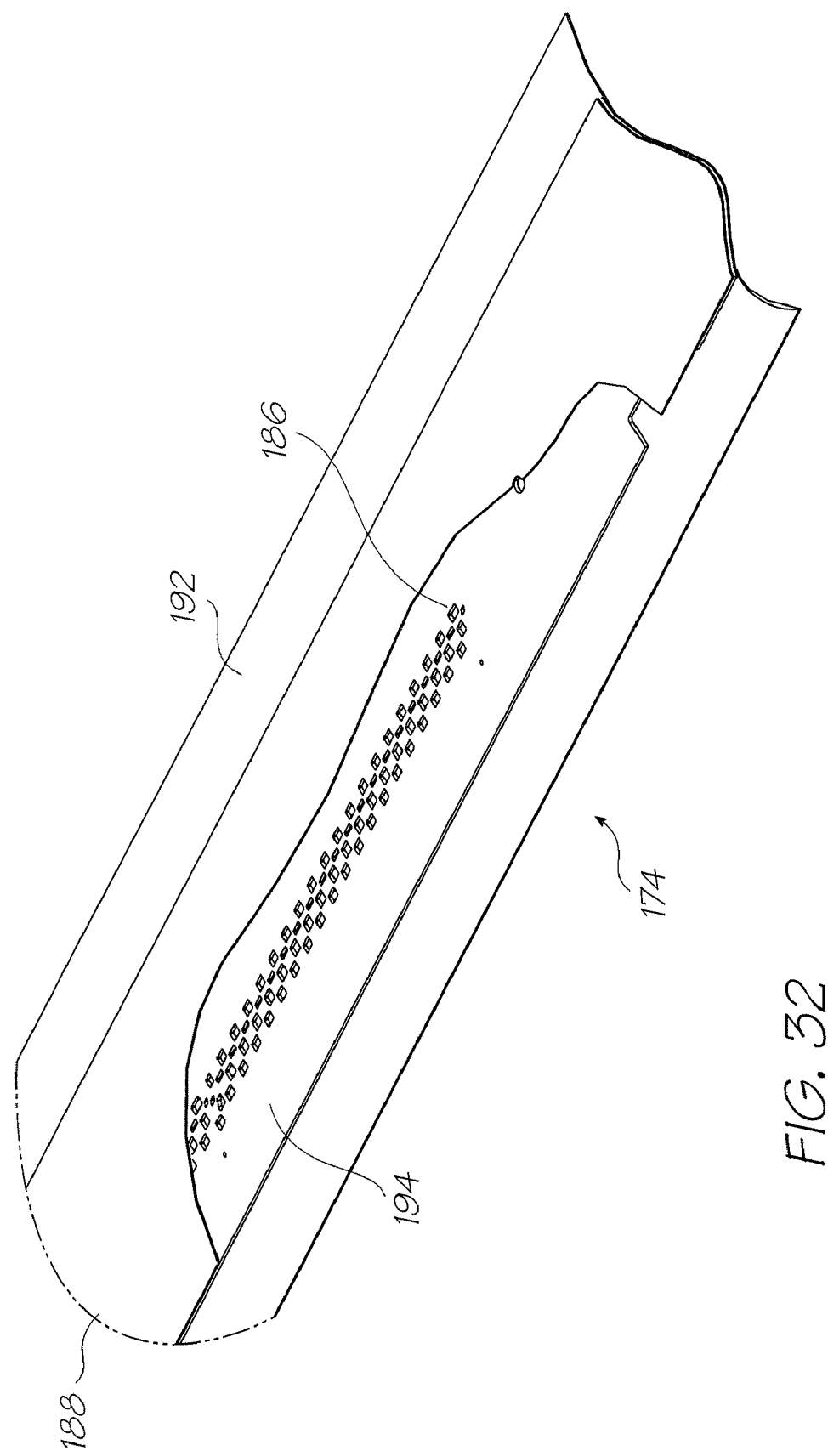
FIG. 32 shows a section of the IC attach film between liners.

Turning briefly to FIGS. 31 to 33, the adhesive IC attachment film is described in more detail. The film 174 may be laser drilled and wound onto a reel 198 for convenient incorporation in the printhead cartridge 96. For the purposes of handling and storage, the film 174 has two protective liners (typically PET liners) on either side. One is an existing liner 188B that is already attached to the film prior to laser drilling. The other is a replacement liner 192, which replaces an existing liner 188A, after the drilling operation.

The section of the laser-drilled film 174 shown in FIG. 32 has some of the existing liner 188B removed to expose the supply holes 186. The replacement liner 192 on the other side of the film replaces an existing liner 188A after the supply holes 186 have been laser drilled.

Figures 33A, 33B, 33C:
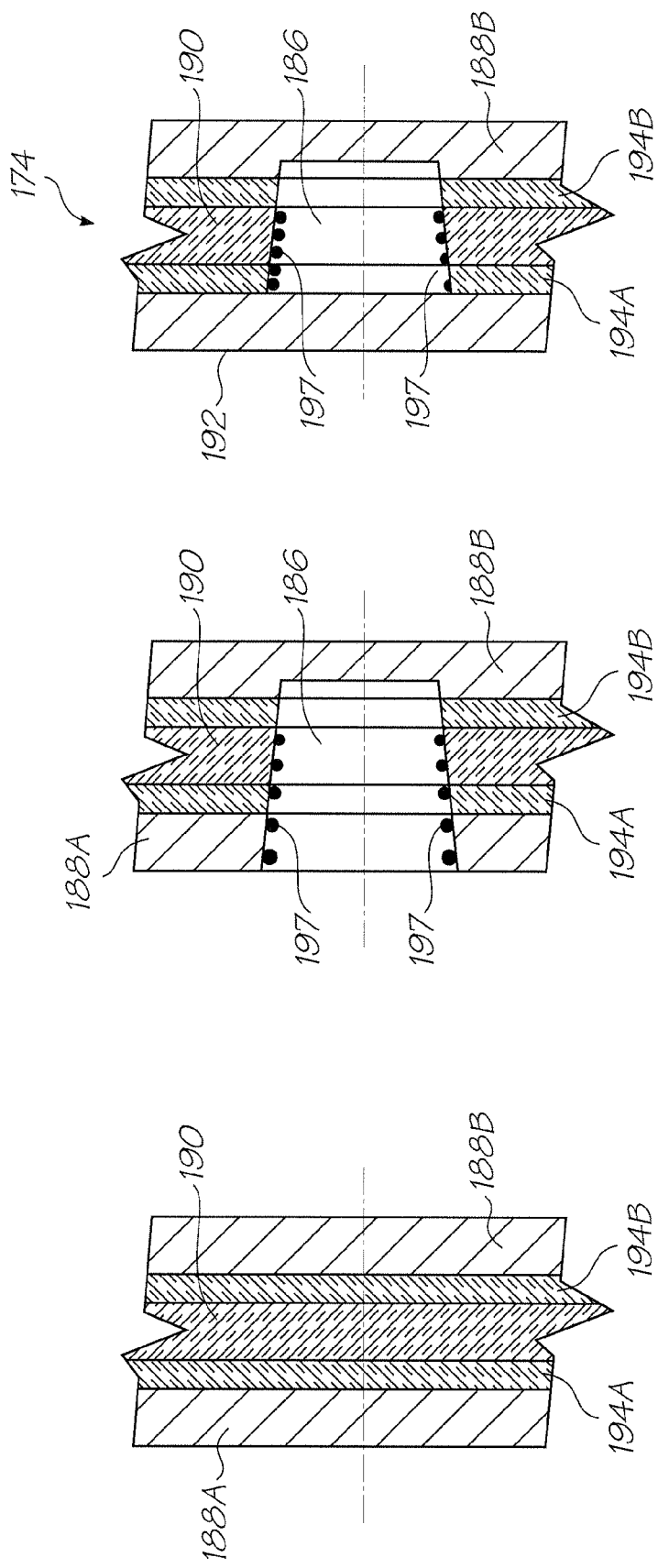
FIG. 33A-C are partial sections showing various stages of traditional laser-drilling of an attachment film.

FIGS. 33A to 33C show in detail how the film 174 is manufactured by laser ablation. FIG. 33A shows in detail the laminate structure of the film prior to laser-drilling. The central web 190 is typically a polyimide film and provides the strength for the laminate. The web 190 is sandwiched between adhesive layers 194A and 194B, which are typically epoxy layers. Each adhesive layer 194A and 194B is covered with a respective liner 188A and 188B. The central web 190 typically has a thickness of from 20 to 100 microns (usually about 50 microns). Each adhesive layer 194A and 194B typically has a thickness of from 10 to 50 microns (usually about 25 microns).

Referring to FIG. 33B, laser-drilling is performed from the side of the film defined by the liner 188A. A hole 186 is drilled through the first liner 188A, the epoxy layers 194A and 194B and the central web 190. The hole 186 terminates somewhere in the liner 188B, and so the liner 188B may be thicker than the liner 188A (e.g. liner 188A may be 10-20 microns thick; liner 188B may be 30-100 microns thick).

The foraminous liner 188A on the laser-entry side is then removed and replaced with a replacement liner 192, to provide the film 174 shown in FIG. 33C. The strip of film 174 is then wound into a reel 198 (see FIG. 31) for storage and handling prior to attachment. When the printhead cartridge is assembled, suitable lengths are drawn from the reel 198, the liners removed and adhered to the underside of the LCP channel molding 176 such that the holes 186 are in registration with the correct ink supply passages 182 (see FIG. 25).

Laser drilling is a standard method for defining holes in polymer films. However, a problem with laser drilling is that it deposits a carbonaceous soot 197 in and around the drilling site (see FIGS. 33B and 33C). Soot around a protective liner may be easily dealt with, because this is usually replaced after laser drilling. However, soot 197 deposited in and around the actual supply holes 186 is potentially problematic. When the film is compressed between the LCP channel molding 176 and printhead ICs 68 during bonding, the soot may be dislodged. Any dislodged soot 197 represents a means by which particulates may enter the ink supply system and potentially block nozzles in the printhead ICs 68. Moreover, the soot is surprisingly fast and cannot be removed by conventional ultrasonication and/or IPA washing techniques.

From analysis of laser-drilled films 174, it has been observed by the present Applicants that the soot 197 is generally present on the laser-entry side of the film 174 (i.e. the epoxy layer 194A and central web 190), but is usually absent from the laser-exit side of the film (i.e. the epoxy layer 194B).

Double-Pass Laser Ablated Film

It would be desirable to provide a method of manufacturing an IC attachment film 174 which does not suffer from above-mentioned problems associated with carbonaceous soot deposits 197.

The Applicant has found, surprisingly, that double-pass laser ablation of the ink supply holes 186 eliminates the majority of soot deposits 197, including those on the laser-entry side of the film. The starting point for double-pass laser ablation is the film shown in FIG. 33A.

Laser-drilling (or, more generally, laser-ablation) in the present invention typically employs an excimer laser having a pulse frequency in the range of 200 Hz to 400 Hz. The spot size of the laser is usually relatively large compared to the size of the ink supply holes, meaning that several ink holes are ablated at the same time. Since the laser spot size is relatively large, each laser-drilling step is performed by masking the film using a mask having a plurality of laser transmission (or laser-transparent) zones defined therein.

In a first step, a first hole 185 is laser-drilled from the side of the film defined by the liner 188A. The hole 185 is drilled through the liner 188A, the epoxy layers 194A and 194B, and the central web 190. The hole 185 terminates somewhere in the liner 188B. The first laser-drilled hole 185, defined using a first mask, has smaller dimensions than the intended ink supply hole 186. Typically each length and width dimension of the first hole 185 is about 10 microns smaller than the length and width dimensions of the intended ink supply hole 186. It will be seen from FIG. 34A that the first hole 185 has soot 197 deposited on the first liner 188A, the first epoxy layer 194A and the central web 190.

In a second step, the first hole 185 is reamed by further laser drilling, using a second mask, so as to provide the ink supply hole 186 having the desired dimensions. The reaming process generates very little soot and the resulting ink supply hole 186 therefore has clean sidewalls as shown in FIG. 34B.

Finally, and referring to FIG. 34C, the first liner 188A is replaced with a replacement liner 192 to provide a film package, which is ready to be wound onto a reel and used subsequently for attaching printhead ICs 68 to the LCP channel molding 176. The second liner 188B may also be replaced at this stage, if desired.

Figure 34C:
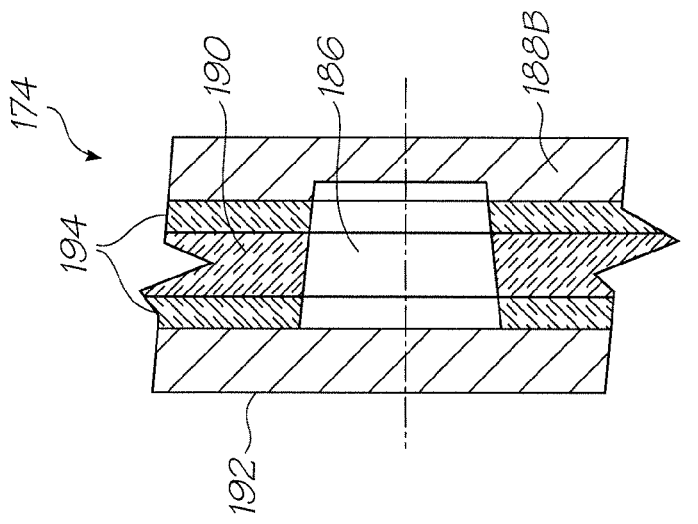
FIGS. 34A-C are partial sections showing various stages of double laser-drilling of an attachment film, in accordance with the present invention.
Figure 34B:
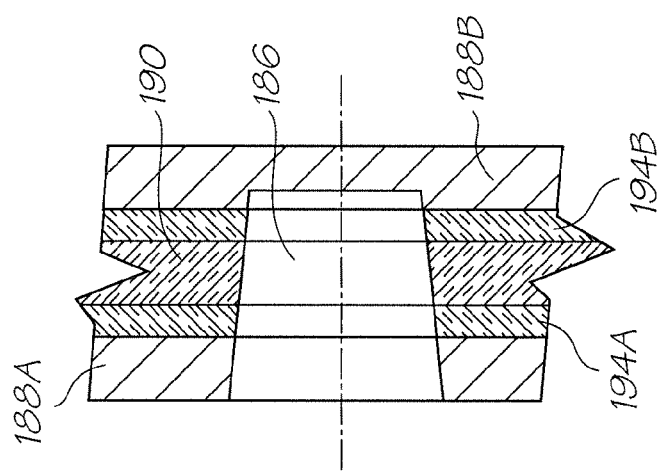
Figure 34A:
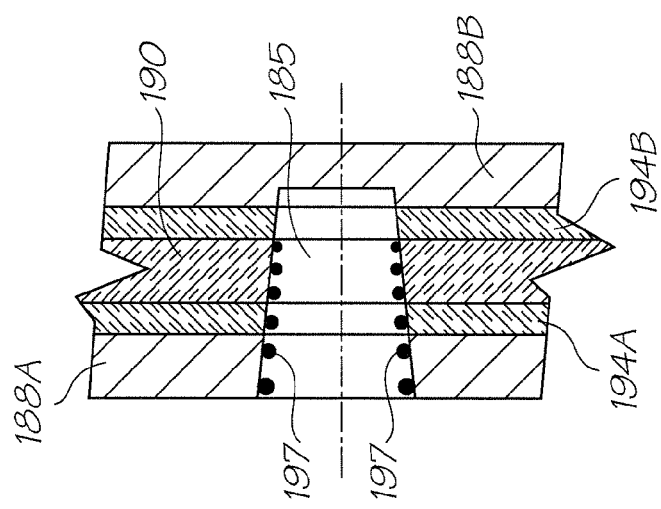

Comparing the films shown in FIGS. 33C and 34C, it will be appreciated that the double laser ablation method provides a film 174 having much cleaner ink supply holes 186 than simple laser ablation. Hence, the film is highly suitable for attachment of printhead ICs 68 to the LCP channel molding 176, and does not contaminate ink with undesirable soot deposits.

Enhanced Ink Supply to Printhead IC Ends

Figure 25:
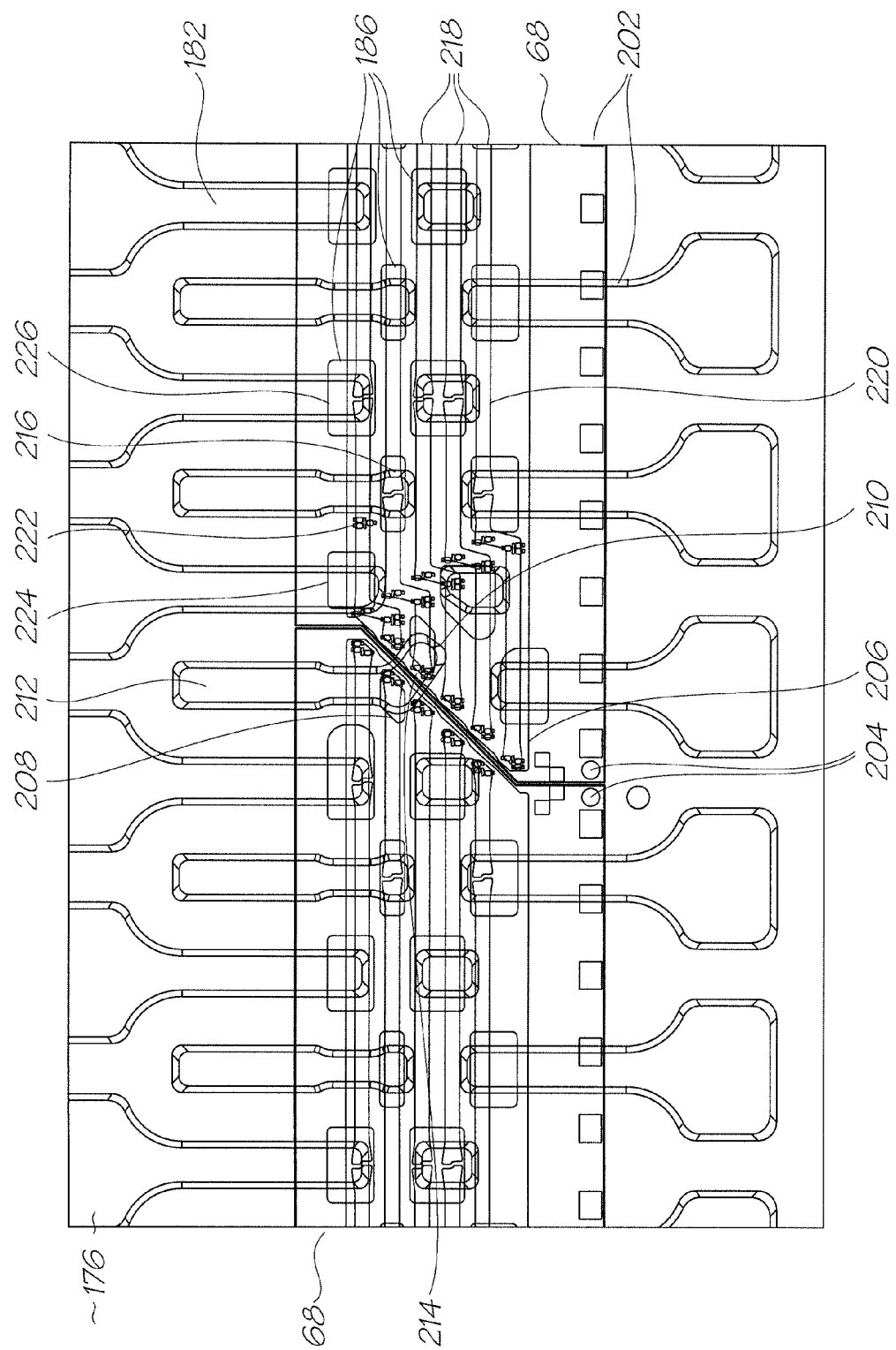
FIG. 25 shows the printhead ICs with back channels and nozzles superimposed on the ink supply passages.

FIG. 25 shows the printhead ICs 68, superimposed on the ink supply holes 186 through the adhesive IC attach film 174, which are in turn superimposed on the ink supply passages 182 in the underside of the LCP channel molding 176. Adjacent printhead ICs 68 are positioned end to end on the bottom of the LCP channel molding 176 via the attach film 174. At the junction between adjacent printhead ICs 68, one of the ICs 68 has a 'drop triangle' 206 portion of nozzles in rows that are laterally displaced from the corresponding row in the rest of the nozzle array 220. This allows the edge of the printing from one printhead IC to be contiguous with the printing from the adjacent printhead IC. By displacing the drop triangle 206 of nozzles, the spacing (in a direction perpendicular to media feed) between adjacent nozzles remains unchanged regardless of whether the nozzles are on the same IC or either side of the junction on different ICs. This requires precise relative positioning of the adjacent printhead ICs 68, and the fiducial marks 204 are used to achieve this. The process can be time consuming but avoids artifacts in the printed image.

Unfortunately, some of the nozzles at the ends of a printhead IC 68 can be starved of ink relative to the bulk of the nozzles in the rest of the array 220. For example, the nozzles 222 can be supplied with ink from two ink supply holes. Ink supply hole 224 is the closest. However, if there is an obstruction or particularly heavy demand from nozzles to the left of the hole 224, the supply hole 226 is also proximate to the nozzles at 222, so there is little chance of these nozzles depriming from ink starvation.

In contrast, the nozzles 214 at the end of the printhead IC 68 would only be in fluid communication with the ink supply hole 216 were it not for the 'additional' ink supply hole 210 placed at the junction between the adjacent ICs 68. Having the additional ink supply hole 210 means that none of the nozzles are so remote from an ink supply hole that they risk ink starvation.

Ink supply holes 208 and 210 are both fed from a common ink supply passage 212. The ink supply passage 212 has the capacity to supply both holes as supply hole 208 only has nozzles to its left, and supply hole 210 only has nozzles to its right. Therefore, the total flowrate through supply passage 212 is roughly equivalent to a supply passage that feeds one hole only.

FIG. 25 also highlights the discrepancy between the number of channels (colors) in the ink supply—four channels—and the five channels 218 in the printhead IC 68. The third and fourth channels 218 in the back of the printhead IC 68 are fed from the same ink supply holes 186. These supply holes are somewhat enlarged to span two channels 218.

The reason for this is that the printhead IC 68 is fabricated for use in a wide range of printers and printhead configurations. These may have five color channels—CMYK and IR (infrared)—but other printers, such this design, may only be four channel printers, and others still may only be three channel (CC, MM and Y). In light of this, a single color channel may be fed to two of the printhead IC channels. The print engine controller (PEC) microprocessor can easily accommodate this into the print data sent to the printhead IC. Furthermore, supplying the same color to two nozzle rows in the IC provides a degree of nozzle redundancy that can used for dead nozzle compensation.

Pressure Pulses

Sharp spikes in the ink pressure occur when the ink flowing to the printhead is stopped suddenly. This can happen at the end of a print job or a page. The Assignee's high speed, pagewidth printheads need a high flow rate of supply ink during operation. Therefore, the mass of ink in the ink line to the nozzles is relatively large and moving at an appreciable rate.

Abruptly ending a print job, or simply at the end of a printed page, requires this relatively high volume of ink that is flowing relatively quickly to come to an immediate stop. However, suddenly arresting the ink momentum gives rise to a shock wave in the ink line. The LCP molding 64 (see FIG. 19) is particularly stiff and provides almost no flex as the column of ink in the line is brought to rest. Without any compliance in the ink line, the shock wave can exceed the Laplace pressure (the pressure provided by the surface tension of the ink at the nozzles openings to retain ink in the nozzle chambers) and flood the front surface of the printhead IC 68. If the nozzles flood, ink may not eject and artifacts appear in the printing.

Resonant pulses in the ink occur when the nozzle firing rate matches a resonant frequency of the ink line. Again, because of the stiff structure that define the ink line, a large proportion of nozzles for one color, firing simultaneously, can create a standing wave or resonant pulse in the ink line. This can result in nozzle flooding, or conversely nozzle deprime because of the sudden pressure drop after the spike, if the Laplace pressure is exceeded.

To address this, the LCP molding 64 incorporates a pulse damper to remove pressure spikes from the ink line. The damper may be an enclosed volume of gas that can be compressed by the ink. Alternatively, the damper may be a compliant section of the ink line that can elastically flex and absorb pressure pulses.

To minimize design complexity and retain a compact form, the invention uses compressible volumes of gas to damp pressure pulses. Damping pressure pulses using gas compression can be achieved with small volumes of gas. This preserves a compact design while avoiding any nozzle flooding from transient spikes in the ink pressure.

Figure 26:
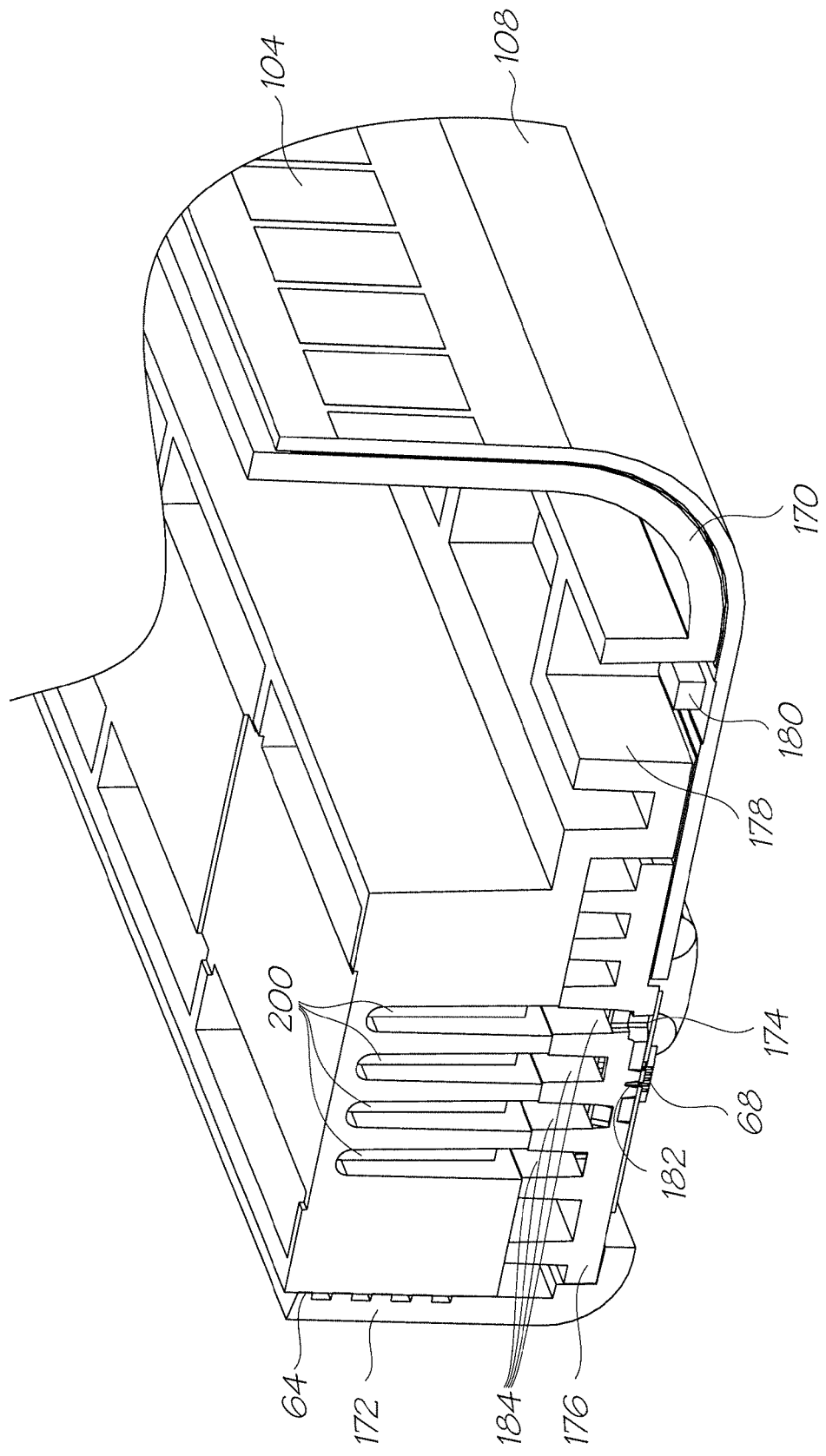
FIG. 26 in an enlarged transverse perspective of the LCP/flex PCB/printhead IC assembly.

As shown in FIGS. 24 and 26, the pulse damper is not a single volume of gas for compression by pulses in the ink. Rather the damper is an array of cavities 200 distributed along the length of the LCP molding 64. A pressure pulse moving through an elongate printhead, such as a pagewidth printhead, can be damped at any point in the ink flow line. However, the pulse will cause nozzle flooding as it passes the nozzles in the printhead integrated circuit, regardless of whether it is subsequently dissipated at the damper. By incorporating a number of pulse dampers into the ink supply conduits immediately next to the nozzle array, any pressure spikes are damped at the site where they would otherwise cause detrimental flooding.

It can be seen in FIG. 26, that the air damping cavities 200 are arranged in four rows. Each row of cavities sits directly above the LCP main channels 184 in the LCP channel molding 176. Any pressure pulses in the ink in the main channels 184 act directly on the air in the cavities 200 and quickly dissipate.

Printhead Priming

Figure 27:
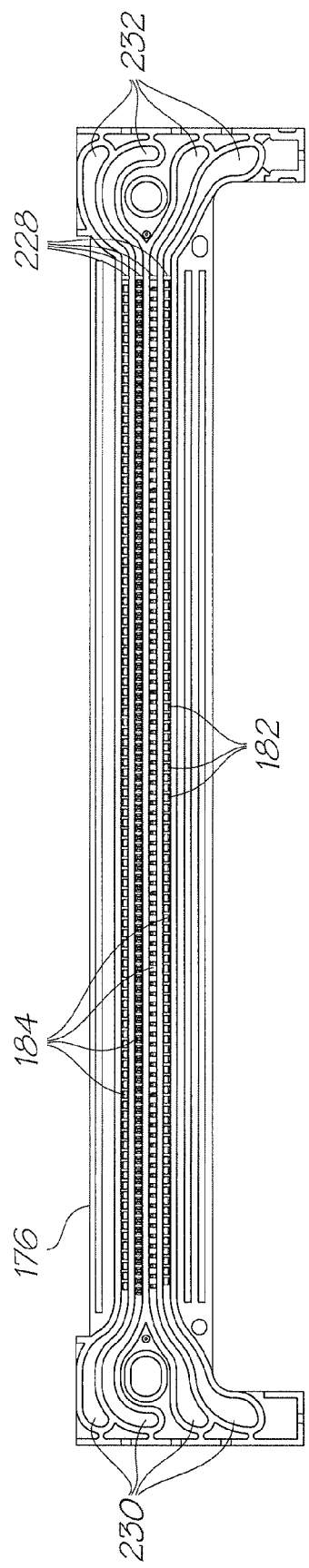
FIG. 27 is a plan view of the LCP channel molding.

Priming the cartridge will now be described with particular reference to the LCP channel molding 176 shown in FIG. 27. The LCP channel molding 176 is primed with ink by suction applied to the main channel outlets 232 from the pump of the fluidic system (see FIG. 6). The main channels 184 are filled with ink and then the ink supply passages 182 and printhead ICs 68 self prime by capillary action.

The main channels 184 are relatively long and thin. Furthermore the air cavities 200 must remain unprimed if they are to damp pressure pulses in the ink. This can be problematic for the priming process which can easily fill cavities 200 by capillary action or the main channel 184 can fail to fully prime because of trapped air. To ensure that the LCP channel molding 176 fully primes, the main channels 184 have a weir 228 at the downstream end prior to the outlet 232. To ensure that the air cavities 200 in the LCP molding 64 do not prime, they have openings with upstream edges shaped to direct the ink meniscus from traveling up the wall of the cavity.

Figure 28A:
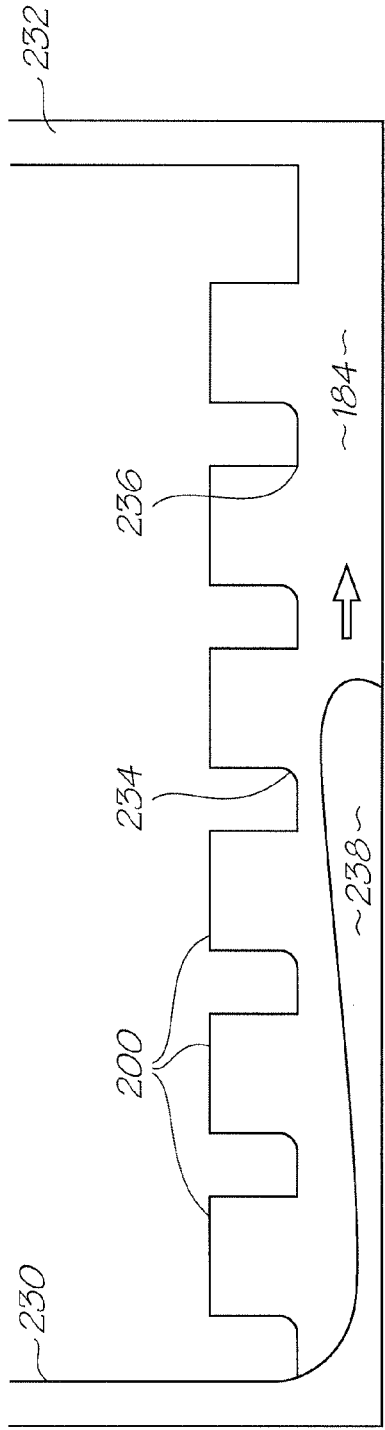
FIGS. 28A and 28B are schematic section views of the LCP channel molding priming without a weir.
Figure 28B:
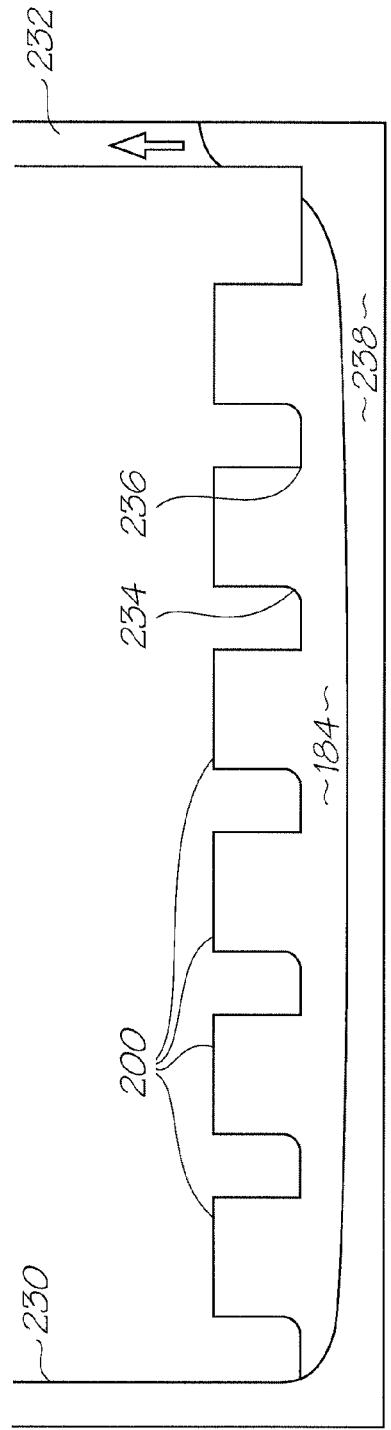

These aspects of the cartridge are best described with reference FIGS. 28A, 28B and 29A to 29C. These figures schematically illustrate the priming process. FIGS. 28A and 28B show the problems that can occur if there is no weir in the main channels, whereas FIGS. 29A to 29C show the function of the weir 228.

FIGS. 28A and 28B are schematic section views through one of the main channels 184 of the LCP channel molding 176 and the line of air cavities 200 in the roof of the channel. Ink 238 is drawn through the inlet 230 and flows along the floor of the main channel 184. It is important to note that the advancing meniscus has a steeper contact angle with the floor of the channel 184. This gives the leading portion of the ink flow 238 a slightly bulbous shape. When the ink reaches the end of the channel 184, the ink level rises and the bulbous front contacts the top of the channel before the rest of the ink flow. As shown in FIG. 28B, the channel 184 has failed to fully prime, and the air is now trapped. This air pocket will remain and interfere with the operation of the printhead. The ink damping characteristics are altered and the air can be an ink obstruction.

Figure 29C:
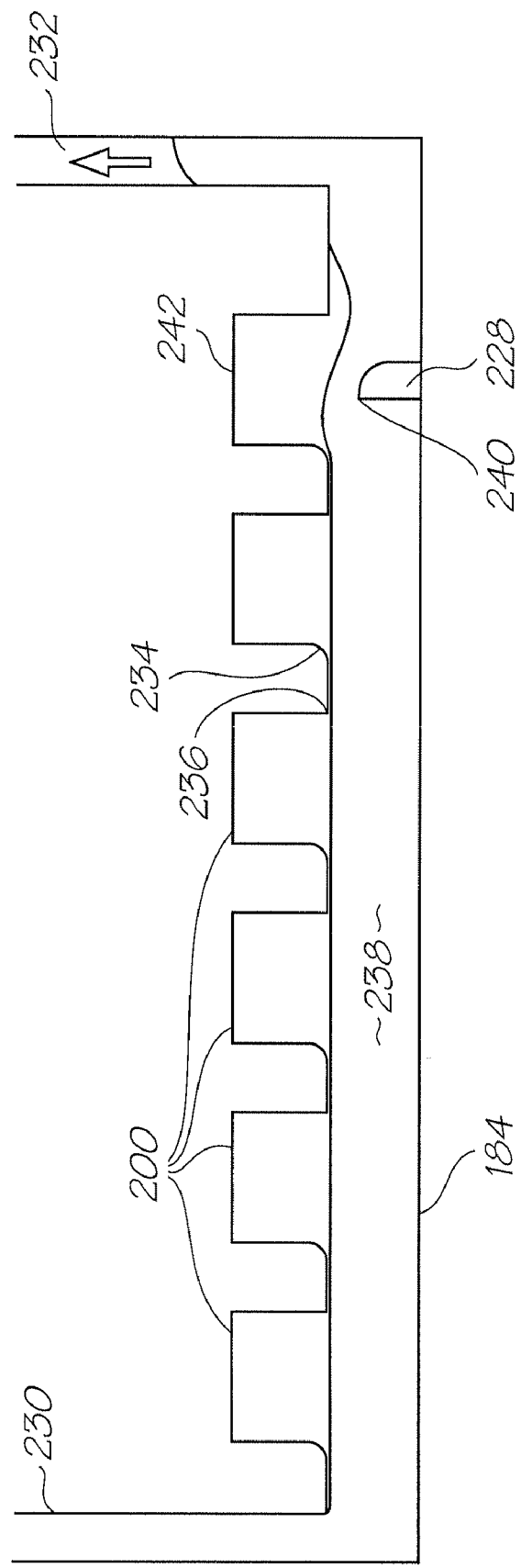

In FIG. 29A to 29C, the channel 184 has a weir 228 at the downstream end. As shown in FIG. 29A, the ink flow 238 pools behind the weir 228 and rises toward the top of the channel. The weir 228 has a sharp edge 240 at the top to act as a meniscus anchor point. The advancing meniscus pins to this anchor 240 so that the ink does not simply flow over the weir 228 as soon as the ink level is above the top edge.

As shown in FIG. 29B, the bulging meniscus makes the ink rise until it has filled the channel 184 to the top. With the ink sealing the cavities 200 into separate air pockets, the bulging ink meniscus at the weir 228 breaks from the sharp top edge 240 and fills the end of the channel 184 and the ink outlet 232 (see FIG. 29C). The sharp to edge 240 is precisely positioned so that the ink meniscus will bulge until the ink fills to the top of the channel 184, but does not allow the ink to bulge so much that it contacts part of the end air cavity 242. If the meniscus touches and pins to the interior of the end air cavity 242, it may prime with ink. Accordingly, the height of the weir and its position under the cavity is closely controlled. The curved downstream surface of the weir 228 ensures that there are no further anchor points that might allow the ink meniscus to bridge the gap to the cavity 242.

Another mechanism that the LCP uses to keep the cavities 200 unprimed is the shape of the upstream and downstream edges of the cavity openings. As shown in FIGS. 28A, 28B and 29A to 29C, all the upstream edges have a curved transition face 234 while the downstream edges 236 are sharp. An ink meniscus progressing along the roof of the channel 184 can pin to a sharp upstream edge and subsequently move upwards into the cavity by capillary action. A transition surface, and in particular a curved transition surface 234 at the upstream edge removes the strong anchor point that a sharp edge provides.

Similarly, the Applicant's work has found that a sharp downstream edge 236 will promote depriming if the cavity 200 has inadvertently filled with some ink. If the printer is bumped, jarred or tilted, or if the fluidic system has had to reverse flow for any reason, the cavities 200 may fully of partially prime. When the ink flows in its normal direction again, a sharp downstream edge 236 helps to draw the meniscus back to the natural anchor point (i.e. the sharp corner). In this way, management of the ink meniscus movement through the LCP channel molding 176 is a mechanism for correctly priming the cartridge.

The invention has been described here by way of example only. Skilled workers in this field will recognize many variations and modification which do not depart from the spirit and scope of the broad inventive concept. Accordingly, the embodiments described and shown in the accompanying figures are to be considered strictly illustrative and in no way restrictive on the invention.

We claim:

1. A method of fabricating an apertured polymeric film, said method comprising the steps of:
    (a) masking a polymeric film with a first mask having one or more first laser transmission zones defined therein;
    (b) laser-ablating one or more first apertures through an entire thickness of said polymeric film using said first mask;
    (c) masking said film with a second mask having one or more second laser transmission zones defined therein, each second zone being aligned with a corresponding first aperture, and each second zone having greater perimeter dimensions than said corresponding first aperture; and
    (d) reaming said one or more first apertures by laser-ablating through an entire thickness of said polymeric film using said second mask, said reamed first apertures defining one or more second apertures in said film,
    wherein each first aperture has perimeter dimensions about 5 to 30 microns less than predetermined perimeter dimensions of a corresponding second aperture, and wherein said first apertures are lined with carbonaceous deposits and said second apertures are substantially free of said carbonaceous soot deposits.

2. The method of claim 1, wherein said apertured polymeric film is an adhesive polymeric film for attachment of one or more printhead integrated circuits to an ink manifold, said one or more second apertures defining one or more ink supply holes.

3. The method of claim 2, wherein said adhesive polymeric film comprises a central polymeric film sandwiched between adhesive layers.

4. The method of claim 3, wherein said central polymeric film is a polyimide film and said adhesive layers are epoxy layers.

5. The method of claim 3, wherein said film is provided in a film package, said film package comprising said adhesive polymeric film and a pair of removeable protective liners, each liner protecting a respective adhesive layer.

6. The method of claim 5, wherein said laser-ablating steps terminate in one of said protective liners.

7. The method of claim 6, wherein said laser-ablating steps drill through one of said protective liners, said adhesive layers and said central polymeric film.

8. The method of claim 5 further comprising the step of:
(d) replacing at least one of said protective liners with a replacement liner.

9. A film for attachment of one or more printhead integrated circuits to an ink supply manifold, said film being obtained or obtainable by the method according to claim 2.

10. The method of claim 1, wherein each first aperture has perimeter dimensions about 10 microns less than predetermined perimeter dimensions of a corresponding second aperture.

11. The method of claim 1, wherein each second aperture has a predetermined length dimension of up to about 500 microns and a predetermined width dimension of up to about 500 microns.

12. A method of attaching one or more printhead integrated circuits onto an ink supply manifold, said method comprising the steps of:
(i) providing an adhesive film having a plurality of ink supply holes defined therein;
(ii) bonding said film to said ink supply manifold; and
(iii) bonding said one or more printhead integrated circuits to said film;
wherein said film in step (i) is fabricated by the steps of:
(a) providing an adhesive polymeric film;
(b) masking said film with a first mask having a plurality of first laser transmission zones defined therein;
(c) laser-ablating a plurality of first holes through an entire thickness of said polymeric film using said first mask;
(d) masking said film with a second mask having a plurality of second laser transmission zones defined therein, each second zone being aligned with a corresponding first hole, and each second zone having greater perimeter dimensions than said corresponding first hole; and
(e) reaming said first holes by laser-ablating through an entire thickness of said polymeric film using said second mask, each reamed first hole defining an ink supply hole through said film,
wherein each first aperture has perimeter dimensions about 5 to 30 microns less than predetermined perimeter dimensions of a corresponding second aperture, and
wherein said first apertures are lined with carbonaceous deposits and said ink supply holes are substantially free of said carbonaceous soot deposits.

13. The method of claim 12, wherein said ink supply manifold is an LCP molding.

14. The method of claim 12, wherein a plurality of said printhead integrated circuits are attached to said ink supply manifold such that they are butted end on end to provide a pagewidth printhead.

15. The method of claim 12, wherein said ink supply holes are positioned to supply ink to ink supply channels defined in a backside of said one or more printhead integrated circuits.

16. The method of claim 12, wherein said bonding steps are performed by thermal curing and/or compression.

17. A printhead assembly comprising at least one printhead integrated circuit attached to an ink supply manifold, said printhead integrated circuit being attached with an adhesive film having a plurality of ink supply holes defined therein, wherein said printhead assembly is obtained or obtainable by the method according to claim 12.

* * * * *